(12) United States Patent
Min et al.

(10) Patent No.: US 11,509,413 B2
(45) Date of Patent: Nov. 22, 2022

(54) APPARATUS, SYSTEM AND METHOD OF AN ORTHOGONAL FREQUENCY-DIVISION MULTIPLEXING (OFDM) TRANSMISSION OVER A WIDE BANDWIDTH

(71) Applicant: INTEL IP CORPORATION, Santa Clara, CA (US)

(72) Inventors: Alexander W. Min, Portland, OR (US); Thomas J. Kenney, Portland, OR (US); Laurent Cariou, Portland, OR (US); Shahrnaz Azizi, Cupertino, CA (US); Xiaogang Chen, Portland, OR (US); Robert J. Stacey, Portland, OR (US); Qinghua Li, San Ramon, CA (US)

(73) Assignee: INTEL CORPORATION, Santa Clara, CA (US)

( * ) Notice: Subject to any disclaimer, the term of this patent is extended or adjusted under 35 U.S.C. 154(b) by 995 days.

(21) Appl. No.: 16/021,484

(22) Filed: Jun. 28, 2018

(65) Prior Publication Data
US 2020/0007265 A1    Jan. 2, 2020

(51) Int. Cl.
*H04L 5/00* (2006.01)
*H04L 1/00* (2006.01)

(52) U.S. Cl.
CPC .......... *H04L 1/0003* (2013.01); *H04L 1/0009* (2013.01); *H04L 1/0057* (2013.01); *H04L 5/0044* (2013.01); *H04L 5/001* (2013.01)

(58) Field of Classification Search
CPC ... H04L 1/0003; H04L 1/0009; H04L 1/0057; H04L 5/0044; H04L 5/001
See application file for complete search history.

(56) References Cited

U.S. PATENT DOCUMENTS

| | | | |
|---|---|---|---|
| 10,863,456 B2 * | 12/2020 | Chen | H04L 25/03834 |
| 11,109,278 B2 * | 8/2021 | Verma | H04W 72/042 |
| 2002/0036992 A1 * | 3/2002 | Balachandran | H04L 1/0003 |
| | | | 370/329 |

(Continued)

OTHER PUBLICATIONS

IEEE Std 802.11ac™—2013. IEEE Standard for Information technology—Telecommunications and information exchange between systems Local and metropolitan area networks—Specific requirements, Part 11: Wireless LAN Medium Access Control (MAC) and Physical Layer (PHY) Specifications, Amendment 4: Enhancements for Very High Throughput for Operation in Bands below 6 GHz, Dec. 11, 2013, 424 pages.

(Continued)

*Primary Examiner* — Christopher M Crutchfield
*Assistant Examiner* — Tito Q Pham
(74) *Attorney, Agent, or Firm* — Shichrur & Co.

(57) ABSTRACT

For example, an apparatus may include a segment parser to parse scrambled data bits of a PPDU into a first plurality of data bits and a second plurality of data bits, the PPDU to be transmitted in an OFDM transmission over an aggregated bandwidth comprising a first channel in a first frequency band and a second channel in a second frequency band; a first baseband processing block to encode and modulate the first plurality of data bits according to a first OFDM MCS for transmission over the first channel in the first frequency band; and a second baseband block to encode and modulate the second plurality of data bits according to a second OFDM MCS for transmission over the second channel in the second frequency band.

13 Claims, 12 Drawing Sheets

(56) References Cited

U.S. PATENT DOCUMENTS

| | | | | |
|---|---|---|---|---|
| 2006/0007898 | A1* | 1/2006 | Maltsev | H04L 27/2621 370/338 |
| 2009/0067543 | A1* | 3/2009 | Hsiao | H04L 1/0067 375/295 |
| 2011/0007731 | A1* | 1/2011 | Tsatsanis | H04L 12/2865 370/343 |
| 2011/0026623 | A1* | 2/2011 | Srinivasa | H04L 1/0016 375/260 |
| 2012/0213231 | A1* | 8/2012 | Barr | H04L 1/02 370/480 |
| 2012/0224612 | A1* | 9/2012 | Kim | H04B 1/16 375/219 |
| 2016/0044675 | A1* | 2/2016 | Chen | H04L 27/2602 370/329 |
| 2016/0066338 | A1* | 3/2016 | Kwon | H04L 5/0091 370/330 |
| 2016/0100408 | A1* | 4/2016 | Hedayat | H04L 65/80 370/329 |
| 2016/0286551 | A1* | 9/2016 | Lee | H04L 27/26 |
| 2017/0280354 | A1* | 9/2017 | Huang | H04L 69/323 |
| 2017/0366299 | A1* | 12/2017 | Li | H04L 5/00 |
| 2019/0007186 | A1* | 1/2019 | Nguyen | H04L 1/203 |
| 2019/0098565 | A1* | 3/2019 | Cherian | H04W 48/18 |
| 2019/0109684 | A1* | 4/2019 | Chen | H04W 52/367 |
| 2019/0110261 | A1* | 4/2019 | Chen | H04L 5/0048 |
| 2019/0150117 | A1* | 5/2019 | Lou | H04B 7/0452 370/329 |
| 2019/0253296 | A1* | 8/2019 | Chen | H04W 72/0453 |
| 2019/0289612 | A1* | 9/2019 | Chen | H04L 5/0092 |
| 2019/0387435 | A1* | 12/2019 | Cariou | H04W 28/12 |

OTHER PUBLICATIONS

IEEE Std 802.11™—2016. IEEE Standard for Information technology—Telecommunications and information exchange between systems Local and metropolitan area networks—Specific requirements Part 11: Wireless LAN Medium Access Control (MAC) and Physical Layer (PHY) Specifications, Dec. 7, 2016, 3534 pages.

* cited by examiner

APPARATUS, SYSTEM AND METHOD OF AN ORTHOGONAL FREQUENCY-DIVISION MULTIPLEXING (OFDM) TRANSMISSION OVER A WIDE BANDWIDTH

TECHNICAL FIELD

Embodiments described herein generally relate to an Orthogonal Frequency-Division Multiplexing (OFDM) transmission over a wide bandwidth.

BACKGROUND

A wireless communication station (STA) may be configured to communicate over a non-contagious 160 Megahertz (MHz) channel including channel bonding of two 80 MHz channels.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
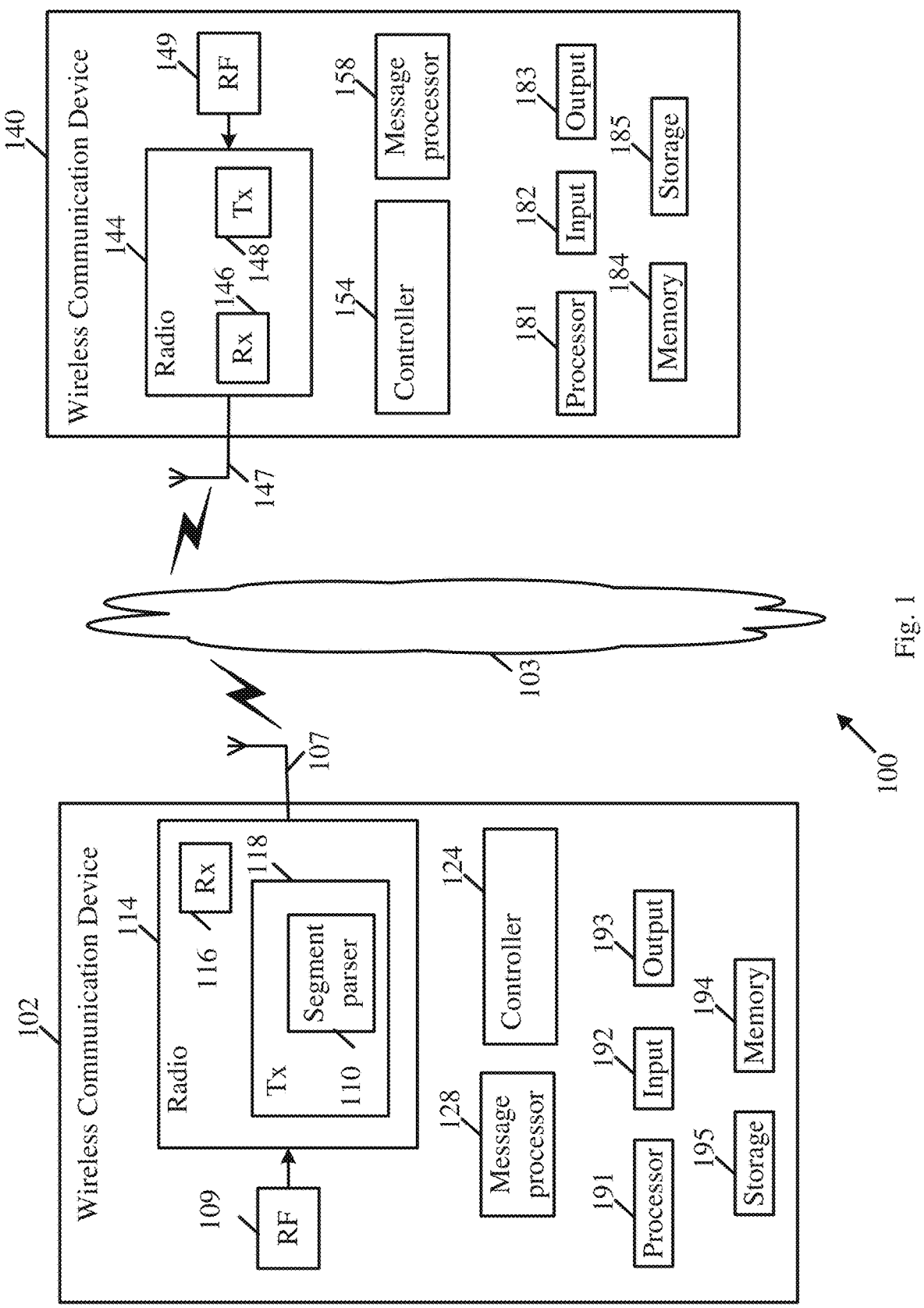
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a User Equipment (UE), a Mobile Device (MD), a wireless station (STA), a Personal Computer (PC), a desktop computer, a mobile computer, a laptop computer, a notebook computer, a tablet computer, a server computer, a handheld computer, a handheld device, a wearable device, a sensor device, an Internet of Things (IoT) device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing IEEE 802.11 standards (including IEEE 802.11-2016 (IEEE 802.11-2016, IEEE Standard for Information technology—Telecommunications and information exchange between systems Local and metropolitan area networks—Specific requirements Part 11: Wireless LAN Medium Access Control (MAC) and Physical Layer (PHY) Specifications, Dec. 7, 2016)) and/or future versions and/or derivatives thereof, devices and/or networks operating in accordance with existing WFA Peer-to-Peer (P2P) specifications (WiFi P2P technical specification, version 1.7, Jul. 6, 2016) and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Orthogonal Frequency-Division Multiple Access (OFDMA), Time-Division Multiplexing (TDM), Time-Division Multiple Access (TDMA), Multi-User MIMO (MU-MIMO), Spatial Division Multiple Access (SDMA), Extended TDMA (E-TDMA), General Packet Radio Service (GPRS), Extended GPRS, Code-Division Multiple Access (CDMA), Wideband CDMA (WCDMA), CDMA 2000, single-carrier CDMA, multi-carrier CDMA, Multi-Carrier Modulation (MCM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G), or Sixth Generation (6G) mobile networks, 3GPP, Long Term Evolution (LTE), LTE Advanced, Enhanced Data rates for GSM Evolution (EDGE), or the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device. The communication signal may be transmitted and/or received, for example, in the form of Radio Frequency (RF) communication signals, and/or any other type of signal.

As used herein, the term "circuitry" may refer to, be part of, or include, an Application Specific Integrated Circuit (ASIC), an integrated circuit, an electronic circuit, a processor (shared, dedicated, or group), and/or memory (shared, dedicated, or group), that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

The term "logic" may refer, for example, to computing logic embedded in circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in, and/or implemented as part of, various circuitry, e.g. radio circuitry, receiver circuitry, control circuitry, transmitter circuitry, transceiver circuitry, processor circuitry, and/or the like. In one example, logic may be embedded in volatile memory and/or non-volatile memory, including random access memory, read only memory, programmable memory, magnetic memory, flash memory, persistent memory, and the like. Logic may be executed by one or more processors using memory, e.g., registers, stuck, buffers, and/or the like, coupled to the one or more processors, e.g., as necessary to execute the logic.

Some demonstrative embodiments may be used in conjunction with a WLAN, e.g., a WiFi network. Other embodiments may be used in conjunction with any other suitable wireless communication network, for example, a wireless area network, a "piconet", a WPAN, a WVAN and the like.

Some demonstrative embodiments may be used in conjunction with a wireless communication network communicating over a frequency band of 6 GHz, 2.4 GHz, or 5 GHz. However, other embodiments may be implemented utilizing any other suitable wireless communication frequency bands, for example, an Extremely High Frequency (EHF) band (the millimeter wave (mmWave) frequency band), e.g., a frequency band within the frequency band of between 20 GHz and 300 GHz, a WLAN frequency band, a WPAN frequency band, and the like.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/ receive elements. The antenna may include, for example, a phased array antenna, a single element antenna, a set of switched beam antennas, and/or the like.

Some demonstrative embodiments are described herein with respect to WiFi communication. However, other embodiments may be implemented with respect to any other communication scheme, network, standard and/or protocol.

Reference is now made to FIG. 1, which schematically illustrates a block diagram of a system 100, in accordance with some demonstrative embodiments.

As shown in FIG. 1, in some demonstrative embodiments system 100 may include a wireless communication network including one or more wireless communication devices, e.g., wireless communication devices 102 and/or 140.

In some demonstrative embodiments, wireless communication devices 102 and/or 140 may include, for example, a UE, an MD, a STA, an AP, a PC, a desktop computer, a mobile computer, a laptop computer, an Ultrabook™ computer, a notebook computer, a tablet computer, a server computer, a handheld computer, an Internet of Things (IoT) device, a sensor device, a handheld device, a wearable device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a media player, a Smartphone, a television, a music player, or the like.

In some demonstrative embodiments, devices 102 and/or 140 may include, operate as, and/or perform the functionality of one or more STAs. For example, device 102 may include at least one STA, and/or device 140 may include at least one STA.

In some demonstrative embodiments, devices 102 and/or 140 may include, operate as, and/or perform the functionality of one or more WLAN STAs.

In some demonstrative embodiments, devices 102 and/or 140 may include, operate as, and/or perform the functionality of one or more Wi-Fi STAs.

In some demonstrative embodiments, devices 102 and/or 140 may include, operate as, and/or perform the functionality of one or more BT devices.

In some demonstrative embodiments, devices 102 and/or 140 may include, operate as, and/or perform the functionality of one or more Neighbor Awareness Networking (NAN) STAs.

In some demonstrative embodiments, one of wireless communication devices 102 and/or 140, e.g., device 102, may include, operate as, and/or perform the functionality of an AP STA, and/or one or more of wireless communication devices 102 and/or 140, e.g., device 140, may include, operate as, and/or perform the functionality of a non-AP STA. In other embodiments, devices 102 and/or 140 may operate as and/or perform the functionality of any other STA.

For example, the AP may include a router, a PC, a server, a Hot-Spot and/or the like.

In one example, a station (STA) may include a logical entity that is a singly addressable instance of a medium access control (MAC) and physical layer (PHY) interface to the wireless medium (WM). The STA may perform any other additional or alternative functionality.

In one example, an AP may include an entity that contains a station (STA), e.g., one STA, and provides access to distribution services, via the wireless medium (WM) for associated STAs. The AP may perform any other additional or alternative functionality.

In one example, a non-access-point (non-AP) station (STA) may include a STA that is not contained within an AP. The non-AP STA may perform any other additional or alternative functionality.

In some demonstrative embodiments, device 102 may include, for example, one or more of a processor 191, an input unit 192, an output unit 193, a memory unit 194, and/or a storage unit 195; and/or device 140 may include, for example, one or more of a processor 181, an input unit 182, an output unit 183, a memory unit 184, and/or a storage unit 185. Devices 102 and/or 140 may optionally include other suitable hardware components and/or software components. In some demonstrative embodiments, some or all of the components of one or more of devices 102 and/or 140 may be enclosed in a common housing or packaging, and may be interconnected or operably associated using one or more wired or wireless links. In other embodiments, components of one or more of devices 102 and/or 140 may be distributed among multiple or separate devices.

In some demonstrative embodiments, processor 191 and/or processor 181 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multipurpose or specific processor or controller. Processor 191 executes instructions, for example, of an Operating System (OS) of device 102 and/or of one or more suitable applications. Processor 181 executes instructions, for example, of an Operating System (OS) of device 140 and/or of one or more suitable applications.

In some demonstrative embodiments, input unit 192 and/or input unit 182 may include, for example, a keyboard, a keypad, a mouse, a touch-screen, a touch-pad, a track-ball, a stylus, a microphone, or other suitable pointing device or input device. Output unit 193 and/or output unit 183 includes, for example, a monitor, a screen, a touch-screen, a flat panel display, a Light Emitting Diode (LED) display unit, a Liquid Crystal Display (LCD) display unit, a plasma display unit, one or more audio speakers or earphones, or other suitable output devices.

In some demonstrative embodiments, memory unit 194 and/or memory unit 184 includes, for example, a Random Access Memory (RAM), a Read Only Memory (ROM), a Dynamic RAM (DRAM), a Synchronous DRAM (SD- RAM), a flash memory, a volatile memory, a non-volatile memory, a cache memory, a buffer, a short term memory unit, a long term memory unit, or other suitable memory units. Storage unit 195 and/or storage unit 185 includes, for example, a hard disk drive, a floppy disk drive, a Compact Disk (CD) drive, a CD-ROM drive, a DVD drive, or other suitable removable or non-removable storage units. Memory unit 194 and/or storage unit 195, for example, may store data processed by device 102. Memory unit 184 and/or storage unit 185, for example, may store data processed by device 140.

In some demonstrative embodiments, wireless communication devices 102 and/or 140 may be capable of communicating content, data, information and/or signals via a wireless medium (WM) 103. In some demonstrative embodiments, wireless medium 103 may include, for example, a radio channel, a cellular channel, a Global Navigation Satellite System (GNSS) Channel, an RF channel, a WiFi channel, an IR channel, a Bluetooth (BT) channel, and the like.

In some demonstrative embodiments, wireless communication medium 103 may include a wireless communication channel over a 6 Gigahertz (GHz) frequency band, a 2.4 GHz frequency band or a 5 GHz frequency band, a millimeterWave (mmWave) frequency band, e.g., a 60 GHz frequency band, a Sub-1 GHz (S1G) band, and/or any other frequency band.

In some demonstrative embodiments, devices 102 and/or 140 may include one or more radios including circuitry and/or logic to perform wireless communication between devices 102, and/or 140 and/or one or more other wireless communication devices. For example, device 102 may include a radio 114, and/or device 140 may include a radio 144.

In some demonstrative embodiments, radios 114 and/or 144 may include one or more wireless receivers (Rx) including circuitry and/or logic to receive wireless communication signals, RF signals, frames, blocks, transmission streams, packets, messages, data items, and/or data. For example, radio 114 may include at least one receiver 116, and/or radio 144 may include at least one receiver 146.

In some demonstrative embodiments, radios 114 and/or 144 may include one or more wireless transmitters (Tx) including circuitry and/or logic to transmit wireless communication signals, RF signals, frames, blocks, transmission streams, packets, messages, data items, and/or data. For example, radio 114 may include at least one transmitter 118, and/or radio 144 may include at least one transmitter 148.

In some demonstrative embodiments, radio 114 and/or radio 144, transmitters 118 and/or 148, and/or receivers 116 and/or 146 may include circuitry; logic; Radio Frequency (RF) elements, circuitry and/or logic; baseband elements, circuitry and/or logic; modulation elements, circuitry and/or logic; demodulation elements, circuitry and/or logic; amplifiers; analog to digital and/or digital to analog converters; filters; and/or the like. For example, radio 114 and/or radio 144 may include or may be implemented as part of a wireless Network Interface Card (NIC), and the like.

In some demonstrative embodiments, radios 114 and/or 144 may be configured to communicate over a 6 GHz band, 2.4 GHz band, a 5 GHz band, an mmWave band, a S1G band, and/or any other band.

In some demonstrative embodiments, radios 114 and/or 144 may include, or may be associated with, one or more antennas 107 and/or 147, respectively.

In one example, device 102 may include a single antenna 107. In another example, device 102 may include two or more antennas 107.

In one example, device 140 may include a single antenna 147. In another example, device 140 may include two or more antennas 147.

Antennas 107 and/or 147 may include any type of antennas suitable for transmitting and/or receiving wireless communication signals, blocks, frames, transmission streams, packets, messages and/or data. For example, antennas 107 and/or 147 may include any suitable configuration, structure and/or arrangement of one or more antenna elements, components, units, assemblies and/or arrays. Antennas 107 and/or 147 may include, for example, antennas suitable for directional communication, e.g., using beamforming techniques. For example, antennas 107 and/or 147 may include a phased array antenna, a multiple element antenna, a set of switched beam antennas, and/or the like. In some embodiments, antennas 107 and/or 147 may implement transmit and receive functionalities using separate transmit and receive antenna elements. In some embodiments, antennas 107 and/or 147 may implement transmit and receive functionalities using common and/or integrated transmit/receive elements.

In some demonstrative embodiments, antennas 107 and/or antennas 147 may be connected to, and/or associated with, one or more Radio Frequency (RF) chains.

In some demonstrative embodiments, device 102 may include one or more, e.g., a plurality of, RF chains 109 connected to, and/or associated with, antennas 107.

In some demonstrative embodiments, one or more of RF chains 109 may be included as part of, and/or implemented as part of one or more elements of radio 114, e.g., as part of transmitter 118 and/or receiver 116.

In some demonstrative embodiments, device 140 may include one or more, e.g., a plurality of, RF chains 149 connected to, and/or associated with, antennas 147.

In some demonstrative embodiments, one or more of RF chains 149 may be included as part of, and/or implemented as part of one or more elements of radio 144, e.g., as part of transmitter 148 and/or receiver 146.

In some demonstrative embodiments, device 102 may include a controller 124, and/or device 140 may include a controller 154. Controller 124 may be configured to perform and/or to trigger, cause, instruct and/or control device 102 to perform, one or more communications, to generate and/or communicate one or more messages and/or transmissions, and/or to perform one or more functionalities, operations and/or procedures between devices 102, 140, and/or one or more other devices; and/or controller 154 may be configured to perform, and/or to trigger, cause, instruct and/or control device 140 to perform, one or more communications, to generate and/or communicate one or more messages and/or transmissions, and/or to perform one or more functionalities, operations and/or procedures between devices 102, 140, and/or one or more other devices, e.g., as described below.

In some demonstrative embodiments, controllers 124 and/or 154 may include, or may be implemented, partially or entirely, by circuitry and/or logic, e.g., one or more processors including circuitry and/or logic, memory circuitry and/or logic, Media-Access Control (MAC) circuitry and/or logic, Physical Layer (PHY) circuitry and/or logic, baseband (BB) circuitry and/or logic, a BB processor, a BB memory, Application Processor (AP) circuitry and/or logic, an AP processor, an AP memory, and/or any other circuitry and/or logic, configured to perform the functionality of controllers 124 and/or 154, respectively. Additionally or alternatively, one or more functionalities of controllers 124 and/or 154 may be implemented by logic, which may be executed by a machine and/or one or more processors, e.g., as described below.

In one example, controller 124 may include circuitry and/or logic, for example, one or more processors including circuitry and/or logic, to cause, trigger and/or control a wireless device, e.g., device 102, and/or a wireless station, e.g., a wireless STA implemented by device 102, to perform one or more operations, communications and/or functionalities, e.g., as described herein. In one example, controller 124 may include at least one memory, e.g., coupled to the one or more processors, which may be configured, for example, to store, e.g., at least temporarily, at least some of the information processed by the one or more processors and/or circuitry, and/or which may be configured to store logic to be utilized by the processors and/or circuitry.

In one example, controller 154 may include circuitry and/or logic, for example, one or more processors including circuitry and/or logic, to cause, trigger and/or control a wireless device, e.g., device 140, and/or a wireless station, e.g., a wireless STA implemented by device 140, to perform one or more operations, communications and/or functionalities, e.g., as described herein. In one example, controller 154 may include at least one memory, e.g., coupled to the one or more processors, which may be configured, for example, to store, e.g., at least temporarily, at least some of the information processed by the one or more processors and/or circuitry, and/or which may be configured to store logic to be utilized by the processors and/or circuitry. In some demonstrative embodiments, at least part of the functionality of controller 124 may be implemented as part of one or more elements of radio 114, and/or at least part of the functionality of controller 154 may be implemented as part of one or more elements of radio 144.

In other embodiments, the functionality of controller 124 may be implemented as part of any other element of device 102, and/or the functionality of controller 154 may be implemented as part of any other element of device 140.

In some demonstrative embodiments, device 102 may include a message processor 128 configured to generate, process and/or access one or more messages communicated by device 102.

In one example, message processor 128 may be configured to generate one or more messages to be transmitted by device 102, and/or message processor 128 may be configured to access and/or to process one or more messages received by device 102, e.g., as described below.

In one example, message processor 128 may include at least one first component configured to generate a message, for example, in the form of a frame, field, information element and/or protocol data unit, for example, a MAC Protocol Data Unit (MPDU); at least one second component configured to convert the message into a PHY Protocol Data Unit (PPDU), e.g., a PHY Layer Convergence Procedure (PLCP) PDU, for example, by processing the message generated by the at least one first component, e.g., by encoding the message, modulating the message and/or performing any other additional or alternative processing of the message; and/or at least one third component configured to cause transmission of the message over a wireless communication medium, e.g., over a wireless communication channel in a wireless communication frequency band, for example, by applying to one or more fields of the PPDU one or more transmit waveforms. In other embodiments, message processor 128 may be configured to perform any other additional or alternative functionality and/or may include any other additional or alternative components to generate and/or process a message to be transmitted. In some demonstrative embodiments, message processors 128 and/or 158 may include, or may be implemented, partially or entirely, by circuitry and/or logic, e.g., one or more processors including circuitry and/or logic, memory circuitry and/or logic, Media-Access Control (MAC) circuitry and/or logic, Physical Layer (PHY) circuitry and/or logic, BB circuitry and/or logic, a BB processor, a BB memory, AP circuitry and/or logic, an AP processor, an AP memory, and/or any other circuitry and/or logic, configured to perform the functionality of message processors 128 and/or 158, respectively. Additionally or alternatively, one or more functionalities of message processors 128 and/or 158 may be implemented by logic, which may be executed by a machine and/or one or more processors, e.g., as described below.

In some demonstrative embodiments, device 140 may include a message processor 158 configured to generate, process and/or access one or more messages communicated by device 140.

In one example, message processor 158 may be configured to generate one or more messages to be transmitted by device 140, and/or message processor 158 may be configured to access and/or to process one or more messages received by device 140, e.g., as described below.

In one example, message processor 158 may include at least one first component configured to generate a message, for example, in the form of a frame, field, information element and/or protocol data unit, for example, a MAC Protocol Data Unit (MPDU); at least one second component configured to convert the message into PHY Protocol Data Unit (PPDU), e.g., a PLCP PDU, for example, by processing the message generated by the at least one first component, e.g., by encoding the message, modulating the message and/or performing any other additional or alternative processing of the message; and/or at least one third component configured to cause transmission of the message over a wireless communication medium, e.g., over a wireless communication channel in a wireless communication frequency band, for example, by applying to one or more fields of the PPDU one or more transmit waveforms. In other embodiments, message processor 158 may be configured to perform any other additional or alternative functionality and/or may include any other additional or alternative components to generate and/or process a message to be transmitted. In some demonstrative embodiments, at least part of the functionality of message processor 128 may be implemented as part of radio 114, and/or at least part of the functionality of message processor 158 may be implemented as part of radio 144.

In some demonstrative embodiments, at least part of the functionality of message processor 128 may be implemented as part of controller 124, and/or at least part of the functionality of message processor 158 may be implemented as part of controller 154.

In other embodiments, the functionality of message processor 128 may be implemented as part of any other element of device 102, and/or the functionality of message processor 158 may be implemented as part of any other element of device 140.

In some demonstrative embodiments, at least part of the functionality of controller 124 and/or message processor 128 may be implemented by an integrated circuit, for example, a chip, e.g., a System on Chip (SoC). In one example, the chip or SoC may be configured to perform one or more functionalities of radio 114. For example, the chip or SoC may include one or more elements of controller 124, one or more elements of message processor 128, and/or one or more elements of radio 114. In one example, controller 124, message processor 128, and radio 114 may be implemented as part of the chip or SoC.

In other embodiments, controller 124, message processor 128 and/or radio 114 may be implemented by one or more additional or alternative elements of device 102.

In some demonstrative embodiments, at least part of the functionality of controller 154 and/or message processor 158 may be implemented by an integrated circuit, for example, a chip, e.g., a SoC. In one example, the chip or SoC may be configured to perform one or more functionalities of radio 144. For example, the chip or SoC may include one or more elements of controller 154, one or more elements of message processor 158, and/or one or more elements of radio 144. In one example, controller 154, message processor 158, and radio 144 may be implemented as part of the chip or SoC.

In other embodiments, controller 154, message processor 158 and/or radio 144 may be implemented by one or more additional or alternative elements of device 140.

In some demonstrative embodiments, device 102 and/or device 140 may include, operate as, perform the role of, and/or perform one or more functionalities of, one or more STAs. For example, device 102 may include at least one STA, and/or device 140.

In some demonstrative embodiments, wireless communication devices 102 and/or 140 may form, or may communicate as part of, a wireless local area network (WLAN).

In some demonstrative embodiments, wireless communication devices 102 and/or 140 may form, or may communicate as part of, a WiFi network.

In other embodiments, wireless communication devices 102 and/or 140 may form, and/or communicate as part of, any other additional or alternative network.

In some demonstrative embodiments device 102 and/or device 140 may be configured to communicate over a 6 GHz wireless network, a 2.4 GHz wireless network, or a 5 GHz wireless network, and/or any other network over any other frequency band.

In some demonstrative embodiments, device 102 and/or device 140 may be configured to operate in accordance with one or more Specifications, for example, including one or more IEEE 802.11 Specifications, e.g., an IEEE 802.11-2016 Specification, an IEEE 802.11ax Specification, and/or any other specification and/or protocol.

In some demonstrative embodiments, device 102 and/or device 140 may be configured to operate over a multiple bands, for example, including two or more bands of the 6 GHz band, the 2.4 GHz band, and/or the 5 GHz band.

Some demonstrative embodiments may enable, for example, to significantly increase the data transmission rates, which may, for example, satisfy growing demand in network capacity for new coming applications.

Some demonstrative embodiments may be implemented, for example, to allow increasing a transmission data rate, e.g., as described below.

In some demonstrative embodiments, device 102 and/or device 140 may implement a communication scheme, which may include Physical Layer (PHY) and/or Media Access Control (MAC) layer schemes, for example, to support one or more applications, and/or increased transmission data rates, e.g., as described below.

In some demonstrative embodiments, the PHY and/or MAC layer schemes may be configured to support a multi-band communication and/or a single band communication, e.g., as described below.

In some demonstrative embodiments, device 102 and/or device 140 may be configured to communicate over an aggregated channel bandwidth, e.g., as described below.

In some demonstrative embodiments, the aggregated channel bandwidth may include, for example, a mechanism and/or an operation whereby two or more channels may be combined, e.g., for a higher bandwidth of packet transmission, for example, to enable achieving higher data rates, e.g., when compared to transmissions over a single channel.

In some demonstrative embodiments, device 102 and/or device 140 may be configured to generate, process, transmit and/or receive a PPDU having a PPDU format, which may be configured, for example, for communication over an aggregated bandwidth (BW), e.g., as described below.

In some demonstrative embodiments, devices 102 and/or 140 may be configured to communicate over the 6 GHz frequency band (also referred to as the "6 GHz mid-band wireless spectrum").

For example, the Federal Communications Commission (FCC) may extend the use of the 6 GHz frequency band, for example, for unlicensed mobile communications, e.g., to meet an increasing wireless spectrum demand.

In some demonstrative embodiments, devices 102 and/or 140 may be configured to communicate over multiple bands, for example, including the 2.4 GHz frequency band, the 5 GHz frequency band and/or the 6 GHz frequency band. This type of communication may be implemented, for example, when the use of the 6 GHz frequency band may be extended to the unlicensed mobile communications.

In some demonstrative embodiments, devices 102 and/or 140 may be configured to communicate over a multi-band aggregation, which may include, for example, a first frequency band and a second frequency band, e.g., the 6 GHz frequency band and the 2.4/5 GHz band.

In some demonstrative embodiments, devices 102 and/or 140 may be equipped with multiple antennas, TX chains, and/or RX chains, which may be configured to operate over the multi-band aggregation.

In some demonstrative embodiments, communicating over the multi-band aggregation, e.g., including the 6 GHz frequency band, may enable devices 102 and/or 140 to support an increased throughput performance, e.g., via multi-band aggregated PPDU transmissions, e.g., as described below.

In some demonstrative embodiments, the multi-band aggregated PPDU transmissions may enable one or more features of next-gen Wi-Fi and/or IEEE 802.11 EHT (Extremely High Throughput).

In some demonstrative embodiments, devices 102 and/or 140 may implement one or more MAC/PHY protocols and/or architectures, for example, to support the multi-band aggregated PPDU transmissions, e.g., as described below.

In some demonstrative embodiments, an architecture of a layer one (PHY) of a transmitter of a multi-band aggregation may be configured to support different transmission configurations, e.g., per each frequency band, for example, since different frequency bands may have one or more different parameters, e.g., available bandwidth (BW), channel condition, and the like.

In one example, a STA may communicate over a multi-band aggregation including a first channel in the 6 GHz frequency band and a second channel in the 5 GHz frequency band. According to this example, if communication over the first channel experiences stronger interference than the second channel, the architecture may be configured to use different modulation and coding schemes (MCS), e.g., lower MCS on the first channel, and/or to decrease the bandwidth for the first channel, e.g., from a BW of 160 MHz to a BW of 80 MHz or lower, for example, in order to increase a Signal to Noise Ratio (SNR) of transmission over the first channel, e.g., using a lower BW transmission.

In some demonstrative embodiments, devices 102 and/or 140 may implement a PHY transmitter baseband architecture, which may be configured to support a layer-1 multi-band aggregation, e.g., using different transmission configurations, for example, different bandwidths, different MCSs and the like, for each frequency band, e.g., as described below.

In some demonstrative embodiments, the PHY transmitter baseband architecture may support multi-band aggregation, which may enable an increased throughput performance, e.g., as described below.

In some demonstrative embodiments, devices 102 and/or 140 may implement a PHY transmitter baseband architecture, which may be configured to support a single-band transmission, e.g., a 6 GHz frequency band transmission, over a channel bandwidth of 320 MHz, e.g., as described below.

In some demonstrative embodiments, transmissions over a non-contiguous 160 MHz channel bandwidth, e.g., including a first 80 MHz channel and a second 80 MHz channel in the 5 GHz frequency band, e.g., in accordance with an IEEE 802.11ac standard, may have one or more disadvantages, e.g., as describe below.

In one example, the transmissions over the non-contiguous 160 MHz channel bandwidth may support using only the same MCS on the first and second 80 MHz channels.

In another example, the transmissions over the non-contiguous 160 MHz channel bandwidth may not support multi-band aggregation.

In some demonstrative embodiments, the PHY transmitter baseband architecture may support a layer-1 multi-band aggregation having different transmission configurations per band, for example, different bandwidth, different MCS and the like, e.g., as describe below.

In some demonstrative embodiments, the PHY transmitter baseband architecture may support a single-band 320 MHz PHY TX baseband architecture, e.g., as describe below.

In some demonstrative embodiments, devices 102 and/or 140 may be configured to communicate an OFDM transmission, e.g., as described below.

In some demonstrative embodiments, device 102 may be configured to transmit the OFDM transmission, and/or device 140 may be configured to receive the OFDM transmission, e.g., as described below.

In some demonstrative embodiments, transmitter 118 may be configured to process and transmit the OFDM transmission, e.g., as described below.

In some demonstrative embodiments, transmitter 118 may include a PHY TX architecture configured to support multi-band aggregation, which may aggregate, for example, two 160 MHz channels from two different bands, e.g., in a non-contiguous allocation, for example, to form a 320 MHz, e.g., 160 MHz+160 MHz, bandwidth PPDU transmission, e.g., as described below.

In some demonstrative embodiments, transmitter 118 may include a PHY TX architecture configured to support a multi-band non-contiguous aggregation, for example, for other BW combinations, e.g., including 80 MHz+80 MHz, 80 MHz+160 MHz, 40 MHz+80 MHz, and/or any other combination, e.g., as described below.

In some demonstrative embodiments, the PHY TX architecture may support different transmission configurations, e.g., bandwidth, MCS and the like, for example, on each band, which may allow, for example, to optimize transmission on each band and/or to allow per-band link adaptation, which may optimize system throughput, e.g., over all bands.

In one example, the PHY TX architecture may support a non-contiguous configuration, which may support non-equal MCS on the different frequencies, e.g., as described below.

In some demonstrative embodiments, the PHY TX architecture may support a 320 MHz transmission, e.g., at a contiguous mode and/or a non-contiguous mode, for a single band, for example, for the 6 GHz frequency band, e.g., as described below.

In some demonstrative embodiments, the PHY TX architecture may enable multi-band aggregation and/or may support different modulation and coding schemes, e.g., to enable a transmitter, e.g., an AP, to optimize one or more transmission parameters, for example, based on channel conditions and the like on each band, e.g., as described below.

In some demonstrative embodiments, the multi-band aggregation may improve throughput performance, for example, in Wi-Fi systems.

In some demonstrative embodiments, two different multi-band PHY TX baseband architectures may be utilized for implementing a PHY TX baseband architecture for multi-band aggregation, e.g., as described below.

In some demonstrative embodiments, each of the two different multi-band PHY TX baseband architectures may include a segment parser (also referred to as a "Multi-band 160 MHz Segment Parser"), for example, to support different modulation and coding on each band, e.g., as described below.

In one example, the segment parser may receive data bits, e.g., from a scrambler, may calculate a total number of data bits per OFDM symbol, and may split the data bits into two 160 MHz segments for each band, e.g., as described below.

In some demonstrative embodiments, transmitter 118 may implement a multi-band PHY TX architecture, e.g., including one of the two architectures described below, for example, for multiband operations, e.g., as described below.

In one example, each of the two multi-band architectures may implement two 160 MHz segments, e.g., 160 MHz+160 MHz. However, the two multi-band architectures may be configured to support other bandwidth mixes as well, e.g., 80 MHz+160 MHz, 40 MHz+80 MHz, and the like.

In some demonstrative embodiments, a first multi-band architecture may utilize a contiguous 160 MHz definition, e.g., for a contiguous 160 MHz channel to be used on each band, e.g., as described below with reference to FIG. 2.

In some demonstrative embodiments, a second multi-band architecture may utilize a non-contiguous channel including a first 80 MHz channel BW and a second 80 MHz channel BW in each band. For example, for each band the 160 MHz channel BW may be split into two non-contiguous 80 MHz channels, e.g., as described below with reference to FIG. 3.

In one example, the second multi-band architecture may be more complicated than the first multi-band architecture, e.g., from an implementation perspective. However, by implementing an improved technology, the second multi-band architecture may be versatile to achieve an increased use of an available spectrum.

In some demonstrative embodiments, the PHY TX architecture may be implemented according to a single-band architecture for operation over a 320 MHz channel bandwidth, e.g., on one band, for example, the 6 GHz frequency band, e.g., as described below.

In some demonstrative embodiments, a first single-band architecture may utilize two 160 MHz contiguous allocations, for example, to be used in separate channels to provide two non-contiguous 160 MHz channels to form a 320 MHz channel, e.g., as described below with reference to FIG. 4.

In some demonstrative embodiments, a second single-band architecture may utilize two continuous 160 MHz channels to form one contiguous 320 MHz channel, e.g., as described below with reference to FIG. 5.

In some demonstrative embodiments, the PHY TX architecture may enable multi-band aggregation and may support different modulation and coding schemes, for example, to enable a transmitter, e.g., an AP, to optimize transmission parameters on each band, for example, based on channel conditions, and the like. These capabilities may enable layer-1, e.g., PHY-layer, multi-band aggregation to improve throughput performance in Wi-Fi systems.

In some demonstrative embodiments, the PHY TX architecture may include a multi-band 160 MHz segment parser, e.g., as described below.

In some demonstrative embodiments, transmitter 118 may include a segment parser 110, e.g., the multi-band 160 MHz segment parser, as described below.

In some demonstrative embodiments, the segment parser 110 may be configured to parse scrambled data bits of a PPDU into a first plurality of data bits and a second plurality of data bits.

In some demonstrative embodiments, the PPDU may be transmitted in an OFDM transmission over an aggregated bandwidth including a first channel in a first frequency band and a second channel in a second frequency band, e.g., as described below.

In some demonstrative embodiment, the first plurality of data bits may be transmitted over the first channel in the first frequency band, e.g., as described below.

In some demonstrative embodiments, the second plurality of data bits may be transmitted over the second channel in the second frequency band, e.g., as described below.

In one example, the multi-band 160 MHz segment parser may split data bits in each multi-band aggregated OFDM symbol to different bands, for example, based on one or more per-band configurations. For example, the multi-band 160 MHz segment parser may be extended, for example, to support various BW combinations, e.g., as described below.

In one example, the multi-band 160 MHz segment parser may group the data bits for transmission on the two bands, e.g., as described below.

In some demonstrative embodiments, transmitter 118 may include a first baseband processing block configured to encode and modulate the first plurality of data bits, for example, according to a first OFDM Modulation and Coding Scheme (MCS) for transmission over the first channel in the first frequency band, e.g., as described below.

In some demonstrative embodiments, transmitter 118 may include a second baseband block configured to encode and modulate the second plurality of data bits, for example, according to a second OFDM MCS for transmission over the second channel in the second frequency band, e.g., as described below.

In some demonstrative embodiments, the segment parser 110 may be configured to determine a first number of data bits per OFDM symbol, for example, based on one or more first parameters corresponding to the first channel in the first frequency band, e.g., as described below.

In some demonstrative embodiments, the segment parser 110 may be configured to determine a second number of data bits per OFDM symbol, for example, based on one or more second parameters corresponding to the second channel in the second frequency band, e.g., as described below.

In some demonstrative embodiments, the segment parser 110 may be configured to parse the scrambled data bits of the PPDU into the first plurality of data bits based on the first number of data bits per OFDM symbol, and to parse the scrambled data bits of the PPDU into the second plurality of data bits based on the second number of data bits per OFDM symbol, e.g., as described below.

In some demonstrative embodiments, the one or more first parameters may include a number of coded bits per subcarrier for the first channel in the first frequency band, a number of OFDM subcarriers for the first channel in the first frequency band, and/or or a coding rate for the first channel in the first frequency band, e.g., as described below.

In other embodiments, the one or more first parameters may include any other parameters, e.g., as described below.

In some demonstrative embodiments, the one or more second parameters may include a number of coded bits per subcarrier for the second channel in the second frequency band, a number of OFDM subcarriers for the second channel in the second frequency band, and/or a coding rate for the second channel in the second frequency band, e.g., as described below.

In other embodiments, the one or more second parameters may include any other parameters, e.g., as described below.

In some demonstrative embodiments, the segment parser 110 may be configured to determine a total number of scrambled data bits per OFDM symbol to be transmitted over the aggregated bandwidth, for example, based on the first number of data bits per OFDM symbol and the second number of data bits per OFDM symbol, e.g., as described below.

In some demonstrative embodiments, the segment parser 110 may be configured to group the scrambled data bits of the PPDU into a plurality of data bit groups, e.g., as described below.

In some demonstrative embodiments, a group of the plurality of data bit groups may include the total number of scrambled data bits per OFDM symbol, e.g., as described below.

In some demonstrative embodiments, the segment parser 110 may be configured to parse the group into the first plurality of data bits and the second plurality of data bits, e.g., as described below.

In some demonstrative embodiments, the segment parser 110, e.g., the "Multi-band 160 MHz Segment Parser", may separate the data bits of the OFDM symbol into two 160 MHz sub-blocks for each band, e.g., the first and second baseband blocks.

In some demonstrative embodiments, the segment parser described herein may provide one or more technical advantages, e.g., compared to "an IEEE802.11ac Segment Parser", e.g. a segment parser in accordance with the IEEE802.11ac Specification. For example, the segment parser described herein may support different coding and modulation on each band, and/or may split the data bits of the OFDM symbol before encoding, e.g., as described below.

In some demonstrative embodiments, the segment parser 110 may receive, e.g., from a scrambler, output data bits of the OFDM symbol and may group them, for example, for each multi-band aggregation OFDM symbol, e.g., as described below.

In some demonstrative embodiments, the segment parser 110 may calculate a total number of data bits for each OFDM symbol, denoted as "$N_{DBPS}$", e.g., as follows:

$$N_{DBPS} = \Sigma_i N_{DBPS} 1 \tag{1}$$

wherein $N_{DBPS}$ denotes a number of data bits per symbol for an i-th band, denoted "i".

In some demonstrative embodiments, the number of data bits per symbol $N_{DBPS,i}$ may be determined, e.g., as follows:

$$N_{DBPS,i} = \frac{N_{BPSC,i} \times N_{SC,i}}{R_i} \quad (2)$$

wherein $N_{BPSC,i}$ denotes a number of coded bits per symbol per subcarrier on the band i, $N_{SC,i}$ denotes the number of OFDM subcarriers on the band i, and $R_i$ denotes a coding rate on the band i.

In other embodiments, the number of data bits per symbol $N_{DBPS,i}$ may be determined, for example, according to any other calculation and/or using any other criteria.

In some demonstrative embodiments, once the segment parser 110 groups the data bits per OFDM symbol, the segment parser 110 may split the data bits to each band, for example, by sending $N_{DBPS,i}$ bits to the band i.

In one example, the segment parser 110 may use a simple block-wise round robin algorithm, for example, for splitting of the data bits. For example, the segment parser 110 may send the first $N_{DBPS,0}$ data bits to band 0, the next $N_{DBPS,1}$ bits data bits to band 1, and so on.

In another example, the segment parser 110 may use any other algorithm, for example, to split the data bits. For example, the segment parser 110 may split the data bits based on any other metric, and/or the segment parser 110 may divide the data bits into two contiguous blocks, and may send each block to each of the bands.

In some demonstrative embodiments, once the data bits are split into two different bands, the data bits may be encoded and modulated using an MCS, e.g., assigned to each band.

In some demonstrative embodiments, one or more transmission parameters of the data bits may be determined, for example, in a MAC processor, e.g., controller 124.

In some demonstrative embodiments, the MAC processor may send to the PHY layer configuration information, e.g., the one or more transmission parameters, for example, as a part of a TXVECTOR element or a TRIGVECTOR element.

In other embodiments, the MAC processor may send the configuration information to the PHY layer using any other method and/or as part of any other element.

In one example, an MCS to be used on a band may be determined, for example, based on link quality indicators on each band, e.g., a received signal strength indicator (RSSI), a Signal to Noise (SNR) indicator, a Block Error Rate (BLER) indicator and the like, and/or based on band congestion or availability.

In other embodiments, any other method, parameters, indicators, metrics and/or mechanism may be used to determine the MCS.

In some demonstrative embodiments, transmission configuration for each band, e.g., the one or more transmission parameters, may be indicated in a signaling field in a PHY preamble, e.g., a High Efficiency (HE) SIG-A PHY preamble, e.g., in accordance with an IEEE802.11ax Specification.

In some demonstrative embodiments, a signaling field may be defined for a 20 MHz bandwidth and may be duplicated on each band. The signaling field may indicate transmission configurations per band, e.g., BW, MCS, and the like.

In other embodiments, any other signaling may be defined. For example, separate signaling fields may be defined per band, e.g., to enable asynchronous multi-band aggregation.

In some demonstrative embodiments, the PHY TX architecture may be extended to support different bandwidths on different bands, e.g., 80 MHz on the 5 GHz band and 160 MHz on the 6 GHz band. According to this example, the number of OFDM subcarriers on the band $N_{SC,i}$ may be different for each band, for example, depending on the bandwidth.

In some demonstrative embodiments, transmitter 118 may be configured to transmit the PPDU in an OFDM transmission over an aggregated bandwidth including a first channel in a first frequency band and a second channel in a second frequency band, e.g., as described below.

In some demonstrative embodiments, the first channel may include a first aggregated channel including an aggregation of a first channel bandwidth in the first frequency band and a second channel bandwidth in the first frequency band, and the second channel may include a second aggregated channel including an aggregation of a first channel bandwidth in the second frequency band and a second channel bandwidth in the second frequency band, e.g., as described below.

In some demonstrative embodiments, the first baseband processing block may include a first encoder to encode the first plurality of data bits into a first plurality of encoded data bits, and a first stream parser to parse the first plurality of encoded data bits into a first plurality of spatial streams, e.g., as described below.

In some demonstrative embodiments, the second baseband processing block may include a second encoder to encode the second plurality of data bits into a second plurality of encoded data bits, and a second stream parser to parse the second plurality of encoded data bits into a second plurality of spatial streams, e.g., as described below.

In some demonstrative embodiments, the first encoder may include a first Binary Convolutional Code (BCC) encoder, and the second encoder may include a second BCC encoder.

In other embodiments, the first and/or second encoders may include any other encoder.

In some demonstrative embodiments, the first aggregated channel may include a 160 MHz channel, the second aggregated channel may include a 160 Megahertz channel, the first channel bandwidth in the first frequency band may include a first 80 MHz channel bandwidth, the second channel bandwidth in the first frequency band may include a second 80 MHz channel bandwidth, the first channel bandwidth in the second frequency band may include a third 80 MHz channel bandwidth, and the second channel bandwidth in the second frequency band may include a fourth 80 MHz channel bandwidth, e.g., as described below.

In some demonstrative embodiments, the first channel bandwidth in the first frequency band may be contiguous to the second channel bandwidth in the first frequency band first, and the first channel bandwidth in the second frequency band may be contiguous to the second channel bandwidth in the second frequency band, e.g., as described below.

In some demonstrative embodiments, the first channel bandwidth in the first frequency band may be non-contiguous to the second channel bandwidth in the first frequency band, and the first channel bandwidth in the second frequency band may be non-contiguous to the second channel bandwidth in the second frequency band, e.g., as described below.

In some demonstrative embodiments, the first channel may include a first 160 Mhz channel, 80 MHz channel or 40 MHz channel, and/or the second channel may include a second 160 Mhz channel, 80 MHz channel or 40 MHz channel, e.g., as described below.

In some demonstrative embodiments, the aggregated bandwidth may include a wide channel BW of at least 160 MHz, the wide channel BW may cover at least first and second consecutive 80 MHz channel BWs, e.g., as described below.

In some demonstrative embodiments, transmitter 118 may be configured to transmit the PPDU over the wide channel BW according to a tone plan including a wide resource unit (RU) including at least 1992 tones, e.g., as described below.

In some demonstrative embodiments, the tone plan may include 996 tones of the first 80 MHz channel BW assigned to a first portion of the wide RU, 996 tones of the second 80 MHz channel BW assigned to a second portion of the wide RU, and a Direct Current (DC) portion between the first and second portions of the wide RU including a plurality of guard tones that separate between the first and second 80 MHz channel BWs, e.g., as described below.

In some demonstrative embodiments, the first frequency band may include a 6 Gigahertz (GHz) wireless frequency band, and the second frequency band may include a 5 GHz wireless frequency band or a 2.4 GHz wireless frequency band.

In some demonstrative embodiments, transmitter 118 may include a first PHY TX architecture, which may be configured to transmit the PPDU over the aggregated bandwidth including a multi-band 320 Megahertz (MHz) channel, for example, a non-contiguous 320 MHz channel.

In some demonstrative embodiments, the first PHY TX architecture may be configured to support transmission over a first channel including a first 160 MHz channel, and a second channel including a second 160 MHz channel.

In other embodiments, any other combination of the first and second channels may be implemented. For example, the first channel may include a first 160 MHz channel, 80 MHz channel or 40 MHz channel, and the second channel may include a second 160 MHz channel, 80 MHz channel or 40 MHz channel.

In some demonstrative embodiments, the first PHY TX architecture may be configured to support an implementation in which the first channel bandwidth in the first frequency band is contiguous to the second channel bandwidth in the first frequency band first, and the first channel bandwidth in the second frequency band is contiguous to the second channel bandwidth in the second frequency band, e.g., according to the first PHY TX architecture.

In some demonstrative embodiments, the first frequency band may include a 6 Gigahertz (GHz) wireless frequency band, and the second frequency band may include a 5 GHz wireless frequency band or a 2.4 GHz wireless frequency band.

Figure 2:
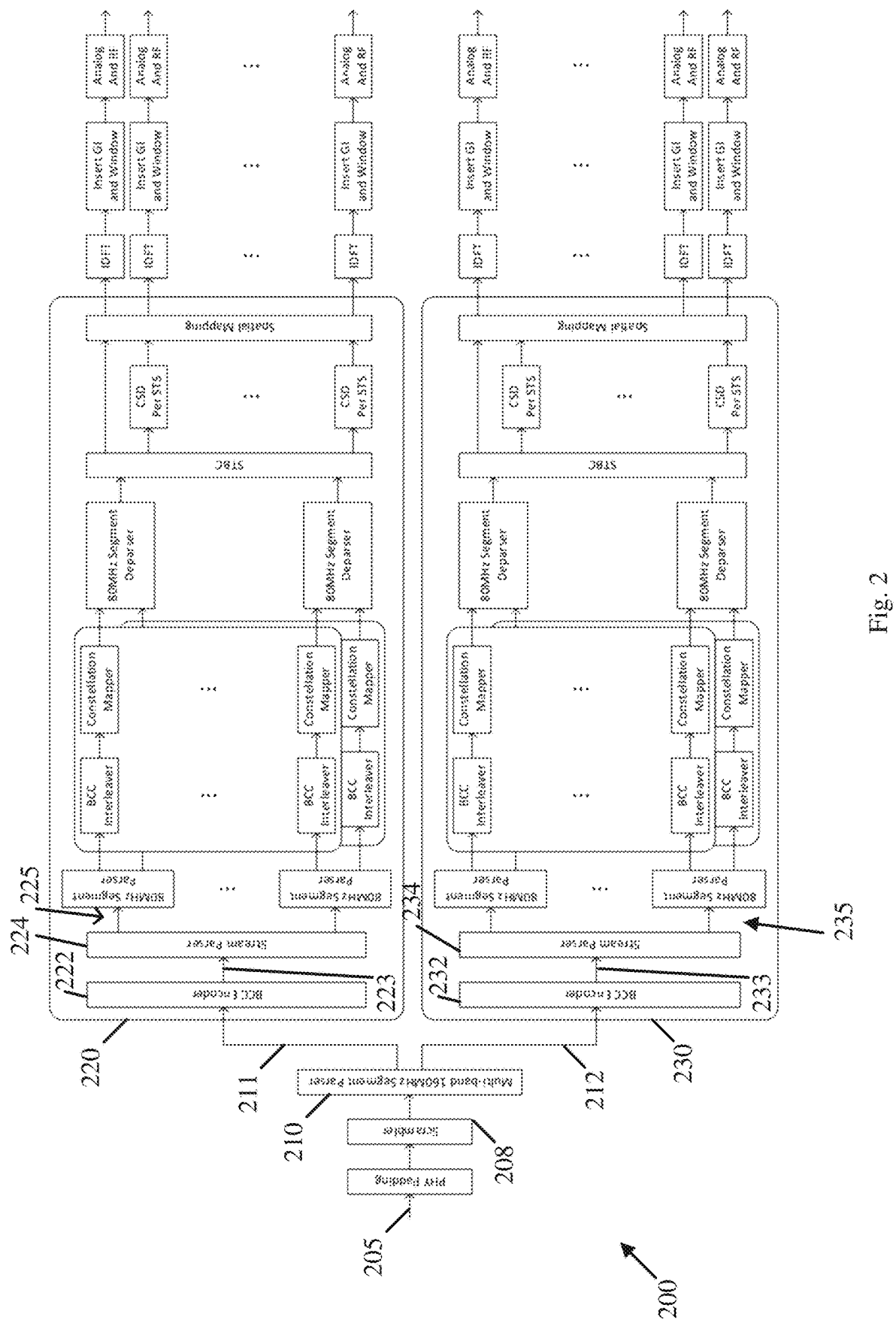
FIG. 2 is a schematic illustration of an architecture of a transmitter, in accordance with some demonstrative embodiments.

Reference is made to FIG. 2, which schematically illustrates an architecture of a transmitter 200, in accordance with some demonstrative embodiments. For example, transmitter 200 may perform the role of, one or more operations, and/or the functionality of transmitter 118 (FIG. 1).

In some demonstrative embodiments, transmitter 118 (FIG. 1) may include one or more elements and/or components of transmitter 200.

In some demonstrative embodiments, transmitter 200 may be configured according to the first PHY TX architecture.

In one example, the architecture of transmitter 200 may be configured to support multi-band non-contiguous 320 MHz transmission, e.g., a contiguous 160 MHz channel on the 5 GHz wireless frequency band, and a contiguous 160 MHz channel on the 6 GHz wireless frequency band. For example, the 160 MHz channel, e.g., in each band, may be contiguous, e.g., as described below.

In some demonstrative embodiments, as shown in FIG. 2, transmitter 200 may include a scrambler 208 to scramble data bits of a PPDU 205 to be transmitted in an OFDM transmission.

In some demonstrative embodiments, the OFDM transmission may be over an aggregated bandwidth including a first channel in a first frequency band, e.g., the 6 GHz wireless frequency band or any other band, and a second channel in a second frequency band, e.g., the 5 GHz wireless frequency band or the 2.4 GHz wireless frequency band or any other band.

In some demonstrative embodiments, as shown in FIG. 2, transmitter 200 may include a segment parser 210 to parse scrambled data bits of PPDU 205 into a first plurality of data bits 211 and a second plurality of data bits 212. For example, segment parser 210 may perform the role of, one or more operations, and/or the functionality of segment parser 110 (FIG. 1).

In some demonstrative embodiments, as shown in FIG. 2, transmitter 200 may include a first baseband processing block 220 to encode and modulate the first plurality of data bits 211, for example, according to a first OFDM MCS for transmission over the first channel in the first frequency band.

In some demonstrative embodiments, as shown in FIG. 2, transmitter 200 may include a second baseband processing block 230 to encode and modulate the second plurality of data bits 212, for example, according to a second OFDM MCS for transmission over the second channel in the second frequency band.

In some demonstrative embodiments, as shown in FIG. 2, the first baseband processing block 220 may include a first encoder 222 to encode the first plurality of data bits 211 into a first plurality of encoded data bits 223, and a first stream parser 224 to parse the first plurality of encoded data bits 223 into a first plurality of spatial streams 225.

In some demonstrative embodiments, as shown in FIG. 2, the second baseband processing block 230 may include a second encoder 232 to encode the second plurality of data bits 212 into a second plurality of encoded data bits 233, and a second stream parser 234 to parse the second plurality of encoded data bits 233 into a second plurality of spatial streams 235.

In some demonstrative embodiments, as shown in FIG. 2, the first baseband processing block 220, and/or the second baseband processing block 230 may include one or more elements configured to process a 80 MHz+80 MHz transmission, for example, in accordance with an IEEE 802.11 Specification and/or any other Specification.

Referring back to FIG. 1, in some demonstrative embodiments, transmitter 118 may include a second PHY TX architecture, which may be configured to transmit the PPDU over the aggregated bandwidth may include a multi-band 320 Megahertz (MHz) channel, for example, a non-contiguous 320 MHz channel.

In some demonstrative embodiments, the first PHY TX architecture may be configured to support transmission over a first channel including a first 160 MHz channel, and a second channel may including a second 160 MHz channel.

In other embodiments, any other combination of the first and second channels may be implemented. For example, the first channel may include a first 160 MHz channel, 80 MHz channel or 40 MHz channel, and the second channel may include a second 160 MHz channel, 80 MHz channel or 40 MHz channel.

In some demonstrative embodiments, the first PHY TX architecture may be configured to support an implementation in which the first channel bandwidth in the first frequency band is non-contiguous to the second channel bandwidth in the first frequency band first, and the first channel bandwidth in the second frequency band is non-contiguous to the second channel bandwidth in the second frequency band.

In some demonstrative embodiments, the first frequency band may include the 6 GHz wireless frequency band, and the second frequency band may include the 5 GHz wireless frequency band or the 2.4 GHz wireless frequency band.

Figure 3:
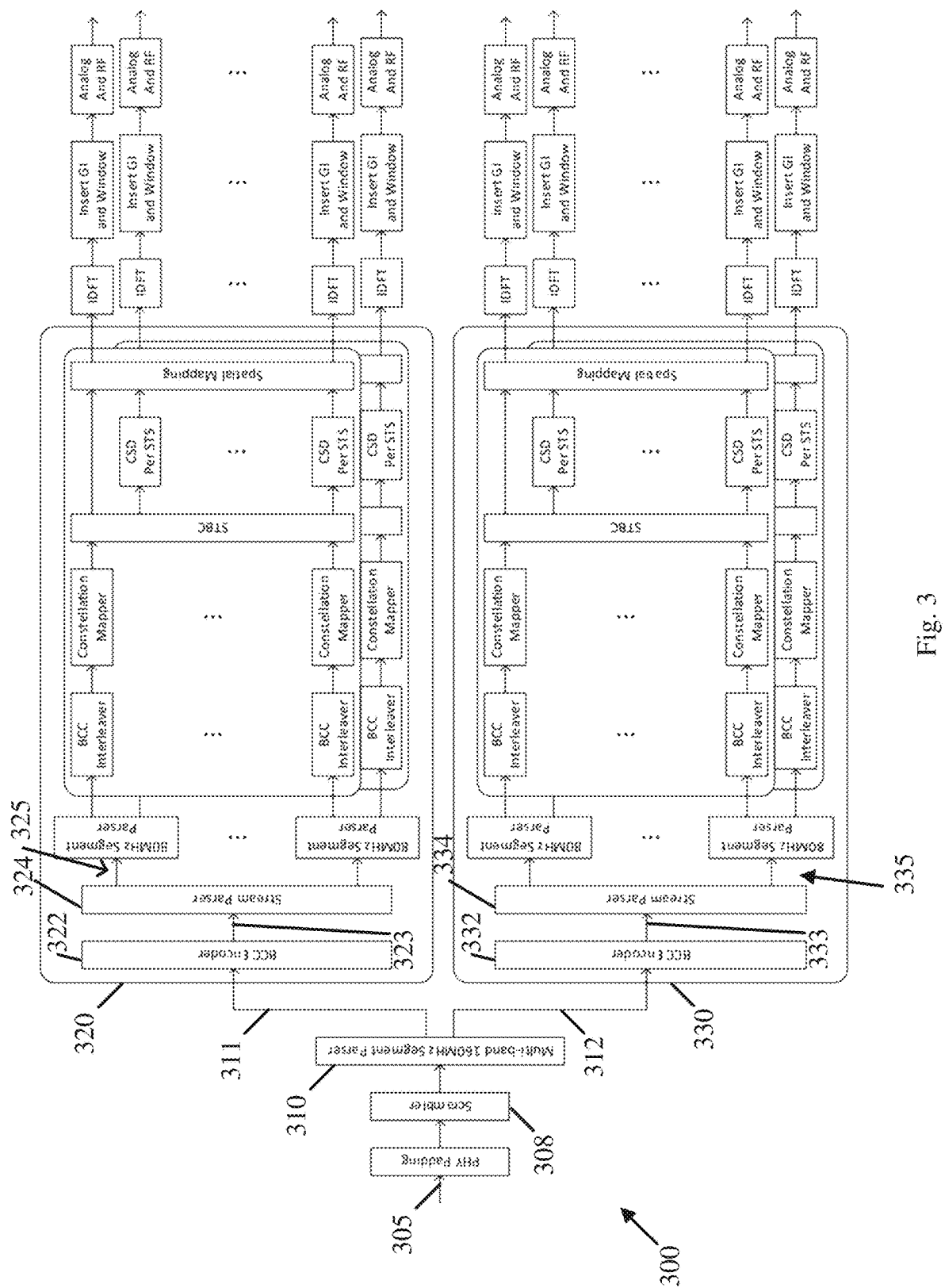
FIG. 3 is a schematic illustration of an architecture of a transmitter, in accordance with some demonstrative embodiments.

Reference is made to FIG. 3, which schematically illustrates an architecture of a transmitter 300, in accordance with some demonstrative embodiments. For example, transmitter 300 may perform the role of, one or more operations, and/or the functionality of transmitter 118 (FIG. 1).

In some demonstrative embodiments, transmitter 118 (FIG. 1) may include one or more elements and/or components of transmitter 300.

In some demonstrative embodiments, transmitter 300 may be configured according to the second PHY TX architecture.

In one example, the architecture of transmitter 300 may be configured to support multi-band non-contiguous 320 MHz transmission, e.g., a non-contiguous 160 MHz channel on the 5 GHz wireless frequency band, and a non-contiguous 160 MHz channel on the 6 GHz wireless frequency band. In each band, the 160 MHz channel may be non-contiguous, for example, 160 MHz=80 MHz+80 MHz, e.g., as described below.

In some demonstrative embodiments, as shown in FIG. 3, transmitter 300 may include a scrambler 308 to scramble data bits of a PPDU 305 to be transmitted in an OFDM transmission.

In some demonstrative embodiments, the OFDM transmission may be over an aggregated bandwidth including a first channel in a first frequency band, e.g., the 6 GHz wireless frequency band or any other band, and a second channel in a second frequency band, e.g., the 5 GHz wireless frequency band, the 2.4 GHz wireless frequency band, or any other band.

In some demonstrative embodiments, as shown in FIG. 3, transmitter 300 may include a segment parser 310 to parse scrambled data bits of PPDU 305 into a first plurality of data bits 311 and a second plurality of data bits 312. For example, segment parser 310 may perform the role of, one or more operations, and/or the functionality of segment parser 110 (FIG. 1).

In some demonstrative embodiments, as shown in FIG. 3, transmitter 300 may include a first baseband processing block 320 to encode and modulate the first plurality of data bits 311 according to a first OFDM MCS for transmission over the first channel in the first frequency band.

In some demonstrative embodiments, as shown in FIG. 3, transmitter 300 may include a second baseband processing block 330 to encode and modulate the second plurality of data bits 312 according to a second OFDM MCS for transmission over the second channel in the second frequency band.

In some demonstrative embodiments, as shown in FIG. 3, the first baseband processing block 320 may include a first encoder 322 to encode the first plurality of data bits 311 into a first plurality of encoded data bits 323, and a first stream parser 324 to parse the first plurality of encoded data bits 323 into a first plurality of spatial streams 325.

In some demonstrative embodiments, as shown in FIG. 3, the second baseband processing block 330 may include a second encoder 332 to encode the second plurality of data bits 312 into a second plurality of encoded data bits 333, and a second stream parser 334 to parse the second plurality of encoded data bits 333 into a second plurality of spatial streams 335.

In some demonstrative embodiments, as shown in FIG. 3, the first baseband processing block 320, and/or the second baseband processing block 330 may include one or more elements configured to process a 80 MHz+80 MHz transmission, for example, in accordance with an IEEE 802.11 Specification and/or any other Specification.

Referring back to FIG. 1, in some demonstrative embodiments, transmitter 118 may include a third PHY TX architecture, which may be configured to transmit the PPDU over an aggregated bandwidth including a single-band 320 Megahertz (MHz) channel, for example, a non-contiguous 320 MHz channel.

In some demonstrative embodiments, the third PHY TX architecture may be configured to support transmission over a first channel including a first 160 MHz channel, and a second channel including a second 160 MHz channel.

In some demonstrative embodiments, the single-band 320 MHz channel may include a 6 GHz wireless frequency band 320 MHz channel.

In some demonstrative embodiments, the first channel in the first frequency band may include a first channel in the 6 GHz wireless frequency band, and the second channel in the second frequency band may include a second channel in the 6 GHz wireless frequency band.

In some demonstrative embodiments, the third PHY TX architecture may be configured to support an implementation in which the first channel bandwidth in the first frequency band is contiguous to the second channel bandwidth in the first frequency band first, and the first channel bandwidth in the second frequency band is contiguous to the second channel bandwidth in the second frequency band.

Figure 4:
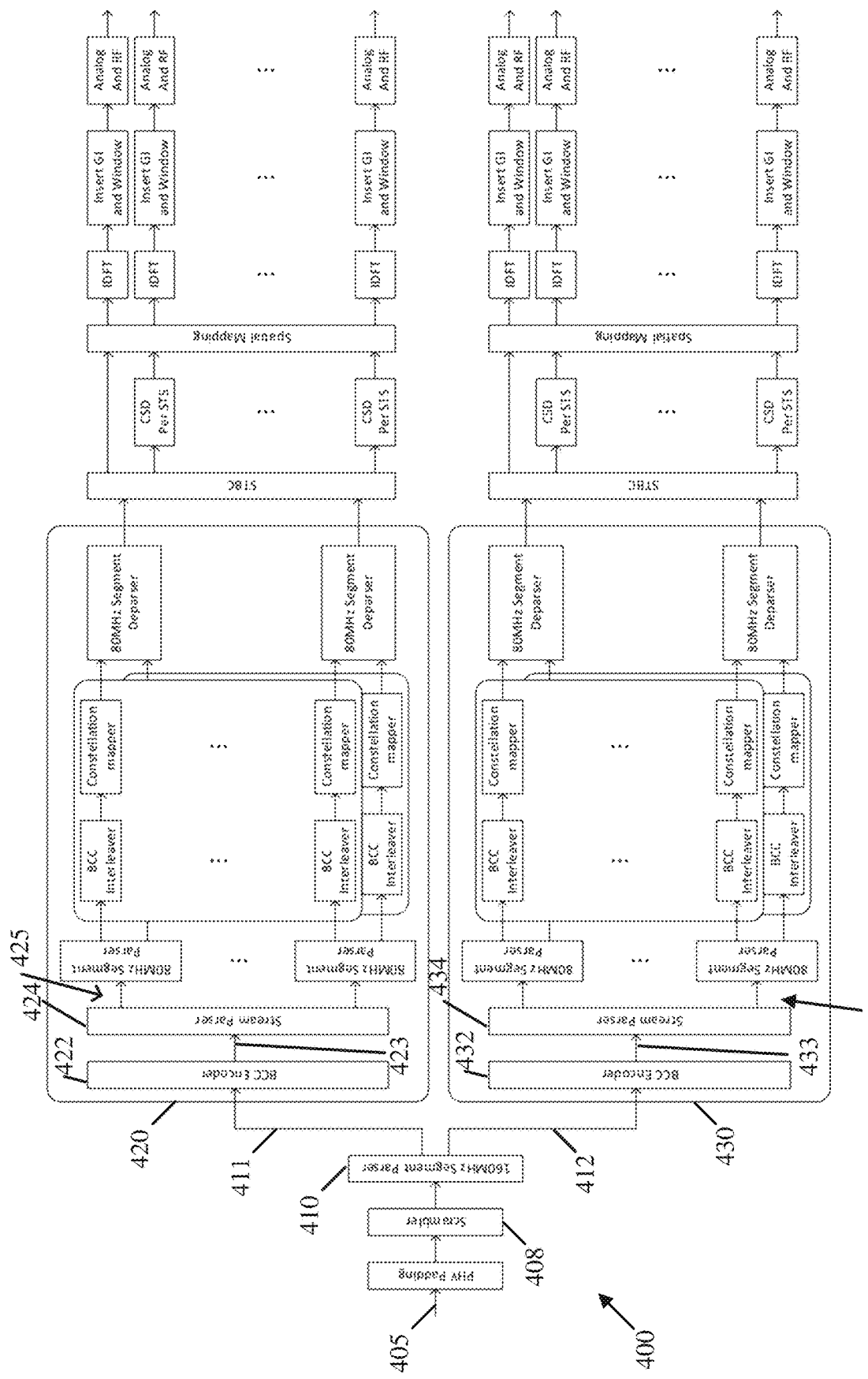
FIG. 4 is a schematic illustration of an architecture of a transmitter, in accordance with some demonstrative embodiments.

Reference is made to FIG. 4, which schematically illustrates an architecture of a transmitter 400, in accordance with some demonstrative embodiments. For example, transmitter 400 may perform the role of, one or more operations, and/or the functionality of transmitter 118 (FIG. 1).

In some demonstrative embodiments, transmitter 118 (FIG. 1) may include one or more elements and/or components of transmitter 400.

In some demonstrative embodiments, transmitter 400 may be configured according to the third PHY TX architecture.

In one example, the architecture of transmitter 400 may be configured to support single-band non-contiguous 320 MHz transmission, e.g., two contiguous 160 MHz channels of the 6 GHz wireless frequency band, e.g., as described below.

In some demonstrative embodiments, as shown in FIG. 4, transmitter 400 may include a scrambler 408 to scramble data bits of a PPDU 405 to be transmitted in an OFDM transmission.

In some demonstrative embodiments, the OFDM transmission may be over an aggregated bandwidth including a first channel and a second channel in the 6 GHz wireless frequency band.

In some demonstrative embodiments, as shown in FIG. 4, transmitter 400 may include a segment parser 410 to parse scrambled data bits of PPDU 405 into a first plurality of data bits 411 and a second plurality of data bits 412. For example, segment parser 410 may perform the role of, one or more operations, and/or the functionality of segment parser 110 (FIG. 1).

In one example, segment parser 410 may split data bits per OFDM symbol into two 160 MHz segments.

In some demonstrative embodiments, a design of segment parser 410 may be similar to the design of segment parser 310 (FIG. 3), for example, assuming that the coding rate Ri and number of coded bits per symbol per subcarrier $N_{BPSC,i}$ are the same for both of the 160 MHz blocks.

In some demonstrative embodiments, as shown in FIG. 4, transmitter 400 may include a first baseband processing block 420 to encode and modulate the first plurality of data bits 411 according to a first OFDM MCS for transmission over the first channel in the 6 GHz wireless frequency band.

In some demonstrative embodiments, as shown in FIG. 4, transmitter 400 may include a second baseband processing block 430 to encode and modulate the second plurality of data bits 412 according to a second OFDM MCS for transmission over the second channel in the 6 GHz wireless frequency band.

In one example, each allocation may use the same MCS.

In another example, if deemed necessary each allocation may support a different MCS.

In some demonstrative embodiments, as shown in FIG. 4, the first baseband processing block 420 may include a first encoder 422 to encode the first plurality of data bits 411 into a first plurality of encoded data bits 423, and a first stream parser 424 to parse the first plurality of encoded data bits 423 into a first plurality of spatial streams 425.

In some demonstrative embodiments, as shown in FIG. 4, the second baseband processing block 430 may include a second encoder 432 to encode the second plurality of data bits 412 into a second plurality of encoded data bits 433, and a second stream parser 434 to parse the second plurality of encoded data bits 433 into a second plurality of spatial streams 435.

In some demonstrative embodiments, as shown in FIG. 4, the first baseband processing block 420, and/or the second baseband processing block 430 may include one or more elements configured to process a 80 MHz+80 MHz transmission, for example, in accordance with an IEEE 802.11 Specification and/or any other Specification.

Referring back to FIG. 1, in some demonstrative embodiments, transmitter 118 may include a fourth PHY TX architecture which may be configured to transmit the PPDU over the aggregated bandwidth including a single-band 320 Megahertz (MHz) channel, for example, a contiguous 320 MHz channel.

In some demonstrative embodiments, the fourth PHY TX architecture may be configured to support transmission over the single-band 320 MHz channel including a 6 GHz wireless frequency band 320 MHz channel including two contiguous 160 MHz blocks, e.g., as described below.

In some demonstrative embodiments, the fourth PHY TX architecture may be configured to support transmission of the PPDU in an OFDM transmission over a 320 Megahertz (MHz) aggregated bandwidth (BW) including first and second contiguous 160 MHz channels in a 6 Gigahertz (GHz) frequency band, e.g., as described below.

In some demonstrative embodiments, the first 160 MHz channel in the 6 GHz frequency band may include a first aggregated channel including an aggregation of a first 80 MHz channel BW and a second 80 MHz channel BW, and the second 160 MHz channel in the 6 GHz frequency band may include a second aggregated channel including an aggregation of a third 80 MHz channel BW and a fourth 80 MHz channel BW.

In some demonstrative embodiments, transmitter 118 (FIG. 1) may be configured to transmit the PPDU over the aggregated bandwidth according to a tone plan including a wide resource unit (RU) including at least 3984 tones, e.g., as described below.

Figure 5:
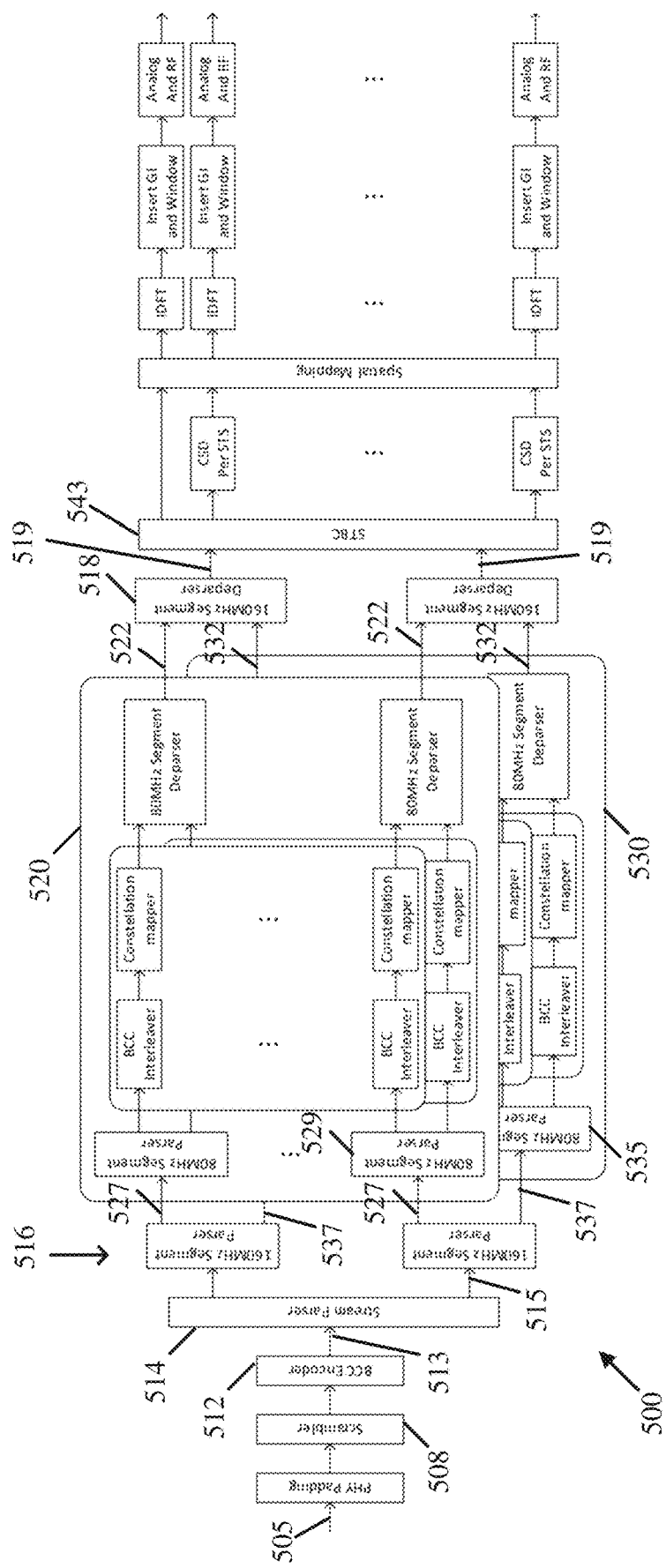
FIG. 5 is a schematic illustration of an architecture of a transmitter, in accordance with some demonstrative embodiments.

In some demonstrative embodiments, the tone plan may include 996 tones of the first 80 MHz channel BW assigned to a first portion of the wide RU, 996 tones of the second 80 MHz channel BW assigned to a second portion of the wide RU, 996 tones of the third 80 MHz channel BW assigned to a third portion of the wide RU, 996 tones of the fourth 80 MHz channel BW assigned to a fourth portion of the wide RU, and a Direct Current (DC) portion between the second and third portions of the wide RU including a plurality of guard tones that separate between the second and third 80 MHz channel BWs, e.g., as described below Reference is made to FIG. 5, which schematically illustrates an architecture of a transmitter 500, in accordance with some demonstrative embodiments. For example, transmitter 500 may perform the role of, one or more operations, and/or the functionality of transmitter 118 (FIG. 1).

In some demonstrative embodiments, transmitter 118 (FIG. 1) may include one or more elements and/or components of transmitter 500.

In some demonstrative embodiments, transmitter 500 may be configured according to the fourth PHY TX architecture.

In one example, the architecture of transmitter 500 may be configured to support single-band contiguous 320 MHz transmission, e.g., two contiguous 160 MHz channels of the 6 GHz wireless frequency band or any other band, e.g., as described below.

In some demonstrative embodiments, as shown in FIG. 5, transmitter 500 may include a scrambler 508 to scramble data bits of a PPDU 505 to be transmitted in an OFDM transmission.

In some demonstrative embodiments, the OFDM transmission may be over an aggregated 320 MHz bandwidth including a first channel and a second channel in the 6 GHz wireless frequency band.

In some demonstrative embodiments, the PPDU 505 may be transmitted in an OFDM transmission over the 320 MHz aggregated bandwidth including first and second contiguous 160 MHz channels in the 6 GHz frequency band.

In some demonstrative embodiments, the first 160 MHz channel in the 6 GHz frequency band may include a first aggregated channel including an aggregation of a first 80 MHz channel bandwidth and a second 80 MHz channel bandwidth, and the second 160 MHz channel in the 6 GHz frequency band may include a second aggregated channel including an aggregation of a third 80 MHz channel bandwidth and a fourth 80 MHz channel bandwidth.

In some demonstrative embodiments, as shown in FIG. 5, transmitter 500 may include an encoder 512 to encode scrambled data bits of a PPDU 505 into encoded data bits 513.

In some demonstrative embodiments, as shown in FIG. 5, transmitter 500 may include a stream parser 514 to parse the encoded data bits 513 of the PPDU 505 into a plurality of data streams 515.

In some demonstrative embodiments, as shown in FIG. 5, transmitter 500 may include a plurality of 160 MHz segment parsers 516 to parse the plurality of data streams 515 into a first plurality 527 of 80 MHz frequency blocks and second plurality 537 of 80 MHz frequency blocks.

In some demonstrative embodiments, a 160 MHz segment parser 516 of the plurality of segment parsers 516 may be configured to parse a respective data stream 515 of the plurality of data streams 515 into a first 80 MHz frequency block 529 of the first plurality of 80 MHz frequency blocks 527, and into a second 80 MHz frequency block 535 of the second plurality of 80 MHz frequency blocks 537.

In some demonstrative embodiments, as shown in FIG. 5, transmitter 500 may include a first baseband processing block 520 to process the first plurality of 80 MHz frequency blocks 527.

In some demonstrative embodiments, as shown in FIG. 5, transmitter 500 may include a second baseband processing block 530 to process the second plurality of 80 MHz frequency blocks 537.

In some demonstrative embodiments, as shown in FIG. 5, the first baseband processing block 520, and/or the second baseband processing block 530 may include one or more elements configured to process a 80 MHz+80 MHz transmission, for example, in accordance with an IEEE 802.11 Specification and/or any other Specification.

In some demonstrative embodiments, as shown in FIG. 5, transmitter 500 may include a plurality of 160 MHz segment deparsers 518 configured to deparse a plurality of first outputs 522 of the first baseband processing block 520 and a plurality of second outputs 532 of the second baseband processing block 530 into a plurality of 160 MHz frequency segments 519.

In some demonstrative embodiments, a 160 MHz segment deparser of the plurality of 160 MHz segment deparsers 518 to deparse a first output 522 of the plurality of first outputs of the first baseband processing block 520 and a second output 532 of the plurality of second outputs 532 of the second baseband processing block 530 into a 160 MHz frequency segment 519 of the plurality of 160 MHz frequency segments 519.

In some demonstrative embodiments, as shown in FIG. 5, transmitter 500 may include a Space Time Block Code (STBC) encoder 543 to encode the plurality of 160 MHz frequency segments 519 according to an STBC encoding scheme.

In some demonstrative embodiments, it may be assumed that the same coding and modulation is used for the entire 320 MHz channel and segment parsers 516 may be placed after encoder 512 and stream parser 514.

Referring back to FIG. 1, in some demonstrative embodiments, devices 102 and 140 may communicate a PPDU over a wide channel bandwidth (BW) according to a tone plan, e.g., as described below.

In some demonstrative embodiments, devices 102 and 140 may be configured to support communication over a 80 MHz channel bandwidth and to optionally support communication over a 160 MHz channel bandwidth, e.g., in accordance with an IEEE802.11ax Specification.

In some demonstrative embodiments, the 160 MHz channel bandwidth may include two 80 MHz baseband signals, for example, to be generated, e.g., instead of, a real continuous 160 MHz baseband signal.

In some demonstrative embodiments, there may be only one 160 MHz frequency band in the US and two in Europe, e.g., in the 5 GHz wireless frequency band.

In some demonstrative embodiments, there may be eight 160 MHz frequency bands, e.g., four 320 MHz frequency band, in the US, and/or four 160 MHz frequency bands, e.g., two 320 MHzz frequency band, in Europe, for example, in the 6 GHz wireless frequency band.

In some demonstrative embodiments, there may be a high probability to support 160 MHz baseband signal processing and/or even 320 MHz baseband signal processing in WiFi systems, e.g., resulting from an improvement in the hardware processing capability.

In some demonstrative embodiments, devices 102 and/or 140 may communicate PPDUs according to a tone plan for a wide channel BW, for example, 160 MHz channel BW and/or 320 MHz channel BW, e.g., as described below.

In some demonstrative embodiments, devices 102 and/or 140 may communicate PPDUs using resource units (RUs) having a size which is greater than a predefine size, e.g., as described below.

In some demonstrative embodiments, devices 102 and/or 140 may communicate according to a tone plan, which may utilize one or more residual tones, for example, of RUs having a size shorter than the predefined size, e.g., as described below.

In some demonstrative embodiments, devices 102 and/or 140 may be configured to communicate according to a tone plan for a 160 MHz channel BW, e.g., as described below.

In some demonstrative embodiments, device 102 may be configured to generate a PPDU for transmission over a wide channel BW of at least 160 MHz, e.g., as described below.

In some demonstrative embodiments, controller 124 may be configured to control, cause and/or trigger device 102 to generate a PPDU for transmission over a wide channel BW of at least 160 MHz, e.g., as described below.

In some demonstrative embodiments, the wide channel BW may cover at least first and second consecutive 80 MHz channel BWs, e.g., as described below.

In some demonstrative embodiments, controller 124 may be configured to control, cause and/or trigger device 102 and/or radio 124 to communicate the PPDU over the wide channel BW according to a tone plan including a wide RU including at least 1992 tones, e.g., as described below.

In some demonstrative embodiments, the tone plan may include 996 tones of the first 80 MHz channel BW assigned to a first portion of the wide RU, 996 tones of the second 80 MHz channel BW assigned to a second portion of the wide RU, and a Direct Current (DC) portion between the first and second portions of the wide RU including a plurality of guard tones that separate between the first and second 80 MHz channel BWs, e.g., as described below.

In some demonstrative embodiments, the wide RU may include 1992 tones, e.g., as described below.

In some demonstrative embodiments, the tone plan may include a first null portion and a second null portion, e.g., as described below.

In some demonstrative embodiments, the first null portion may be between a first sub-portion and a second sub-portion of the first portion of the wide RU, e.g., as described below.

In some demonstrative embodiments, the second null portion between a first sub-portion and a second sub-portion of the second portion of the wide RU, e.g., as described below.

In some demonstrative embodiments, the first null portion may include a plurality of DC tones of the first 80 MHz channel BW, and/or the second null portion may include a plurality of DC tones of the second 80 MHz channel BW, e.g., as described below.

In some demonstrative embodiments, each of the first and second null portions may include 5 null tones or any other number of null tones, e.g., as described below.

In some demonstrative embodiments, the DC portion may include 5 DC tones, 9 null tones on a first side of the 5 DC tones, and 9 null tones on a second side of the 5 DC tones, e.g., as described below.

In some demonstrative embodiments the DC portion may include 7 DC tones, 8 null tones on a first side of the 7 DC tones, and 8 null tones on a second side of the 7 DC tones, e.g., as described below.

In other embodiments, any other allocation of DC tones and null tones may be used.

In some demonstrative embodiments, controller 124 may be configured to control, cause and/or trigger device 102 and/or radio 124 to communicate the PPDU as a Multi-User (MU) PPDU in a MU transmission to a plurality of users over the wide channel BW, e.g., as described below.

In some demonstrative embodiments, the wide RU may include 2018 tones, each of the first and second portions of the wide RU may include 1009 tones, and/or the DC portion may include 7 DC tones, e.g., as described below.

In some demonstrative embodiments, the wide RU may include 2020 tones, each of the first and second portions of the wide RU may include 1010 tones, and the DC portion may include 7 DC tones, e.g., as described below.

In some demonstrative embodiments, the wide channel BW may include a channel BW of 320 MHz, e.g., as described below.

In some demonstrative embodiments, the wide channel BW may cover the first 80 MHz channel BW, the second 80 MHz channel BW, a third 80 MHz channel BW, and a fourth 80 MHz channel BW, e.g., as described below.

In some demonstrative embodiments, the wide RU may include at least 3984 tones. For example, the tone plan may include 996 tones of the third 80 MHz channel BW assigned to a third portion the wide RU, and 996 tones of the fourth 80 MHz channel BW assigned to a fourth portion of the wide RU, the third portion of the wide RU before the first portion of the wide RU and the fourth portion of the wide RU after the second portion of the wide RU, e.g., as described below.

In some demonstrative embodiments, the tone plan may include a first null portion, a second null portion, a third null portion, and a fourth null portion, e.g., as described below.

In some demonstrative embodiments, the first null portion may be between a first sub-portion and a second sub-portion of the first portion of the wide RU, the second null portion may be between a first sub-portion and a second sub-portion of the second portion of the wide RU, the third null portion may be between a first sub-portion and a second sub-portion of the third portion of the wide RU, and/or the fourth null portion may be between a first sub-portion and a second sub-portion of the fourth portion of the wide RU, e.g., as described below.

In some demonstrative embodiments, the first null portion may include DC tones of the first 80 MHz channel BW, the second null portion may include DC tones of the second 80 MHz channel BW, the third null portion may include DC tones of the third 80 MHz channel BW, and/or the fourth null portion may include DC tones of the fourth 80 MHz channel BW, e.g., as described below.

In some demonstrative embodiments, each of the first, second, third and fourth null portions may include 5 null tones or any other number of null tones, e.g., as described below.

In some demonstrative embodiments, the tone plan may include a first non-data portion and/or a second non-data portion, e.g., as described below.

In some demonstrative embodiments, the first non-data portion may be between the third and first portions of the wide RU, and/or the second non-data portion may be between the second and fourth portions of the wide RU, e.g., as described below.

In some demonstrative embodiments, the first non-data portion may include a first plurality of guard tones between the third and first 80 MHz channel BWs, and/or the second non-data portion may include a second plurality of guard tones between the second and fourth 80 MHz channel BWs, e.g., as described below.

In some demonstrative embodiments, each of the first and second non-data portions of the wide RU may include 23 null tones or any other number of null tones, e.g., as described below.

In some demonstrative embodiments, the DC portion may include 5 DC tones, 9 null tones on a first side of the 5 DC tones, and 9 null tones on a second side of the 5 DC tones, e.g., as described below.

In other embodiments, any other allocation of DC tones and null tones may be used.

In some demonstrative embodiments, the wide RU may include 4068 tones, e.g., as described below.

In some demonstrative embodiments, each of the first and second portions of the wide RU may include 2034 tones, and/or the DC portion may include 5 DC tones, e.g., as described below.

In some demonstrative embodiments, the wide RU may include 4066 tones, e.g., as described below.

In some demonstrative embodiments, each of the first and second portions of the wide RU may include 2033 tones, and/or the DC portion may include 7 DC tones, e.g., as described below.

Figure 6:
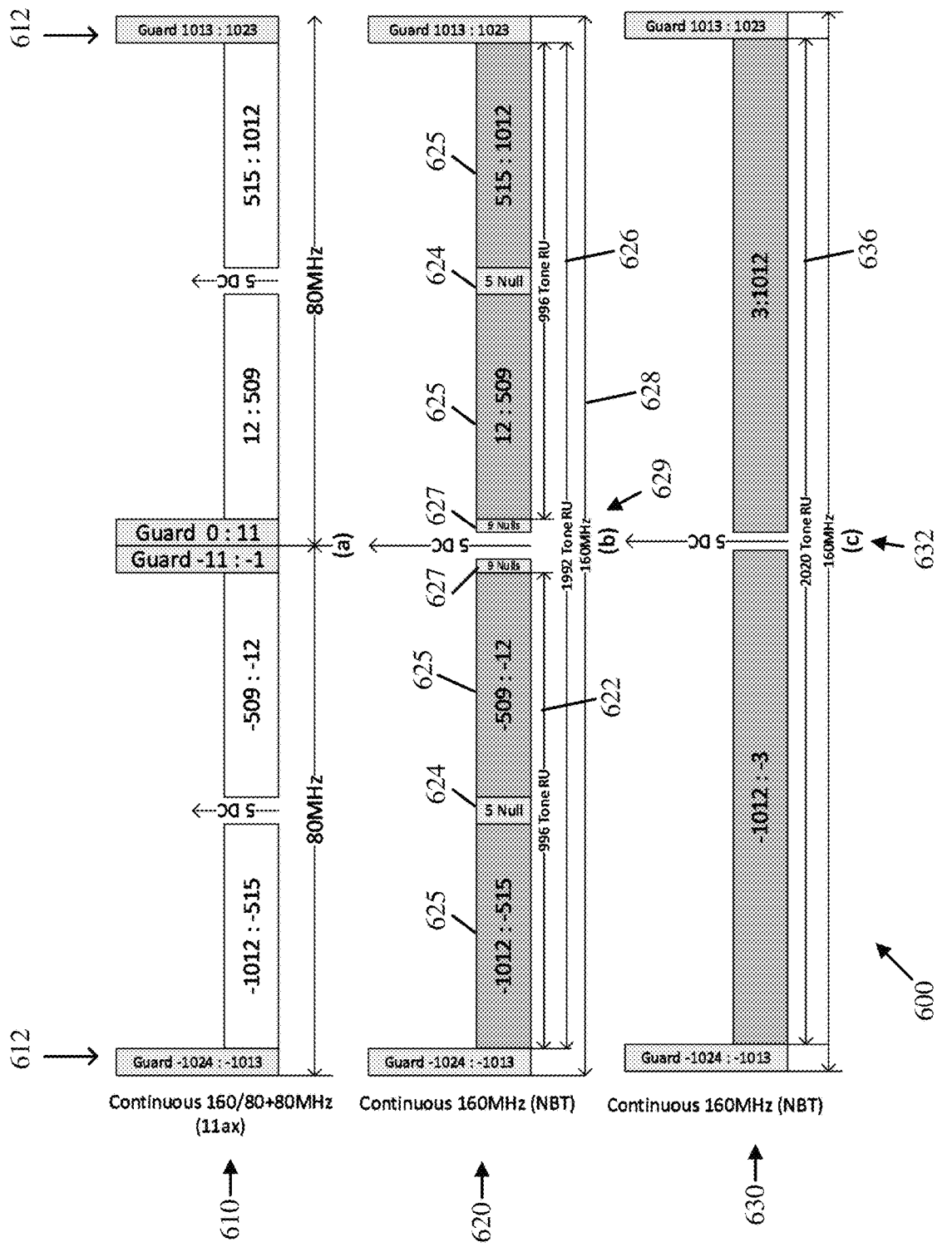
FIG. 6 is a schematic illustration of a scheme including two 160 Megahertz (MHz) tone plans, in accordance with some demonstrative embodiments.

Reference is made to FIG. 6, which schematically illustrates a scheme 600 including two 160 MHz tone plans including a first 160 MHz tone plan 620 and a second 160 MHz tone plan 630, in accordance with some demonstrative embodiments.

In some demonstrative embodiments, the 160 MHz tone plans 620 and 630 may be configured to comply with a tone plan 610, e.g., an IEEE 802.11ax tone plan, e.g., in accordance with an IEEE802.11ax Specification.

In some demonstrative embodiments, as shown in FIG. 6, tone plan 620 for the 160 MHz channel BW, may be aligned with the tone plan 610, e.g., as described below. For example, boundaries of tone plan 620 may be aligned with a boundary of a 996 tone RU 622, e.g., in accordance with the tone plan 610.

In some demonstrative embodiments, tone plan 620 for the 160 MHz channel BW may enable reusing, e.g., fully reusing, 80 MHz channels of the tone plan 610. For example, the tone plan for the 160 MHz channel BW may reuse 26/52/106/242/484 tone RU distribution of tone plan 610, e.g., as described below.

In some demonstrative embodiments, as shown in FIG. 6, guard tones 612 in both sides of the tone plan 620 may be excluded, for example, when applying the tone plan 610 to the tone plan 620 for the 160 MHz channel BW, e.g., as described below.

In some demonstrative embodiments, as shown in FIG. 6, tone plan 620 may include null portions 624 (also referred to as "residual tones").

In some demonstrative embodiments, as shown in FIG. 6, residual tones 624 may be nulled, e.g., unassigned. However, having no energy populated on these tones may cause a waste of a resource.

In some demonstrative embodiments, one or more options may be considered, for example, to utilize residual tones 624, e.g., as described below.

In some demonstrative embodiments, some or all of residual tones 624 may be used, for example, to carry control information. The control information may be, for example, control signaling for a next generation device, broadcast information, and/or common control information for coexistence with non-WiFi devices. In other embodiments, the residual tones 624 may be used to carry any other information.

In some demonstrative embodiments, some or all of residual tones 624 may be used, for example, as pilots. The pilots may be used, for example, for phase tracking between different OFDM symbols in a PPDU, and/or for channel measurement. In other embodiments, the pilots may be used for any other purpose.

In other embodiments, residual tones 624 may be used for any other signaling and/or purpose.

In some demonstrative embodiments, one or more types of next generation devices may be able to receive and to parse the information populated on residual tones 624.

In some demonstrative embodiments, devices 102 and 140 (FIG. 1) may be configured to communicate a single user communication over the whole 160 MHz channel bandwidth.

In some demonstrative embodiments, one or more RU sizes may be introduced, e.g., to support single user communication over the whole 160 MHz bandwidth, e.g., as described below.

In some demonstrative embodiments, as shown in FIG. 6, tone plan 620 may include four blocks 625 to buildup a 1992 tone RU 626.

In some demonstrative embodiments, the 1992 tone RU 626 is twice of a maximum RU size of a tone RU, e.g., in accordance with an IEEE802.11ax Specification.

In some demonstrative embodiments, as shown in FIG. 6, the four blocks 625 may be distributed across the whole 160 MHz bandwidth 628 and/or may not be continuous to each other.

In some demonstrative embodiments, as shown in FIG. 6, tone plan 620 may include a DC portion 629 between second portions of the 1992 tone RU 626.

In some demonstrative embodiments, as shown in FIG. 6, DC portion 629 may include 5 DC tones, and 9 null tones 627 on a first side of the 5 DC tones, 9 null tones 627 on a second side of the 5 DC tones.

In other embodiments, any other allocation of the DC tones and the null tones may be used.

In some demonstrative embodiments, reserving the residual tones 624 in tone plan 620, e.g., instead of aggregating the residual tones 624 with the 1992 tones RU 626, for example, to form a larger RU, may enable to keep the same function of the residual tones 624 in tone plan 610, e.g., for single user and multi-user allocation in the 160 MHz BW.

In some demonstrative embodiments, as shown in tone plan 630, residual tones 624 may not be reserved, such that a 2020 tone RU 636 may be formed, which may maximize an efficiency of tone plan 630, but lose a function of residual tones 624, for a multi-user communication.

In some demonstrative embodiments, as shown in FIG. 6, tone plan 630 may include DC portion 632 and guard tones 612.

In some demonstrative embodiments, as shown in FIG. 6, DC portion 632 may include five DC null tones.

In some demonstrative embodiments, the DC nulls tones 632 in tone plan 620 may include seven DC null tones.

In one example, a carrier frequency offset in tone plan 630 may be considered to be a same as tone plan 610, while an oscillator may be between 6 GHz-7 GHz in a next generation WiFi, e.g., a 20% increase for carrier frequency offset (CFO). For example, if the number of DC null tones in DC portion 632 is changed from 5 to 7, the number of tones 627, e.g., around the DC null tones, may be changed from nine tones to eight tones, for example, in order to keep the same number of tones in the middle of 2020 tone RU 636. For example, both tone plans 620 and 630 may include 23 tones in the middle, e.g., 5+9*2=23 in tone plan 620, and 7+8*2=23 in tone plan 630. According to this example, a number of tones in 2020 tone RU 636 may be changed from 2020 tones to 2018 tones in total.

Referring back to FIG. 1, in some demonstrative embodiments, devices 102 and/or 140 may be configured to communicate according to a tone plan for a 320 MHz channel BW, e.g., as described below.

In some demonstrative embodiments, device 102 may be configured to generate a PPDU to be transmitted over a channel bandwidth of 320 MHz according to a 320 MHz tone plan, which covers two 160 MHz channel BWs, e.g., as described below.

In some demonstrative embodiments, the wide channel BW may cover a first 80 MHz channel BW, a second 80 MHz channel BW, a third 80 MHz channel BW, and a fourth 80 MHz channel BW, e.g., as described below.

In some demonstrative embodiments, devices 102 and 140 may communicate a PPDU over a wide RU including at least 3984 tones, e.g., as described below.

In some demonstrative embodiments, the tone plan may include 996 tones of the first 80 MHz channel BW assigned to a first portion of the wide RU, 996 tones of the second 80 MHz channel BW assigned to a second portion of the wide RU, 996 tones of the third 80 MHz channel BW assigned to a third portion of the wide RU, 996 tones of the fourth 80 MHz channel BW assigned to a fourth portion of the wide RU, and a DC portion between the second and third portions of the wide RU including a plurality of guard tones that separate between the second and third 80 MHz channel BWs, e.g., as described below.

In some demonstrative embodiments, the wide RU may include 3984 tones, e.g., as described below.

In some demonstrative embodiments, the tone plan may include a first null portion, a second null portion, a third null portion, and a fourth null portion, e.g., as described below.

In some demonstrative embodiments, the first null portion may be between a first sub-portion and a second sub-portion of the first portion of the wide RU, the second null portion may be between a first sub-portion and a second sub-portion of the second portion of the wide RU, the third null portion may be between a first sub-portion and a second sub-portion of the third portion of the wide RU, and/or the fourth null portion may be between a first sub-portion and a second sub-portion of the fourth portion of the wide RU, e.g., as described below.

In some demonstrative embodiments, the first null portion may include DC tones of the first 80 MHz channel BW, the second null portion may include DC tones of the second 80 MHz channel BW, the third null portion may include DC tones of the third 80 MHz channel BW, and/or the fourth null portion may include DC tones of the fourth 80 MHz channel BW, e.g., as described below.

In some demonstrative embodiments, each of the first, second, third and/or fourth null portions may include 5 null tones or any other number of null tones, e.g., as described below.

In some demonstrative embodiments, the tone plan may include a first non-data portion and/or a second non-data portion, e.g., as described below.

In some demonstrative embodiments, the first non-data portion may be between the first and second portions of the wide RU, and/or the second non-data portion may be between the third and fourth portions of the wide RU.

In some demonstrative embodiments, the first non-data portion may include a first plurality of guard tones between the third and first 80 MHz channel BWs, and/or the second non-data portion may include a second plurality of guard tones between the second and fourth 80 MHz channel BWs, e.g., as described below.

In some demonstrative embodiments, each of the first and second non-data portions of the wide RU may include 23 null tones or any other number of null tones, e.g., as described below.

In some demonstrative embodiments, the DC portion may include 5 DC tones, 9 null tones on a first side of the 5 DC tones, and 9 null tones on a second side of the 5 DC tones, e.g., as described below.

In other embodiments, any other allocation of DC tones and null tones may be used.

In some demonstrative embodiments, the wide RU may include 4068 tones, e.g., as described below.

In some demonstrative embodiments, each of the first and second portions of the wide RU may include 2034 tones, and/or the DC portion may include 5 DC tones, e.g., as described below.

In some demonstrative embodiments, the wide RU may include 4066 tones, e.g., as described below.

In some demonstrative embodiments, each of the first and second portions of the wide RU may include 2033 tones, and/or the DC portion may include 7 DC tones, e.g., as described below.

In some demonstrative embodiments, devices 102 and/or 140 may be configured to communicate the PPDU over the wide channel BW according to the 320 MHz tone plan, e.g., as described below.

Figure 7:
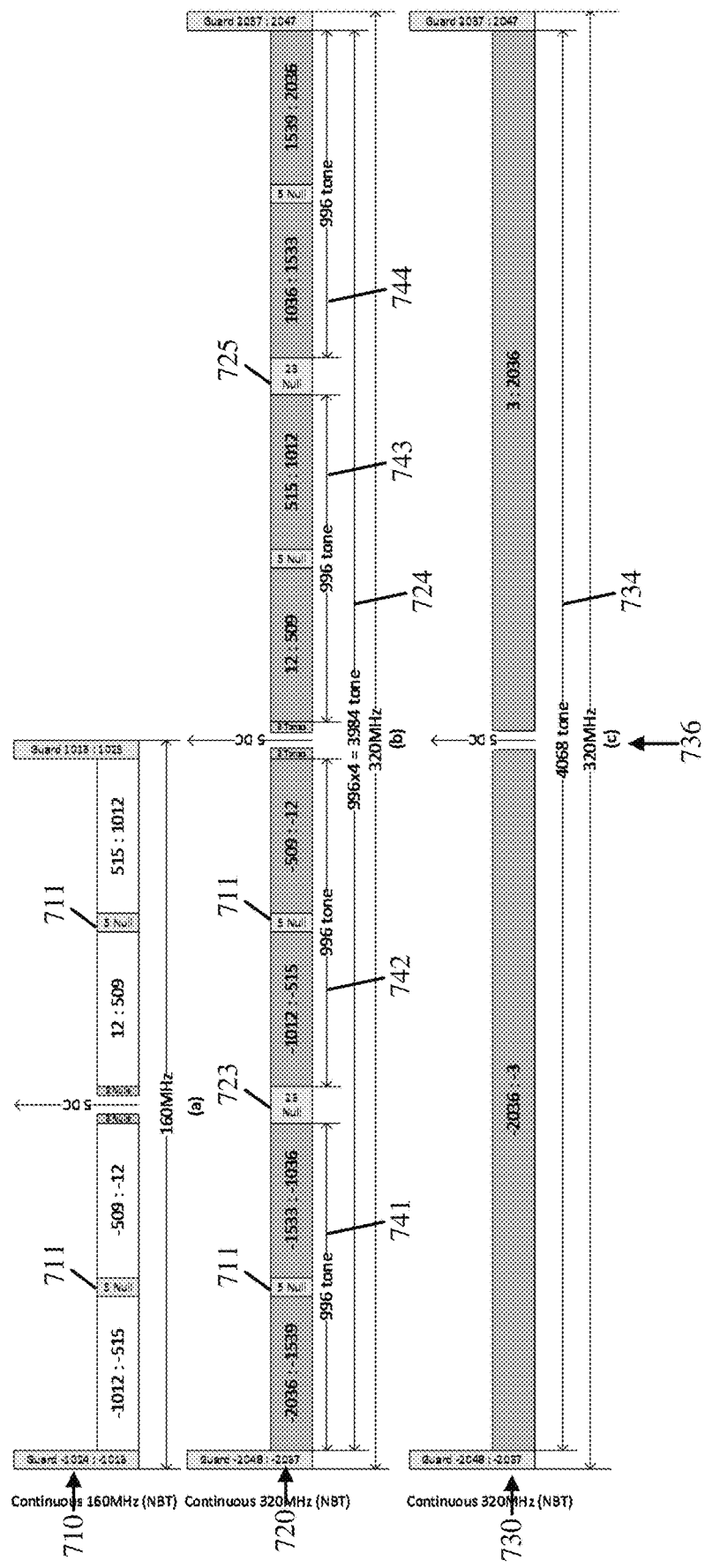
FIG. 7 is a schematic illustration of a scheme including two 320 MHz tone plans, in accordance with some demonstrative embodiments.

Reference is made to FIG. 7, which schematically illustrates a tone plan scheme 700 including a first 320 MHz tone plan 720 and a second 320 MHz tone plan 730, in accordance with some demonstrative embodiments.

In some demonstrative embodiments, the 320 MHz tone plans 720 and 730 may be configured to comply with a 160 MHz tone plan 710, e.g., the tone plan 620 (FIG. 6).

In some demonstrative embodiments, as shown in FIG. 7, tone plan 720 may be based on the tone plan 620 (FIG. 6), e.g., the first 160 MHz tone plan.

In some demonstrative embodiments, as shown in FIG. 7, tone plan 720 may include a first portion 741, a second portion 742, a third portion 743, and a fourth portion 744, e.g., each including a 996-tone RU.

In some demonstrative embodiments, as shown in FIG. 7, boundaries of tone plan 720 may be aligned with tone plan 710. Therefore, the boundary of tone plan 720 may be aligned with the boundary of tone plan 610 (FIG. 6), e.g., a 80 MHz tone plan in accordance with an IEEE80211ax Specification, which may enable to reuse the 80 MHz tone plan, e.g., the tone plan 610 (FIG. 6).

In some demonstrative embodiments, as shown in FIG. 7, tone plan 720 may include null portions 711 (also referred to as "reserved tones"), e.g., 5 nulled tones, which may be excluded, for example, when reusing the 80 MHz tone plan, e.g., the tone plane 610 (FIG. 6).

In some demonstrative embodiments, as shown in FIG. 7, tone plan 720 may include a first non-data portion 723 and a second 725 non-data portion (also referred to as "reserved tones"). The first non-data portion 723 may be between portions 741 and 742 of RU 724, and the second non-data portion 725 may be between portions 743 and 744 of RU 724.

In some demonstrative embodiments, as shown in FIG. 7, tone plan 720 may include 84 reserved tones, e.g., including non-data portion 723 and/or 725 and null portions 711, which may be marked as nulled tones.

In some demonstrative embodiments, usages of the 84 nulled tones may be similar to the usage discuss above, e.g., with respect to residual tones 624 (FIG. 6). For example, the 84 reserved tones may be used for control signaling, pilots and/or any other usage, e.g., instead of nulling the 84 tones.

In some demonstrative embodiments, devices 102 and 140 (FIG. 1) may use tone plan 720 to communicate a single user communication over a 320 MHz channel BW, e.g., as described below.

In some demonstrative embodiments, a first RU unit size may be introduced for communication over the 320 MHz channel BW, e.g., as described below.

In some demonstrative embodiments, as shown in FIG. 7, tone plan 720 may include a wide RU unit 724, e.g., including 3984 tones.

In some demonstrative embodiments, as shown in FIG. 7, RU unit 724 may reserve the 84 nulled tones. RU unit 724 may enable a function of the reserved 84 tones for both single user and multi-user operation.

In some demonstrative embodiments, a second RU unit size may be introduced for communication over the 320 MHz channel BW, e.g., as described below.

In some demonstrative embodiments, as shown in FIG. 7, tone plan 730 may include an RU unit 734, e.g., including 4068 tones.

In some demonstrative embodiments, as shown in FIG. 7, RU unit 734 may combine the 84 reserved tones with the 3984 tones of RU unit 724, for example, to form a larger RU having 4068 tones. RU unit 734 may maximize an efficiency of tone plan 730.

In one example, RU unit 724 may include 4066 tones, for example, if a number of DC nulls 736 is 7.

Referring back to FIG. 1, in some demonstrative embodiments, devices 102 and/or 140 may communicate according to a tone plan over a 160 MHz channel BW and/or 320 MHz channel BW, e.g., as described above with reference to FIG. 6 and FIG. 7.

In some demonstrative embodiments, devices 102 and/or 140 may be configured to communicate PPDUs using only an RU size, which is greater than a predefined size, e.g., as describe below.

In some demonstrative embodiments, devices 102 and 140 may be configured to communicate PPDUs according to a tone plan including only RUs having a size greater than 26 tones, e.g., as described below.

In some demonstrative embodiments, the tone plan may include only RUs having a size greater than 52 tones, e.g., as described below.

In other embodiments, the tone plan may include RUs have a size greater than any other predefined RU size, e.g., as described below.

In some demonstrative embodiments, device 102 may be configured to generate the PPDU according to a RU size, which is greater than a 26-tone RU size, e.g., as described below.

In some demonstrative embodiments, controller 124 may be configured to allow device 102 to communicate PPDUs using only an RU size, which is greater than 26 tones, e.g., as described below.

In some demonstrative embodiments, device 102 may be configured to generate the PPDU including an aggregated RU, the aggregated RU may include two or more non-consecutive 26 RUs.

In some demonstrative embodiments, it may be advantageous not to use small size RUs, e.g., a 26 tone RU and or 52-tone RU, e.g., as described below.

In one example, WiFi devices may target for large bandwidth and high throughput, e.g., using the 160 MHz channel BW and/or a 320 MHz channel BW. According to this example, disabling the small size RUs may simplify a scheduling, resource allocation signaling, and/or channel quality feedback.

In some demonstrative embodiments, disabling the small size RUs may cause a technical problem of how to utilize 26-tone RUs, which are located between 106 tone RUs.

In some demonstrative embodiments, devices 102 and 140 may be configured to aggregate the 26-tone RUs, for example, to form a distributed 52-tone RU, e.g., using two 26-tone RUs, or a distributed 106-tone RU, e.g., using four 26-tone RUs.

In other embodiments, any other size of a distributed RU may be used.

In some demonstrative embodiments, aggregating the 26-tone RUs may obviate a need to create a new RU size.

Figure 8:
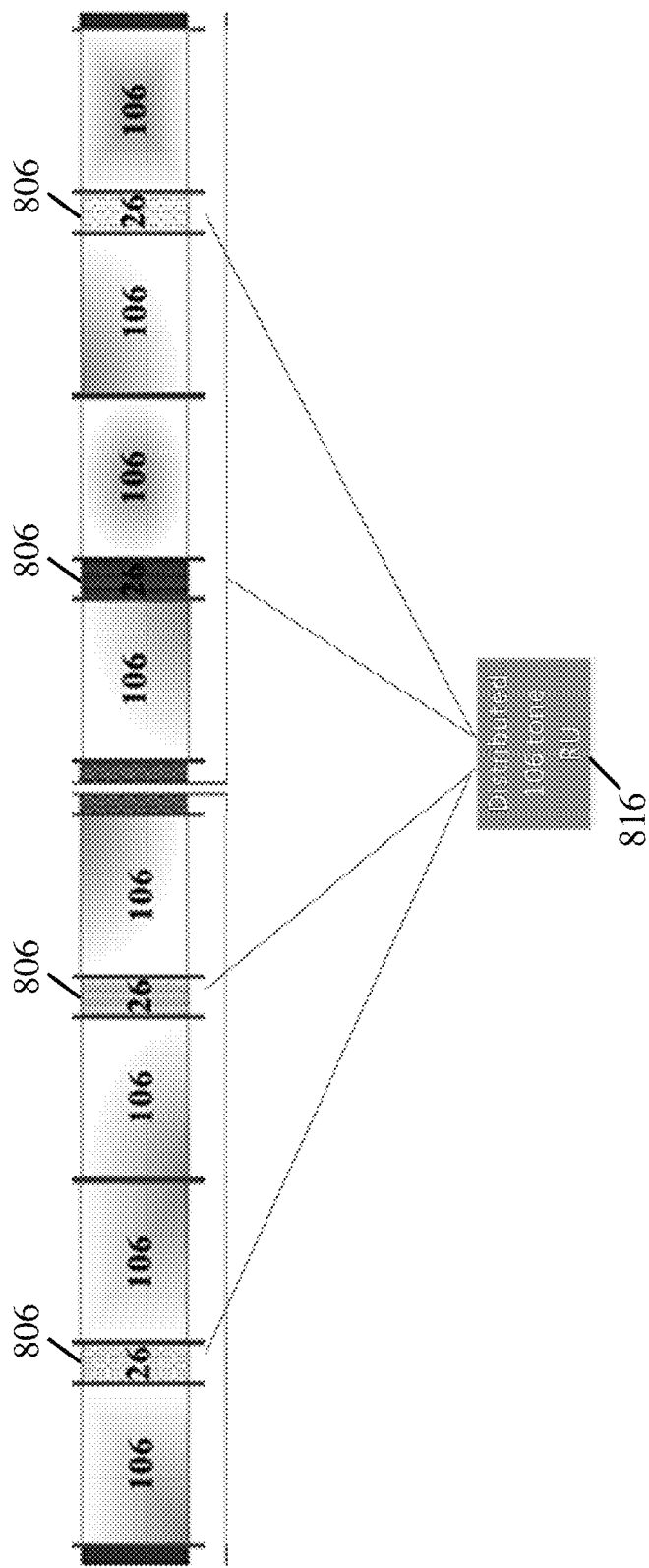
FIG. 8 is a schematic illustration of a distributed resource unit, in accordance with some demonstrative embodiments.

Reference is made to FIG. 8, which schematically illustrates a distributed RU 816, in accordance with some demonstrative embodiments.

In some demonstrative embodiments, as shown in FIG. 8, four 26-tone RUs 806 and 2 reserved tones may be grouped together to construct a distributed 106-tone RU 816.

In some demonstrative embodiments, usage of residual 26-tone RUs may be similar with the usage discuss above, e.g., with respect to residual tones 624 (FIG. 6). For example, the residual 26-tone RUs may be used as control signaling, pilots and/or for any other usage.

Figure 9:
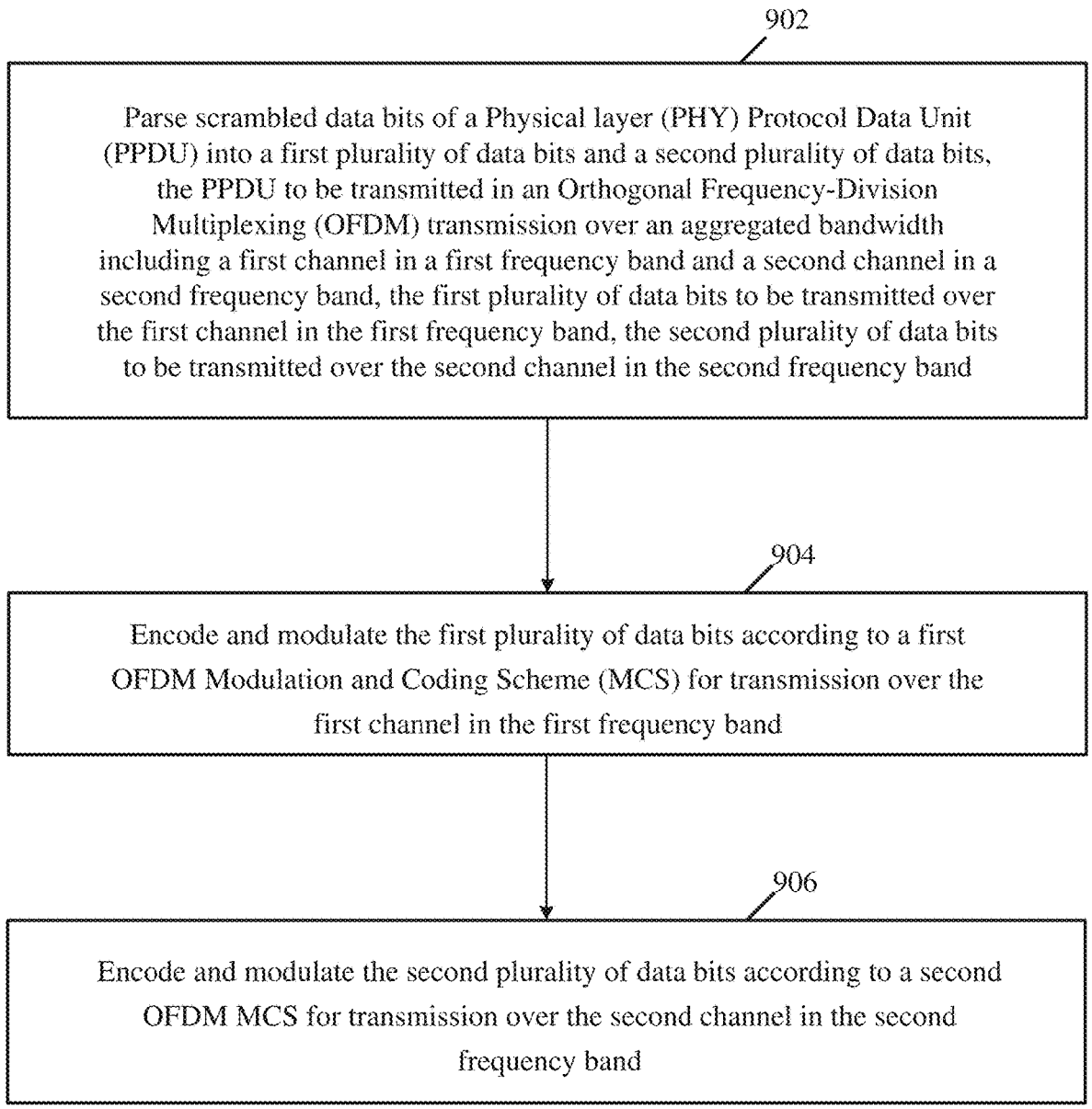
FIG. 9 is a schematic flow-chart illustration of a method of an Orthogonal Frequency-Division Multiplexing (OFDM) transmission over a wide bandwidth, in accordance with some demonstrative embodiments.

Reference is made to FIG. 9, which schematically illustrates a method of transmission over a wide bandwidth, in accordance with some demonstrative embodiments. For example, one or more of the operations of the method of FIG. 9 may be performed by one or more elements of a system, e.g., system 100 (FIG. 1), for example, one or more wireless devices, e.g., device 102 (FIG. 1) and/or device 140 (FIG. 1), a controller, e.g., controller 124 (FIG. 1) and/or controller 154 (FIG. 1), a radio, e.g., radio 114 (FIG. 1) and/or radio 144 (FIG. 1), a transmitter, e.g., transmitter 118 (FIG. 1) and/or transmitter 148 (FIG. 1), and/or a message processor, e.g., message processor 128 (FIG. 1) and/or message processor 158 (FIG. 1).

As indicated at block 902, the method may include parsing scrambled data bits of a PPDU into a first plurality of data bits and a second plurality of data bits, the PPDU to be transmitted in an OFDM transmission over an aggregated bandwidth including a first channel in a first frequency band and a second channel in a second frequency band, the first plurality of data bits to be transmitted over the first channel in the first frequency band, the second plurality of data bits to be transmitted over the second channel in the second frequency band. For example, transmitter 118 (FIG. 1) may be configured to parse the scrambled data bits of the PPDU into the first plurality of data bits and the second plurality of data bits, the PPDU to be transmitted in the OFDM transmission over the aggregated bandwidth including the first channel in the first frequency band and the second channel in the second frequency band, the first plurality of data bits to be transmitted over the first channel in the first frequency band, the second plurality of data bits to be transmitted over the second channel in the second frequency band, e.g., as described above.

As indicated at block 904, the method may include encoding and modulating the first plurality of data bits according to a first OFDM MCS for transmission over the first channel in the first frequency band. For example, transmitter 118 (FIG. 1) may be configured to encode and modulate the first plurality of data bits according to the first OFDM MCS for transmission over the first channel in the first frequency band, e.g., as described above.

As indicated at block 906, the method may include encoding and modulating the second plurality of data bits according to a second OFDM MCS for transmission over the second channel in the second frequency band. For example, transmitter 118 (FIG. 1) may be configured to encode and modulate the second plurality of data bits according to the second OFDM MCS for transmission over the second channel in the second frequency band, e.g., as described above.

Figure 10:
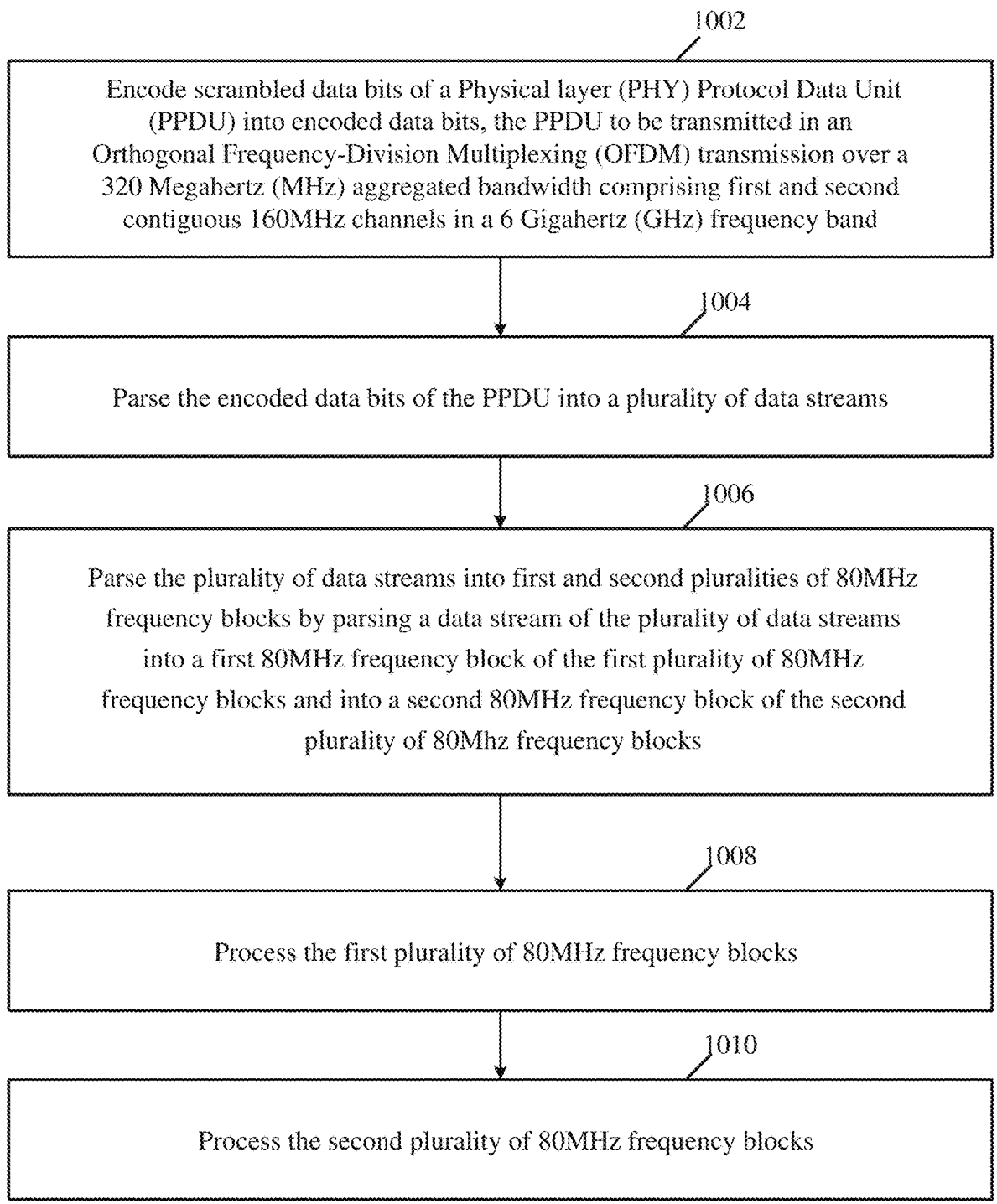
FIG. 10 is a schematic flow-chart illustration of a method of an OFDM transmission over a 320 MHz bandwidth, in accordance with some demonstrative embodiments.

Reference is made to FIG. 10, which schematically illustrates a method of an OFDM transmission over a 320 MHz bandwidth, in accordance with some demonstrative embodiments. For example, one or more of the operations of the method of FIG. 10 may be performed by one or more elements of a system, e.g., system 100 (FIG. 1), for example, one or more wireless devices, e.g., device 102 (FIG. 1) and/or device 140 (FIG. 1), a controller, e.g., controller 124 (FIG. 1) and/or controller 154 (FIG. 1), a radio, e.g., radio 114 (FIG. 1) and/or radio 144 (FIG. 1), a transmitter, e.g., transmitter 118 (FIG. 1) and/or transmitter 148 (FIG. 1), and/or a message processor, e.g., message processor 128 (FIG. 1) and/or message processor 158 (FIG. 1).

As indicated at block 1002, the method may include encoding scrambled data bits of a PPDU into encoded data bits, the PPDU to be transmitted in an OFDM transmission over a 320 MHz aggregated bandwidth including first and second contiguous 160 MHz channels in a 6 GHz frequency band. For example, transmitter 118 (FIG. 1) and/or encoder 512 (FIG. 5) may be configured to encode scrambled data bits of the PPDU 505 (FIG. 5) into encoded data bits 513 (FIG. 5), the PPDU to be transmitted in the OFDM transmission over the 320 MHz aggregated bandwidth including the first and second contiguous 160 MHz channels in the 6 GHz frequency band, e.g., as described above.

As indicated at block 1004, the method may include parsing the encoded data bits of the PPDU into a plurality of data streams. For example, transmitter 118 (FIG. 1) and/or stream parser 514 (FIG. 5) may be configured to parse the encoded data bits 513 (FIG. 5) of the PPDU into the plurality of data streams 515 (FIG. 5), e.g., as described above.

As indicated at block 1006, the method may include parsing the plurality of data streams into first and second pluralities of 80 MHz frequency blocks, by parsing a data stream of the plurality of data streams into a first 80 MHz frequency block of the first plurality of 80 MHz frequency blocks and into a second 80 MHz frequency block of the second plurality of 80 Mhz frequency blocks. For example, transmitter 118 (FIG. 1) and/or the plurality of 160 MHz segment parsers 526 (FIG. 5) may be configured to parse the plurality of data streams 515 (FIG. 5) into the first 80 MHz frequency blocks 527 (FIG. 1) and the second plurality of 80 MHz frequency blocks 537 (FIG. 5), e.g., as described above.

As indicated at block 1008, the method may include processing the first plurality of 80 MHz frequency blocks. For example, transmitter 118 (FIG. 1) and/or baseband processing block 520 (FIG. 5) may be configured to process the first plurality of 80 MHz frequency blocks 527 (FIG. 5), e.g., as described above.

As indicated at block 1010, the method may include processing the second plurality of 80 MHz frequency blocks. For example, transmitter 118 (FIG. 1) and/or baseband processing block 530 (FIG. 5) may be configured to process the second plurality of 80 MHz frequency blocks 537 (FIG. 5), e.g., as described above.

Figure 11:
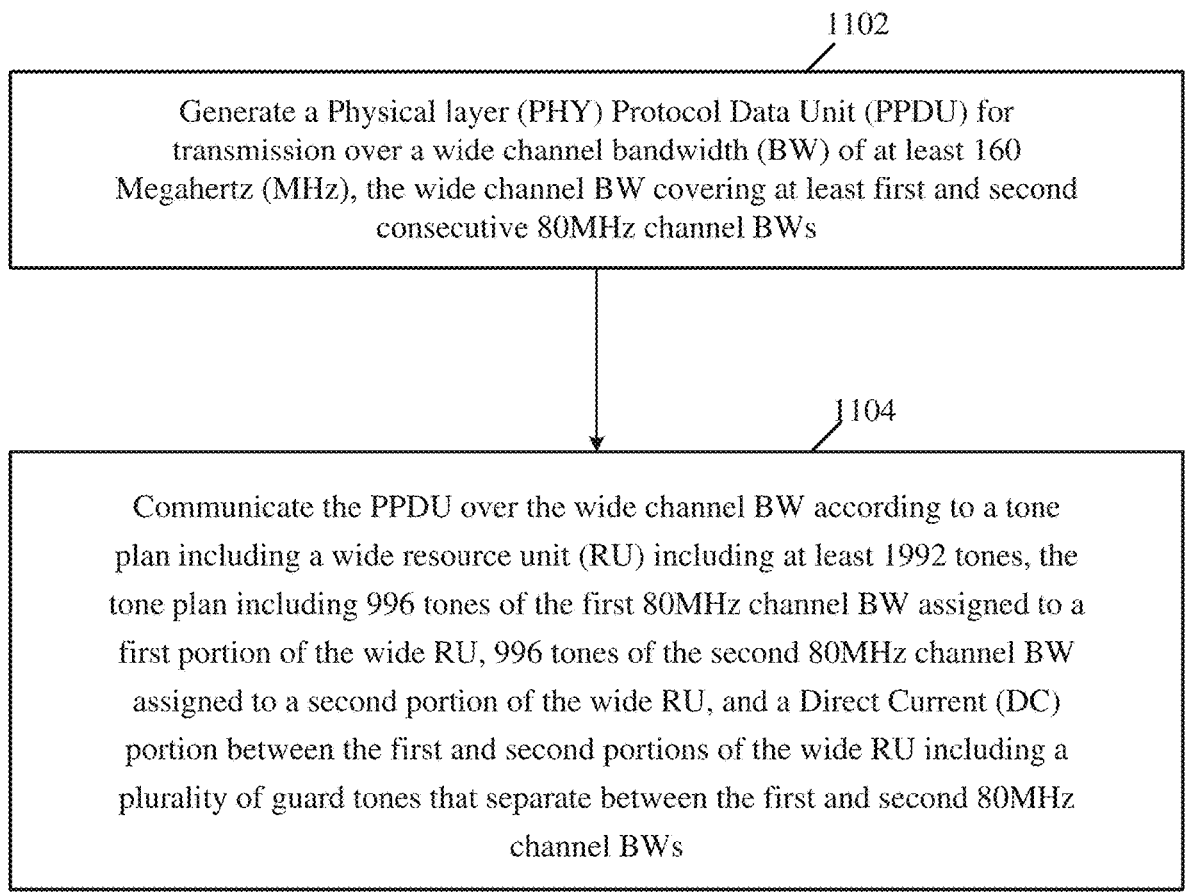
FIG. 11 is a schematic flow-chart illustration of a method of communicating over a wide channel bandwidth, in accordance with some demonstrative embodiments.

Reference is made to FIG. 11, which schematically illustrates a method of communication over a wide channel bandwidth. For example, one or more of the operations of the method of FIG. 11 may be performed by one or more elements of a system, e.g., system 100 (FIG. 1), for example, one or more wireless devices, e.g., device 102 (FIG. 1) and/or device 140 (FIG. 1), a controller, e.g., controller 124 (FIG. 1) and/or controller 154 (FIG. 1), a radio, e.g., radio 114 (FIG. 1) and/or radio 144 (FIG. 1), and/or a message processor, e.g., message processor 128 (FIG. 1) and/or message processor 158 (FIG. 1).

As indicated at block 1102, the method may include generating PPDU for transmission over a wide channel BW of at least 160 MHz, the wide channel BW covering at least first and second consecutive 80 MHz channel BWs. For example, device 102 (FIG. 1) may generate the PPDU for transmission over the wide channel BW of at least 160 MHz, the wide channel BW covering at least the first and second consecutive 80 MHz channel BWs, e.g., as described above.

As indicated at block 1004, the method may include communicating the PPDU over the wide channel BW according to a tone plan including a wide RU including at least 1992 tones, the tone plan including 996 tones of the first 80 MHz channel BW assigned to a first portion of the wide RU, 996 tones of the second 80 MHz channel BW assigned to a second portion of the wide RU, and a DC portion between the first and second portions of the wide RU including a plurality of guard tones that separate between the first and second 80 MHz channel BWs. For example, device 102 (FIG. 1) may communicate the PPDU over the wide channel BW according to the tone plan including the wide RU including at least 1992 tones, the tone plan including 996 tones of the first 80 MHz channel BW assigned to the first portion of the wide RU, the 996 tones of the second 80 MHz channel BW assigned to the second portion of the wide RU, and the DC portion between the first and second portions of the wide RU including the plurality of guard tones that separate between the first and second 80 MHz channel BWs, e.g., as described above.

Figure 12:
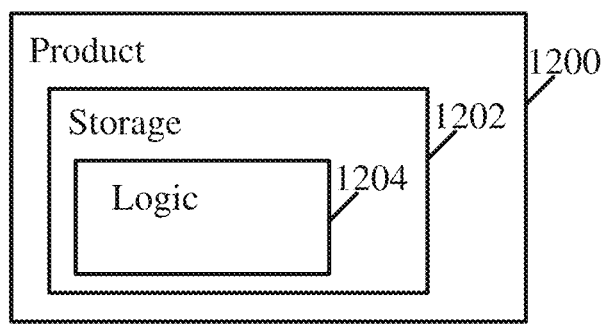
FIG. 12 is a schematic illustration of a product of manufacture, in accordance with some demonstrative embodiments.

Reference is made to FIG. 12, which schematically illustrates a product of manufacture 1200, in accordance with some demonstrative embodiments. Product 1200 may include one or more tangible computer-readable ("machine-readable") non-transitory storage media 1202, which may include computer-executable instructions, e.g., implemented by logic 1204, operable to, when executed by at least one computer processor, enable the at least one computer processor to implement one or more operations at device 102 (FIG. 1), device 140 (FIG. 1), radio 114 (FIG. 1), radio 144 (FIG. 1), transmitter 118 (FIG. 1), transmitter 148 (FIG. 1), receiver 116 (FIG. 1), receiver 146 (FIG. 1), controller 124 (FIG. 1), controller 154 (FIG. 1), message processor 128 (FIG. 1), and/or message processor 158 (FIG. 1), to cause device 102 (FIG. 1), device 140 (FIG. 1), radio 114 (FIG. 1), radio 144 (FIG. 1), transmitter 118 (FIG. 1), transmitter 148 (FIG. 1), receiver 116 (FIG. 1), receiver 146 (FIG. 1), controller 124 (FIG. 1), controller 154 (FIG. 1), message processor 128 (FIG. 1), and/or message processor 158 (FIG. 1) to perform, trigger and/or implement one or more operations and/or functionalities, and/or to perform, trigger and/or implement one or more operations and/or functionalities described with reference to the FIGS. 1, 2, 3, 4, 5, 6, 7, 8, 9, 10 and/or 11, and/or one or more operations described herein. The phrases "non-transitory machine-readable medium" and "computer-readable non-transitory storage media" may be directed to include all computer-readable media, with the sole exception being a transitory propagating signal.

In some demonstrative embodiments, product 1200 and/or machine-readable storage media 1202 may include one or more types of computer-readable storage media capable of storing data, including volatile memory, non-volatile memory, removable or non-removable memory, erasable or non-erasable memory, writeable or re-writeable memory, and the like. For example, machine-readable storage media 1202 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 1204 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 1204 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

Examples

The following examples pertain to further embodiments.

Example 1 includes an apparatus of Orthogonal Frequency-Division Multiplexing (OFDM) transmission, the apparatus comprising a segment parser to parse scrambled data bits of a Physical layer (PHY) Protocol Data Unit (PPDU) into a first plurality of data bits and a second plurality of data bits, the PPDU to be transmitted in an OFDM transmission over an aggregated bandwidth comprising a first channel in a first frequency band and a second channel in a second frequency band, the first plurality of data bits to be transmitted over the first channel in the first frequency band, the second plurality of data bits to be transmitted over the second channel in the second frequency band; a first baseband processor to encode and modulate the first plurality of data bits according to a first OFDM Modulation and Coding Scheme (MCS) for transmission over the first channel in the first frequency band; and a second baseband processor to encode and modulate the second plurality of data bits according to a second OFDM MCS for transmission over the second channel in the second frequency band.

Example 2 includes the subject matter of Example 1, and optionally, wherein the segment parser is configured to determine a first number of data bits per OFDM symbol based on one or more first parameters corresponding to the first channel in the first frequency band, to determine a second number of data bits per OFDM symbol based on one or more second parameters corresponding to the second channel in the second frequency band, to parse the scrambled data bits of the PPDU into the first plurality of data bits based on the first number of data bits per OFDM symbol, and to parse the scrambled data bits of the PPDU into the second plurality of data bits based on the second number of data bits per OFDM symbol.

Example 3 includes the subject matter of Example 2, and optionally, wherein the one or more first parameters comprise at least one of a number of coded bits per subcarrier for the first channel in the first frequency band, a number of OFDM subcarriers for the first channel in the first frequency band, or a coding rate for the first channel in the first frequency band, and wherein the one or more second parameters comprise at least one of a number of coded bits per subcarrier for the second channel in the second frequency band, a number of OFDM subcarriers for the second channel in the second frequency band, or a coding rate for the second channel in the second frequency band.

Example 4 includes the subject matter of Example 2 or 3, and optionally, wherein the segment parser is configured to determine a total number of scrambled data bits per OFDM symbol to be transmitted over the aggregated bandwidth based on the first number of data bits per OFDM symbol and the second number of data bits per OFDM symbol, to group the scrambled data bits of the PPDU into a plurality of data bit groups, a group of the plurality of data bit groups comprising the total number of scrambled data bits per OFDM symbol, and to parse the group into the first plurality of data bits and the second plurality of data bits.

Example 5 includes the subject matter of any one of Examples 1-4, and optionally, wherein the first channel comprises a first aggregated channel comprising an aggregation of a first channel bandwidth in the first frequency band and a second channel bandwidth in the first frequency band, and wherein the second channel comprises a second aggregated channel comprising an aggregation of a first channel bandwidth in the second frequency band and a second channel bandwidth in the second frequency band.

Example 6 includes the subject matter of Example 5, and optionally, wherein the first baseband processor comprises a first encoder to encode the first plurality of data bits into a first plurality of encoded data bits, and a first stream parser to parse the first plurality of encoded data bits into a first plurality of spatial streams, and wherein the second baseband processor comprises a second encoder to encode the second plurality of data bits into a second plurality of encoded data bits, and a second stream parser to parse the second plurality of encoded data bits into a second plurality of spatial streams.

Example 7 includes the subject matter of Example 5 or 6, and optionally, wherein the first aggregated channel comprises a 160 Megahertz (MHz) channel, the first channel bandwidth in the first frequency band comprises a first 80 MHz channel bandwidth, the second channel bandwidth in the first frequency band comprises a second 80 MHz channel bandwidth, the first channel bandwidth in the second frequency band comprises a third 80 MHz channel bandwidth, and the second channel bandwidth in the second frequency band comprises a fourth 80 MHz channel bandwidth.

Example 8 includes the subject matter of Example 6 or 7, and optionally, wherein the first encoder comprises a first Binary Convolutional Code (BCC) encoder, and the second encoder comprising a second BCC encoder.

Example 9 includes the subject matter of any one of Examples 5-8, and optionally, wherein the first channel bandwidth in the first frequency band is contiguous to the second channel bandwidth in the first frequency band first, and wherein the first channel bandwidth in the second frequency band is contiguous to the second channel bandwidth in the second frequency band.

Example 10 includes the subject matter of any one of Examples 5-8, and optionally, wherein the first channel bandwidth in the first frequency band is non-contiguous to the second channel bandwidth in the first frequency band, and wherein the first channel bandwidth in the second frequency band is non-contiguous to the second channel bandwidth in the second frequency band.

Example 11 includes the subject matter of any one of Examples 1-10, and optionally, wherein the aggregated bandwidth comprises a 320 Megahertz (MHz) channel, the first channel comprising a first 160 MHz channel, and the second channel comprising a second 160 MHz channel.

Example 12 includes the subject matter of any one of Examples 1-10, and optionally, wherein the first channel comprises a first 160 MHz channel, 80 MHz channel or 40 MHz channel, and the second channel comprises a second 160 MHz channel, 80 MHz channel or 40 MHz channel.

Example 13 includes the subject matter of any one of Examples 1-12, and optionally, wherein the aggregated bandwidth comprises a wide channel bandwidth (BW) of at least 160 Megahertz (MHz), the wide channel BW covering at least first and second consecutive 80 MHz channel BWs, the apparatus configured to transmit the PPDU over the wide channel BW according to a tone plan comprising a wide resource unit (RU) comprising at least 1992 tones, the tone plan comprising 996 tones of the first 80 MHz channel BW assigned to a first portion of the wide RU, 996 tones of the second 80 MHz channel BW assigned to a second portion of the wide RU, and a Direct Current (DC) portion between the first and second portions of the wide RU comprising a plurality of guard tones that separate between the first and second 80 MHz channel BWs.

Example 14 includes the subject matter of any one of Examples 1-13, and optionally, wherein the first frequency band comprises a 6 Gigahertz (GHz) wireless frequency band, and the second frequency band comprises a 5 GHz wireless frequency band or a 2.4 GHz wireless frequency band.

Example 15 includes the subject matter of any one of Examples 1-13, and optionally, wherein the first channel in the first frequency band comprises a first channel in a 6 Gigahertz (GHz) wireless frequency band, and the second channel in the second frequency band comprises a second channel in the 6 GHz wireless frequency band.

Example 16 includes the subject matter of any one of Examples 1-15, and optionally, comprising one or more antennas, a memory and a processor.

Example 17 includes a system of wireless communication comprising a wireless communication station (STA), the STA comprising one or more antennas; a memory; a processor; and an Orthogonal Frequency-Division Multiplexing (OFDM) transmitter comprising a segment parser to parse scrambled data bits of a Physical layer (PHY) Protocol Data Unit (PPDU) into a first plurality of data bits and a second plurality of data bits, the PPDU to be transmitted in an OFDM transmission over an aggregated bandwidth comprising a first channel in a first frequency band and a second channel in a second frequency band, the first plurality of data bits to be transmitted over the first channel in the first frequency band, the second plurality of data bits to be transmitted over the second channel in the second frequency band; a first baseband processor to encode and modulate the first plurality of data bits according to a first OFDM Modulation and Coding Scheme (MCS) for transmission over the first channel in the first frequency band; and a second baseband processor to encode and modulate the second plurality of data bits according to a second OFDM MCS for transmission over the second channel in the second frequency band.

Example 18 includes the subject matter of Example 17, and optionally, wherein the segment parser is configured to determine a first number of data bits per OFDM symbol based on one or more first parameters corresponding to the first channel in the first frequency band, to determine a second number of data bits per OFDM symbol based on one or more second parameters corresponding to the second channel in the second frequency band, to parse the scrambled data bits of the PPDU into the first plurality of data bits based on the first number of data bits per OFDM symbol, and to parse the scrambled data bits of the PPDU into the second plurality of data bits based on the second number of data bits per OFDM symbol.

Example 19 includes the subject matter of Example 18, and optionally, wherein the one or more first parameters comprise at least one of a number of coded bits per subcarrier for the first channel in the first frequency band, a number of OFDM subcarriers for the first channel in the first frequency band, or a coding rate for the first channel in the first frequency band, and wherein the one or more second parameters comprise at least one of a number of coded bits per subcarrier for the second channel in the second frequency band, a number of OFDM subcarriers for the second channel in the second frequency band, or a coding rate for the second channel in the second frequency band.

Example 20 includes the subject matter of Example 18 or 19, and optionally, wherein the segment parser is configured to determine a total number of scrambled data bits per OFDM symbol to be transmitted over the aggregated bandwidth based on the first number of data bits per OFDM symbol and the second number of data bits per OFDM symbol, to group the scrambled data bits of the PPDU into a plurality of data bit groups, a group of the plurality of data bit groups comprising the total number of scrambled data bits per OFDM symbol, and to parse the group into the first plurality of data bits and the second plurality of data bits.

Example 21 includes the subject matter of any one of Examples 17-20, and optionally, wherein the first channel comprises a first aggregated channel comprising an aggregation of a first channel bandwidth in the first frequency band and a second channel bandwidth in the first frequency band, and wherein the second channel comprises a second aggregated channel comprising an aggregation of a first channel bandwidth in the second frequency band and a second channel bandwidth in the second frequency band.

Example 22 includes the subject matter of Example 21, and optionally, wherein the first baseband processor comprises a first encoder to encode the first plurality of data bits into a first plurality of encoded data bits, and a first stream parser to parse the first plurality of encoded data bits into a first plurality of spatial streams, and wherein the second baseband processor comprises a second encoder to encode the second plurality of data bits into a second plurality of encoded data bits, and a second stream parser to parse the second plurality of encoded data bits into a second plurality of spatial streams.

Example 23 includes the subject matter of Example 21 or 22, and optionally, wherein the first aggregated channel comprises a 160 Megahertz (MHz) channel, the first channel bandwidth in the first frequency band comprises a first 80 MHz channel bandwidth, the second channel bandwidth in the first frequency band comprises a second 80 MHz channel bandwidth, the first channel bandwidth in the second frequency band comprises a third 80 MHz channel bandwidth, and the second channel bandwidth in the second frequency band comprises a fourth 80 MHz channel bandwidth.

Example 24 includes the subject matter of Example 22 or 23, and optionally, wherein the first encoder comprises a first Binary Convolutional Code (BCC) encoder, and the second encoder comprising a second BCC encoder.

Example 25 includes the subject matter of any one of Examples 21-24, and optionally, wherein the first channel bandwidth in the first frequency band is contiguous to the second channel bandwidth in the first frequency band first, and wherein the first channel bandwidth in the second frequency band is contiguous to the second channel bandwidth in the second frequency band.

Example 26 includes the subject matter of any one of Examples 21-24, and optionally, wherein the first channel bandwidth in the first frequency band is non-contiguous to the second channel bandwidth in the first frequency band, and wherein the first channel bandwidth in the second frequency band is non-contiguous to the second channel bandwidth in the second frequency band.

Example 27 includes the subject matter of any one of Examples 17-26, and optionally, wherein the aggregated bandwidth comprises a 320 Megahertz (MHz) channel, the first channel comprising a first 160 MHz channel, and the second channel comprising a second 160 MHz channel.

Example 28 includes the subject matter of any one of Examples 17-26, and optionally, wherein the first channel comprises a first 160 MHz channel, 80 MHz channel or 40 MHz channel, and the second channel comprises a second 160 MHz channel, 80 MHz channel or 40 MHz channel.

Example 29 includes the subject matter of any one of Examples 17-28, and optionally, wherein the aggregated bandwidth comprises a wide channel bandwidth (BW) of at least 160 Megahertz (MHz), the wide channel BW covering at least first and second consecutive 80 MHz channel BWs, the OFDM transmitter configured to transmit the PPDU over the wide channel BW according to a tone plan comprising a wide resource unit (RU) comprising at least 1992 tones, the tone plan comprising 996 tones of the first 80 MHz channel BW assigned to a first portion of the wide RU, 996 tones of the second 80 MHz channel BW assigned to a second portion of the wide RU, and a Direct Current (DC) portion between the first and second portions of the wide RU comprising a plurality of guard tones that separate between the first and second 80 MHz channel BWs.

Example 30 includes the subject matter of any one of Examples 17-29, and optionally, wherein the first frequency band comprises a 6 Gigahertz (GHz) wireless frequency band, and the second frequency band comprises a 5 GHz wireless frequency band or a 2.4 GHz wireless frequency band.

Example 31 includes the subject matter of any one of Examples 17-29, and optionally, wherein the first channel in the first frequency band comprises a first channel in a 6 Gigahertz (GHz) wireless frequency band, and the second channel in the second frequency band comprises a second channel in the 6 GHz wireless frequency band.

Example 32 includes a method to be performed at an Orthogonal Frequency-Division Multiplexing (OFDM) transmitter, the method comprising parsing scrambled data bits of a Physical layer (PHY) Protocol Data Unit (PPDU) into a first plurality of data bits and a second plurality of data bits, the PPDU to be transmitted in an OFDM transmission over an aggregated bandwidth comprising a first channel in a first frequency band and a second channel in a second frequency band, the first plurality of data bits to be transmitted over the first channel in the first frequency band, the second plurality of data bits to be transmitted over the second channel in the second frequency band; encoding and modulating, at a first baseband processor, the first plurality of data bits according to a first OFDM Modulation and Coding Scheme (MC S) for transmission over the first channel in the first frequency band; and encoding and modulating, at a second baseband processor, the second plurality of data bits according to a second OFDM MCS for transmission over the second channel in the second frequency band.

Example 33 includes the subject matter of Example 32, and optionally, comprising determining a first number of data bits per OFDM symbol based on one or more first parameters corresponding to the first channel in the first frequency band, determining a second number of data bits per OFDM symbol based on one or more second parameters corresponding to the second channel in the second frequency band, parsing the scrambled data bits of the PPDU into the first plurality of data bits based on the first number of data bits per OFDM symbol, and parsing the scrambled data bits of the PPDU into the second plurality of data bits based on the second number of data bits per OFDM symbol.

Example 34 includes the subject matter of Example 33, and optionally, wherein the one or more first parameters comprise at least one of a number of coded bits per subcarrier for the first channel in the first frequency band, a number of OFDM subcarriers for the first channel in the first frequency band, or a coding rate for the first channel in the first frequency band, and wherein the one or more second parameters comprise at least one of a number of coded bits per subcarrier for the second channel in the second frequency band, a number of OFDM subcarriers for the second channel in the second frequency band, or a coding rate for the second channel in the second frequency band.

Example 35 includes the subject matter of Example 33 or 34, and optionally, comprising determining a total number of scrambled data bits per OFDM symbol to be transmitted over the aggregated bandwidth based on the first number of data bits per OFDM symbol and the second number of data bits per OFDM symbol, grouping the scrambled data bits of the PPDU into a plurality of data bit groups, a group of the plurality of data bit groups comprising the total number of scrambled data bits per OFDM symbol, and parsing the group into the first plurality of data bits and the second plurality of data bits.

Example 36 includes the subject matter of any one of Examples 32-35, and optionally, wherein the first channel comprises a first aggregated channel comprising an aggregation of a first channel bandwidth in the first frequency band and a second channel bandwidth in the first frequency band, and wherein the second channel comprises a second aggregated channel comprising an aggregation of a first channel bandwidth in the second frequency band and a second channel bandwidth in the second frequency band.

Example 37 includes the subject matter of Example 36, and optionally, comprising encoding the first plurality of data bits into a first plurality of encoded data bits, parsing the first plurality of encoded data bits into a first plurality of spatial streams, encoding the second plurality of data bits into a second plurality of encoded data bits, and parsing the second plurality of encoded data bits into a second plurality of spatial streams.

Example 38 includes the subject matter of Example 36 or 37, and optionally, wherein the first aggregated channel comprises a 160 Megahertz (MHz) channel, the first channel bandwidth in the first frequency band comprises a first 80 MHz channel bandwidth, the second channel bandwidth in the first frequency band comprises a second 80 MHz channel bandwidth, the first channel bandwidth in the second frequency band comprises a third 80 MHz channel bandwidth, and the second channel bandwidth in the second frequency band comprises a fourth 80 MHz channel bandwidth.

Example 39 includes the subject matter of Example 37 or 38, and optionally, comprising encoding the first plurality of data bits according to a first Binary Convolutional Code (BCC), and encoding the second plurality of data bits according to a second BCC encoder.

Example 40 includes the subject matter of any one of Examples 36-39, and optionally, wherein the first channel bandwidth in the first frequency band is contiguous to the second channel bandwidth in the first frequency band first, and wherein the first channel bandwidth in the second frequency band is contiguous to the second channel bandwidth in the second frequency band.

Example 41 includes the subject matter of any one of Examples 36-39, and optionally, wherein the first channel bandwidth in the first frequency band is non-contiguous to the second channel bandwidth in the first frequency band, and wherein the first channel bandwidth in the second frequency band is non-contiguous to the second channel bandwidth in the second frequency band.

Example 42 includes the subject matter of any one of Examples 32-41, and optionally, wherein the aggregated bandwidth comprises a 320 Megahertz (MHz) channel, the first channel comprising a first 160 MHz channel, and the second channel comprising a second 160 MHz channel.

Example 43 includes the subject matter of any one of Examples 32-41, and optionally, wherein the first channel comprises a first 160 MHz channel, 80 MHz channel or 40

MHz channel, and the second channel comprises a second 160 MHz channel, 80 MHz channel or 40 MHz channel.

Example 44 includes the subject matter of any one of Examples 32-43, and optionally, wherein the aggregated bandwidth comprises a wide channel bandwidth (BW) of at least 160 Megahertz (MHz), the wide channel BW covering at least first and second consecutive 80 MHz channel BWs, the method comprising transmitting the PPDU over the wide channel BW according to a tone plan comprising a wide resource unit (RU) comprising at least 1992 tones, the tone plan comprising 996 tones of the first 80 MHz channel BW assigned to a first portion of the wide RU, 996 tones of the second 80 MHz channel BW assigned to a second portion of the wide RU, and a Direct Current (DC) portion between the first and second portions of the wide RU comprising a plurality of guard tones that separate between the first and second 80 MHz channel BWs.

Example 45 includes the subject matter of any one of Examples 32-44, and optionally, wherein the first frequency band comprises a 6 Gigahertz (GHz) wireless frequency band, and the second frequency band comprises a 5 GHz wireless frequency band or a 2.4 GHz wireless frequency band.

Example 46 includes the subject matter of any one of Examples 32-44, and optionally, wherein the first channel in the first frequency band comprises a first channel in a 6 Gigahertz (GHz) wireless frequency band, and the second channel in the second frequency band comprises a second channel in the 6 GHz wireless frequency band.

Example 47 includes a product comprising one or more tangible computer-readable non-transitory storage media comprising computer-executable instructions operable to, when executed by at least one processor, enable the at least one processor to cause an Orthogonal Frequency-Division Multiplexing (OFDM) transmitter to parse scrambled data bits of a Physical layer (PHY) Protocol Data Unit (PPDU) into a first plurality of data bits and a second plurality of data bits, the PPDU to be transmitted in an OFDM transmission over an aggregated bandwidth comprising a first channel in a first frequency band and a second channel in a second frequency band, the first plurality of data bits to be transmitted over the first channel in the first frequency band, the second plurality of data bits to be transmitted over the second channel in the second frequency band; encode and modulate, at a first baseband processor, the first plurality of data bits according to a first OFDM Modulation and Coding Scheme (MCS) for transmission over the first channel in the first frequency band; and encode and modulate, at a second baseband processor, the second plurality of data bits according to a second OFDM MCS for transmission over the second channel in the second frequency band.

Example 48 includes the subject matter of Example 47, and optionally, wherein the instructions, when executed, cause the OFDM transmitter to determine a first number of data bits per OFDM symbol based on one or more first parameters corresponding to the first channel in the first frequency band, to determine a second number of data bits per OFDM symbol based on one or more second parameters corresponding to the second channel in the second frequency band, to parse the scrambled data bits of the PPDU into the first plurality of data bits based on the first number of data bits per OFDM symbol, and to parse the scrambled data bits of the PPDU into the second plurality of data bits based on the second number of data bits per OFDM symbol.

Example 49 includes the subject matter of Example 48, and optionally, wherein the one or more first parameters comprise at least one of a number of coded bits per subcarrier for the first channel in the first frequency band, a number of OFDM subcarriers for the first channel in the first frequency band, or a coding rate for the first channel in the first frequency band, and wherein the one or more second parameters comprise at least one of a number of coded bits per subcarrier for the second channel in the second frequency band, a number of OFDM subcarriers for the second channel in the second frequency band, or a coding rate for the second channel in the second frequency band.

Example 50 includes the subject matter of Example 48 or 49, and optionally, wherein the instructions, when executed, cause the OFDM transmitter to determine a total number of scrambled data bits per OFDM symbol to be transmitted over the aggregated bandwidth based on the first number of data bits per OFDM symbol and the second number of data bits per OFDM symbol, to group the scrambled data bits of the PPDU into a plurality of data bit groups, a group of the plurality of data bit groups comprising the total number of scrambled data bits per OFDM symbol, and to parse the group into the first plurality of data bits and the second plurality of data bits.

Example 51 includes the subject matter of any one of Examples 47-50, and optionally, wherein the first channel comprises a first aggregated channel comprising an aggregation of a first channel bandwidth in the first frequency band and a second channel bandwidth in the first frequency band, and wherein the second channel comprises a second aggregated channel comprising an aggregation of a first channel bandwidth in the second frequency band and a second channel bandwidth in the second frequency band.

Example 52 includes the subject matter of Example 51, and optionally, wherein the instructions, when executed, cause the OFDM transmitter to encode the first plurality of data bits into a first plurality of encoded data bits, parse the first plurality of encoded data bits into a first plurality of spatial streams, encode the second plurality of data bits into a second plurality of encoded data bits, and parse the second plurality of encoded data bits into a second plurality of spatial streams.

Example 53 includes the subject matter of Example 51 or 52, and optionally, wherein the first aggregated channel comprises a 160 Megahertz (MHz) channel, the first channel bandwidth in the first frequency band comprises a first 80 MHz channel bandwidth, the second channel bandwidth in the first frequency band comprises a second 80 MHz channel bandwidth, the first channel bandwidth in the second frequency band comprises a third 80 MHz channel bandwidth, and the second channel bandwidth in the second frequency band comprises a fourth 80 MHz channel bandwidth.

Example 54 includes the subject matter of Example 52 or 53, and optionally, wherein the instructions, when executed, cause the OFDM transmitter to encode the first plurality of data bits according to a first Binary Convolutional Code (BCC), and to encode the second plurality of data bits according to a second BCC.

Example 55 includes the subject matter of any one of Examples 51-54, and optionally, wherein the first channel bandwidth in the first frequency band is contiguous to the second channel bandwidth in the first frequency band first, and wherein the first channel bandwidth in the second frequency band is contiguous to the second channel bandwidth in the second frequency band.

Example 56 includes the subject matter of any one of Examples 51-54, and optionally, wherein the first channel bandwidth in the first frequency band is non-contiguous to the second channel bandwidth in the first frequency band, and wherein the first channel bandwidth in the second frequency band is non-contiguous to the second channel bandwidth in the second frequency band.

Example 57 includes the subject matter of any one of Examples 47-56, and optionally, wherein the aggregated bandwidth comprises a 320 Megahertz (MHz) channel, the first channel comprising a first 160 MHz channel, and the second channel comprising a second 160 MHz channel.

Example 58 includes the subject matter of any one of Examples 47-56, and optionally, wherein the first channel comprises a first 160 MHz channel, 80 MHz channel or 40 MHz channel, and the second channel comprises a second 160 MHz channel, 80 MHz channel or 40 MHz channel.

Example 59 includes the subject matter of any one of Examples 47-58, and optionally, wherein the aggregated bandwidth comprises a wide channel bandwidth (BW) of at least 160 Megahertz (MHz), the wide channel BW covering at least first and second consecutive 80 MHz channel BWs, the instructions, when executed, cause the OFDM transmitter to transmit the PPDU over the wide channel BW according to a tone plan comprising a wide resource unit (RU) comprising at least 1992 tones, the tone plan comprising 996 tones of the first 80 MHz channel BW assigned to a first portion of the wide RU, 996 tones of the second 80 MHz channel BW assigned to a second portion of the wide RU, and a Direct Current (DC) portion between the first and second portions of the wide RU comprising a plurality of guard tones that separate between the first and second 80 MHz channel BWs.

Example 60 includes the subject matter of any one of Examples 47-59, and optionally, wherein the first frequency band comprises a 6 Gigahertz (GHz) wireless frequency band, and the second frequency band comprises a 5 GHz wireless frequency band or a 2.4 GHz wireless frequency band.

Example 61 includes the subject matter of any one of Examples 47-59, and optionally, wherein the first channel in the first frequency band comprises a first channel in a 6 Gigahertz (GHz) wireless frequency band, and the second channel in the second frequency band comprises a second channel in the 6 GHz wireless frequency band.

Example 62 includes an apparatus of wireless communication by an Orthogonal Frequency-Division Multiplexing (OFDM) transmitter, the apparatus comprising means for parsing scrambled data bits of a Physical layer (PHY) Protocol Data Unit (PPDU) into a first plurality of data bits and a second plurality of data bits, the PPDU to be transmitted in an OFDM transmission over an aggregated bandwidth comprising a first channel in a first frequency band and a second channel in a second frequency band, the first plurality of data bits to be transmitted over the first channel in the first frequency band, the second plurality of data bits to be transmitted over the second channel in the second frequency band; means for encoding and modulating, at a first baseband processor, the first plurality of data bits according to a first OFDM Modulation and Coding Scheme (MCS) for transmission over the first channel in the first frequency band; and means for encoding and modulating, at a second baseband processor, the second plurality of data bits according to a second OFDM MCS for transmission over the second channel in the second frequency band.

Example 63 includes the subject matter of Example 62, and optionally, comprising means for determining a first number of data bits per OFDM symbol based on one or more first parameters corresponding to the first channel in the first frequency band, determining a second number of data bits per OFDM symbol based on one or more second parameters corresponding to the second channel in the second frequency band, parsing the scrambled data bits of the PPDU into the first plurality of data bits based on the first number of data bits per OFDM symbol, and parsing the scrambled data bits of the PPDU into the second plurality of data bits based on the second number of data bits per OFDM symbol.

Example 64 includes the subject matter of Example 63, and optionally, wherein the one or more first parameters comprise at least one of a number of coded bits per subcarrier for the first channel in the first frequency band, a number of OFDM subcarriers for the first channel in the first frequency band, or a coding rate for the first channel in the first frequency band, and wherein the one or more second parameters comprise at least one of a number of coded bits per subcarrier for the second channel in the second frequency band, a number of OFDM subcarriers for the second channel in the second frequency band, or a coding rate for the second channel in the second frequency band.

Example 65 includes the subject matter of Example 63 or 64, and optionally, comprising means for determining a total number of scrambled data bits per OFDM symbol to be transmitted over the aggregated bandwidth based on the first number of data bits per OFDM symbol and the second number of data bits per OFDM symbol, grouping the scrambled data bits of the PPDU into a plurality of data bit groups, a group of the plurality of data bit groups comprising the total number of scrambled data bits per OFDM symbol, and parsing the group into the first plurality of data bits and the second plurality of data bits.

Example 66 includes the subject matter of any one of Examples 62-65, and optionally, wherein the first channel comprises a first aggregated channel comprising an aggregation of a first channel bandwidth in the first frequency band and a second channel bandwidth in the first frequency band, and wherein the second channel comprises a second aggregated channel comprising an aggregation of a first channel bandwidth in the second frequency band and a second channel bandwidth in the second frequency band.

Example 67 includes the subject matter of Example 66, and optionally, comprising means for encoding the first plurality of data bits into a first plurality of encoded data bits, parsing the first plurality of encoded data bits into a first plurality of spatial streams, encoding the second plurality of data bits into a second plurality of encoded data bits, and parsing the second plurality of encoded data bits into a second plurality of spatial streams.

Example 68 includes the subject matter of Example 66 or 67, and optionally, wherein the first aggregated channel comprises a 160 Megahertz (MHz) channel, the first channel bandwidth in the first frequency band comprises a first 80 MHz channel bandwidth, the second channel bandwidth in the first frequency band comprises a second 80 MHz channel bandwidth, the first channel bandwidth in the second frequency band comprises a third 80 MHz channel bandwidth, and the second channel bandwidth in the second frequency band comprises a fourth 80 MHz channel bandwidth.

Example 69 includes the subject matter of Example 67 or 68, and optionally, comprising means for encoding the first plurality of data bits according to a first Binary Convolutional Code (BCC), and encoding the second plurality of data bits according to a second BCC.

Example 70 includes the subject matter of any one of Examples 66-69, and optionally, wherein the first channel bandwidth in the first frequency band is contiguous to the second channel bandwidth in the first frequency band first, and wherein the first channel bandwidth in the second frequency band is contiguous to the second channel bandwidth in the second frequency band.

Example 71 includes the subject matter of any one of Examples 66-69, and optionally, wherein the first channel bandwidth in the first frequency band is non-contiguous to the second channel bandwidth in the first frequency band, and wherein the first channel bandwidth in the second frequency band is non-contiguous to the second channel bandwidth in the second frequency band.

Example 72 includes the subject matter of any one of Examples 62-71, and optionally, wherein the aggregated bandwidth comprises a 320 Megahertz (MHz) channel, the first channel comprising a first 160 MHz channel, and the second channel comprising a second 160 MHz channel.

Example 73 includes the subject matter of any one of Examples 62-71, and optionally, wherein the first channel comprises a first 160 MHz channel, 80 MHz channel or 40 MHz channel, and the second channel comprises a second 160 MHz channel, 80 MHz channel or 40 MHz channel.

Example 74 includes the subject matter of any one of Examples 62-73, and optionally, wherein the aggregated bandwidth comprises a wide channel bandwidth (BW) of at least 160 Megahertz (MHz), the wide channel BW covering at least first and second consecutive 80 MHz channel BWs, the apparatus comprising means for transmitting the PPDU over the wide channel BW according to a tone plan comprising a wide resource unit (RU) comprising at least 1992 tones, the tone plan comprising 996 tones of the first 80 MHz channel BW assigned to a first portion of the wide RU, 996 tones of the second 80 MHz channel BW assigned to a second portion of the wide RU, and a Direct Current (DC) portion between the first and second portions of the wide RU comprising a plurality of guard tones that separate between the first and second 80 MHz channel BWs.

Example 75 includes the subject matter of any one of Examples 62-74, and optionally, wherein the first frequency band comprises a 6 Gigahertz (GHz) wireless frequency band, and the second frequency band comprises a 5 GHz wireless frequency band or a 2.4 GHz wireless frequency band.

Example 76 includes the subject matter of any one of Examples 62-74, and optionally, wherein the first channel in the first frequency band comprises a first channel in a 6 Gigahertz (GHz) wireless frequency band, and the second channel in the second frequency band comprises a second channel in the 6 GHz wireless frequency band.

Example 77 includes an apparatus of Orthogonal Frequency-Division Multiplexing (OFDM) transmission, the apparatus comprising an encoder to encode scrambled data bits of a Physical layer (PHY) Protocol Data Unit (PPDU) into encoded data bits, the PPDU to be transmitted in an OFDM transmission over a 320 Megahertz (MHz) aggregated bandwidth comprising first and second contiguous 160 MHz channels in a 6 Gigahertz (GHz) frequency band; a stream parser to parse the encoded data bits of the PPDU into a plurality of data streams; a plurality of 160 MHz segment parsers to parse the plurality of data streams into first and second pluralities of 80 MHz frequency blocks, a 160 MHz segment parser of the plurality of segment parsers to parse a respective data stream of the plurality of data streams into a first 80 MHz frequency block of the first plurality of 80 MHz frequency blocks and into a second 80 MHz frequency block of the second plurality of 80 Mhz frequency blocks; and a first baseband processor to process the first plurality of 80 MHz frequency blocks; and a second baseband processor to process the second plurality of 80 MHz frequency blocks.

Example 78 includes the subject matter of Example 77, and optionally, comprising a plurality of 160 MHz segment deparsers to deparse a plurality of first outputs of the first baseband processor and a plurality of second outputs of the second baseband processor into a plurality of 160 MHz frequency segments, a 160 MHz segment deparser of the plurality of 160 MHz segment deparsers to deparse a first output of the plurality of first outputs of the first baseband processor and a second output of the plurality of second outputs of the second baseband processor into a 160 MHz frequency segment of the plurality of 160 MHz frequency segments.

Example 79 includes the subject matter of Example 78, and optionally, comprising a Space Time Block Code (STBC) encoder to encode the plurality of 160 MHz frequency segments according to an STBC encoding scheme.

Example 80 includes the subject matter of any one of Examples 77-79, and optionally, wherein the first 160 MHz channel in the 6 GHz frequency band comprises a first aggregated channel comprising an aggregation of a first 80 MHz channel bandwidth (BW) and a second 80 MHz channel BW, and wherein the second 160 MHz channel in the 6 GHz frequency band comprises a second aggregated channel comprising an aggregation of a third 80 MHz channel BW and a fourth 80 MHz channel BW.

Example 81 includes the subject matter of Example 80, and optionally, wherein the apparatus is configured to transmit the PPDU over the aggregated bandwidth according to a tone plan comprising a wide resource unit (RU) comprising at least 3984 tones, the tone plan comprising 996 tones of the first 80 MHz channel BW assigned to a first portion of the wide RU, 996 tones of the second 80 MHz channel BW assigned to a second portion of the wide RU, 996 tones of the third 80 MHz channel BW assigned to a third portion of the wide RU, 996 tones of the fourth 80 MHz channel BW assigned to a fourth portion of the wide RU, and a Direct Current (DC) portion between the second and third portions of the wide RU comprising a plurality of guard tones that separate between the second and third 80 MHz channel BWs.

Example 82 includes the subject matter of any one of Examples 77-81, and optionally, comprising one or more antennas, a memory and a processor.

Example 83 includes a system of wireless communication comprising a wireless communication station (STA), the STA comprising one or more antennas; a memory; a processor; and an Orthogonal Frequency-Division Multiplexing (OFDM) transmitter comprising an encoder to encode scrambled data bits of a Physical layer (PHY) Protocol Data Unit (PPDU) into encoded data bits, the PPDU to be transmitted in an OFDM transmission over a 320 Megahertz (MHz) aggregated bandwidth comprising first and second contiguous 160 MHz channels in a 6 Gigahertz (GHz) frequency band; a stream parser to parse the encoded data bits of the PPDU into a plurality of data streams; a plurality of 160 MHz segment parsers to parse the plurality of data streams into first and second pluralities of 80 MHz frequency blocks, a 160 MHz segment parser of the plurality of segment parsers to parse a respective data stream of the plurality of data streams into a first 80 MHz frequency block of the first plurality of 80 MHz frequency blocks and into a second 80 MHz frequency block of the second plurality of 80 Mhz frequency blocks; a first baseband processor to process the first plurality of 80 MHz frequency blocks; and a second baseband processor to process the second plurality of 80 MHz frequency blocks.

Example 84 includes the subject matter of Example 83, and optionally, wherein the OFDM transmitter comprises a plurality of 160 MHz segment deparsers to deparse a plurality of first outputs of the first baseband processor and a plurality of second outputs of the second baseband processor into a plurality of 160 MHz frequency segments, a 160 MHz segment deparser of the plurality of 160 MHz segment deparsers to deparse a first output of the plurality of first outputs of the first baseband processor and a second output of the plurality of second outputs of the second baseband processor into a 160 MHz frequency segment of the plurality of 160 MHz frequency segments.

Example 85 includes the subject matter of Example 84, and optionally, wherein the OFDM transmitter comprises a Space Time Block Code (STBC) encoder to encode the plurality of 160 MHz frequency segments according to an STBC encoding scheme.

Example 86 includes the subject matter of any one of Examples 83-85, and optionally, wherein the first 160 MHz channel in the 6 GHz frequency band comprises a first aggregated channel comprising an aggregation of a first 80 MHz channel bandwidth (BW) and a second 80 MHz channel BW, and wherein the second 160 MHz channel in the 6 GHz frequency band comprises a second aggregated channel comprising an aggregation of a third 80 MHz channel BW and a fourth 80 MHz channel BW.

Example 87 includes the subject matter of Example 86, and optionally, wherein the OFDM transmitter is configured to transmit the PPDU over the aggregated bandwidth according to a tone plan comprising a wide resource unit (RU) comprising at least 3984 tones, the tone plan comprising 996 tones of the first 80 MHz channel BW assigned to a first portion of the wide RU, 996 tones of the second 80 MHz channel BW assigned to a second portion of the wide RU, 996 tones of the third 80 MHz channel BW assigned to a third portion of the wide RU, 996 tones of the fourth 80 MHz channel BW assigned to a fourth portion of the wide RU, and a Direct Current (DC) portion between the second and third portions of the wide RU comprising a plurality of guard tones that separate between the second and third 80 MHz channel BWs.

Example 88 includes a method to be performed at an Orthogonal Frequency-Division Multiplexing (OFDM) transmitter, the method comprising encoding scrambled data bits of a Physical layer (PHY) Protocol Data Unit (PPDU) into encoded data bits, the PPDU to be transmitted in an OFDM transmission over a 320 Megahertz (MHz) aggregated bandwidth comprising first and second contiguous 160 MHz channels in a 6 Gigahertz (GHz) frequency band; parsing the encoded data bits of the PPDU into a plurality of data streams; parsing, at a plurality of 160 MHz segment parsers, the plurality of data streams into first and second pluralities of 80 MHz frequency blocks, parsing the plurality of data streams comprising parsing, at a 160 MHz segment parser of the plurality of segment parsers, a respective data stream of the plurality of data streams into a first 80 MHz frequency block of the first plurality of 80 MHz frequency blocks and into a second 80 MHz frequency block of the second plurality of 80 Mhz frequency blocks; processing, at a first baseband processor, the first plurality of 80 MHz frequency blocks; and processing, at a second baseband processor, the second plurality of 80 MHz frequency blocks.

Example 89 includes the subject matter of Example 88, and optionally, comprising deparsing, at a plurality of 160 MHz segment deparsers, a plurality of first outputs of the first baseband processor and a plurality of second outputs of the second baseband processor into a plurality of 160 MHz frequency segments, deparsing at the plurality of 160 MHz segment deparsers comprising deparsing, at a 160 MHz segment deparser of the plurality of 160 MHz segment deparsers, a first output of the plurality of first outputs of the first baseband processor and a second output of the plurality of second outputs of the second baseband processor into a 160 MHz frequency segment of the plurality of 160 MHz frequency segments.

Example 90 includes the subject matter of Example 89, and optionally, comprising encoding the plurality of 160 MHz frequency segments according to a Space Time Block Code (STBC) encoding scheme.

Example 91 includes the subject matter of any one of Examples 88-90, and optionally, wherein the first 160 MHz channel in the 6 GHz frequency band comprises a first aggregated channel comprising an aggregation of a first 80 MHz channel bandwidth (BW) and a second 80 MHz channel BW, and wherein the second 160 MHz channel in the 6 GHz frequency band comprises a second aggregated channel comprising an aggregation of a third 80 MHz channel BW and a fourth 80 MHz channel BW.

Example 92 includes the subject matter of Example 91, and optionally, comprising transmitting the PPDU over the aggregated bandwidth according to a tone plan comprising a wide resource unit (RU) comprising at least 3984 tones, the tone plan comprising 996 tones of the first 80 MHz channel BW assigned to a first portion of the wide RU, 996 tones of the second 80 MHz channel BW assigned to a second portion of the wide RU, 996 tones of the third 80 MHz channel BW assigned to a third portion of the wide RU, 996 tones of the fourth 80 MHz channel BW assigned to a fourth portion of the wide RU, and a Direct Current (DC) portion between the second and third portions of the wide RU comprising a plurality of guard tones that separate between the second and third 80 MHz channel BWs.

Example 93 includes a product comprising one or more tangible computer-readable non-transitory storage media comprising computer-executable instructions operable to, when executed by at least one processor, enable the at least one processor to cause an Orthogonal Frequency-Division Multiplexing (OFDM) transmitter to encode scrambled data bits of a Physical layer (PHY) Protocol Data Unit (PPDU) into encoded data bits, the PPDU to be transmitted in an OFDM transmission over a 320 Megahertz (MHz) aggregated bandwidth comprising first and second contiguous 160 MHz channels in a 6 Gigahertz (GHz) frequency band; parse the encoded data bits of the PPDU into a plurality of data streams; parse, at a plurality of 160 MHz segment parsers, the plurality of data streams into first and second pluralities of 80 MHz frequency blocks, parsing at the plurality of 160 MHz segment parsers comprising parsing, at a 160 MHz segment parser of the plurality of segment parsers, a respective data stream of the plurality of data streams into a first 80 MHz frequency block of the first plurality of 80 MHz frequency blocks and into a second 80 MHz frequency block of the second plurality of 80 Mhz frequency blocks; process, at a first baseband processor, the first plurality of 80 MHz frequency blocks; and process, at a second baseband processor, the second plurality of 80 MHz frequency blocks.

Example 94 includes the subject matter of Example 93, and optionally, wherein the instructions, when executed, cause the OFDM transmitter to deparse, at a plurality of 160 MHz segment deparsers, a plurality of first outputs of the first baseband processor and a plurality of second outputs of the second baseband processor into a plurality of 160 MHz frequency segments, the instructions, when executed, cause the OFDM transmitter to deparse, at a 160 MHz segment deparser of the plurality of 160 MHz segment deparsers, a first output of the plurality of first outputs of the first baseband processor and a second output of the plurality of second outputs of the second baseband processor into a 160 MHz frequency segment of the plurality of 160 MHz frequency segments.

Example 95 includes the subject matter of Example 94, and optionally, wherein the instructions, when executed, cause the OFDM transmitter to encode the plurality of 160 MHz frequency segments according to a Space Time Block Code (STBC) encoding scheme.

Example 96 includes the subject matter of any one of Examples 93-95, and optionally, wherein the first 160 MHz channel in the 6 GHz frequency band comprises a first aggregated channel comprising an aggregation of a first 80 MHz channel bandwidth (BW) and a second 80 MHz channel BW, and wherein the second 160 MHz channel in the 6 GHz frequency band comprises a second aggregated channel comprising an aggregation of a third 80 MHz channel BW and a fourth 80 MHz channel BW.

Example 97 includes the subject matter of Example 96, and optionally, wherein the instructions, when executed, cause the OFDM transmitter to transmit the PPDU over the aggregated bandwidth according to a tone plan comprising a wide resource unit (RU) comprising at least 3984 tones, the tone plan comprising 996 tones of the first 80 MHz channel BW assigned to a first portion of the wide RU, 996 tones of the second 80 MHz channel BW assigned to a second portion of the wide RU, 996 tones of the third 80 MHz channel BW assigned to a third portion of the wide RU, 996 tones of the fourth 80 MHz channel BW assigned to a fourth portion of the wide RU, and a Direct Current (DC) portion between the second and third portions of the wide RU comprising a plurality of guard tones that separate between the second and third 80 MHz channel BWs.

Example 98 includes an apparatus of wireless communication by an Orthogonal Frequency-Division Multiplexing (OFDM) transmitter, the apparatus comprising means for encoding scrambled data bits of a Physical layer (PHY) Protocol Data Unit (PPDU) into encoded data bits, the PPDU to be transmitted in an OFDM transmission over a 320 Megahertz (MHz) aggregated bandwidth comprising first and second contiguous 160 MHz channels in a 6 Gigahertz (GHz) frequency band; means for parsing the encoded data bits of the PPDU into a plurality of data streams; means for parsing, at a plurality of 160 MHz segment parsers, the plurality of data streams into first and second pluralities of 80 MHz frequency blocks, parsing the plurality of data streams comprising parsing, at a 160 MHz segment parser of the plurality of segment parsers, a respective data stream of the plurality of data streams into a first 80 MHz frequency block of the first plurality of 80 MHz frequency blocks and into a second 80 MHz frequency block of the second plurality of 80 Mhz frequency blocks; means for processing, at a first baseband processor, the first plurality of 80 MHz frequency blocks; and means for processing, at a second baseband processor, the second plurality of 80 MHz frequency blocks.

Example 99 includes the subject matter of Example 98, and optionally, comprising means for deparsing, at a plurality of 160 MHz segment deparsers, a plurality of first outputs of the first baseband processor and a plurality of second outputs of the second baseband processor into a plurality of 160 MHz frequency segments, the means for deparsing at the plurality of 160 MHz segment deparsers comprising means for deparsing, at a 160 MHz segment deparser of the plurality of 160 MHz segment deparsers, a first output of the plurality of first outputs of the first baseband processor and a second output of the plurality of second outputs of the second baseband processor into a 160 MHz frequency segment of the plurality of 160 MHz frequency segments.

Example 100 includes the subject matter of Example 99, and optionally, comprising means for encoding the plurality of 160 MHz frequency segments according to a Space Time Block Code (STBC) encoding scheme.

Example 101 includes the subject matter of any one of Examples 98-100, and optionally, wherein the first 160 MHz channel in the 6 GHz frequency band comprises a first aggregated channel comprising an aggregation of a first 80 MHz channel bandwidth (BW) and a second 80 MHz channel BW, and wherein the second 160 MHz channel in the 6 GHz frequency band comprises a second aggregated channel comprising an aggregation of a third 80 MHz channel BW and a fourth 80 MHz channel BW.

Example 102 includes the subject matter of Example 101, and optionally, comprising means for transmitting the PPDU over the aggregated bandwidth according to a tone plan comprising a wide resource unit (RU) comprising at least 3984 tones, the tone plan comprising 996 tones of the first 80 MHz channel BW assigned to a first portion of the wide RU, 996 tones of the second 80 MHz channel BW assigned to a second portion of the wide RU, 996 tones of the third 80 MHz channel BW assigned to a third portion of the wide RU, 996 tones of the fourth 80 MHz channel BW assigned to a fourth portion of the wide RU, and a Direct Current (DC) portion between the second and third portions of the wide RU comprising a plurality of guard tones that separate between the second and third 80 MHz channel BWs.

Example 103 includes an apparatus comprising circuitry and logic configured to cause a wireless communication station (STA) to generate a Physical layer (PHY) Protocol Data Unit (PPDU) for transmission over a wide channel bandwidth (BW) of at least 160 Megahertz (MHz), the wide channel BW covering at least first and second consecutive 80 MHz channel BWs; and communicate the PPDU over the wide channel BW according to a tone plan comprising a wide resource unit (RU) comprising at least 1992 tones, the tone plan comprising 996 tones of the first 80 MHz channel BW assigned to a first portion of the wide RU, 996 tones of the second 80 MHz channel BW assigned to a second portion of the wide RU, and a Direct Current (DC) portion between the first and second portions of the wide RU comprising a plurality of guard tones that separate between the first and second 80 MHz channel BWs.

Example 104 includes the subject matter of Example 103, and optionally, wherein the wide RU comprises 1992 tones.

Example 105 includes the subject matter of Example 104, and optionally, wherein the tone plan comprises a first null portion and a second null portion, the first null portion between a first sub-portion and a second sub-portion of the first portion of the wide RU, the second null portion between a first sub-portion and a second sub-portion of the second portion of the wide RU, the first null portion comprising a plurality of DC tones of the first 80 MHz channel BW, the second null portion comprising a plurality of DC tones of the second 80 MHz channel BW.

Example 106 includes the subject matter of Example 105, and optionally, wherein each of the first and second null portions comprises 5 null tones.

Example 107 includes the subject matter of any one of Examples 104-106, and optionally, wherein the DC portion comprises 5 DC tones, 9 null tones on a first side of the 5 DC tones, and 9 null tones on a second side of the 5 DC tones.

Example 108 includes the subject matter of any one of Examples 104-106, and optionally, wherein the DC portion comprises 7 DC tones, 8 null tones on a first side of the 7 DC tones, and 8 null tones on a second side of the 7 DC tones.

Example 109 includes the subject matter of any one of Examples 104-106, and optionally, wherein the apparatus is configured to cause the STA to communicate the PPDU as a Multi-User (MU) PPDU in a MU transmission to a plurality of users over the wide channel BW.

Example 110 includes the subject matter of Example 103, and optionally, wherein the wide RU comprises 2018 tones, each of the first and second portions of the wide RU comprising 1009 tones, and the DC portion comprising 7 DC tones.

Example 111 includes the subject matter of Example 103, and optionally, wherein the wide RU comprises 2020 tones, each of the first and second portions of the wide RU comprising 1010 tones, and the DC portion comprising 7 DC tones.

Example 112 includes the subject matter of Example 103, and optionally, wherein the wide channel BW comprises a channel BW of 320 MHz, the wide channel BW covering the first 80 MHz channel BW, the second 80 MHz channel BW, a third 80 MHz channel BW, and a fourth 80 MHz channel BW, the wide RU comprising at least 3984 tones, the tone plan comprising 996 tones of the third 80 MHz channel BW assigned to a third portion the wide RU, and 996 tones of the fourth 80 MHz channel BW assigned to a fourth portion of the wide RU, the third portion of the wide RU before the first portion of the wide RU and the fourth portion of the wide RU after the second portion of the wide RU.

Example 113 includes the subject matter of Example 112, and optionally, wherein the wide RU comprises 3984 tones.

Example 114 includes the subject matter of Example 113, and optionally, wherein the tone plan comprises a first null portion, a second null portion, a third null portion, and a fourth null portion, the first null portion is between a first sub-portion and a second sub-portion of the first portion of the wide RU, the second null portion is between a first sub-portion and a second sub-portion of the second portion of the wide RU, the third null portion is between a first sub-portion and a second sub-portion of the third portion of the wide RU, the fourth null portion is between a first sub-portion and a second sub-portion of the fourth portion of the wide RU, the first null portion comprising DC tones of the first 80 MHz channel BW, the second null portion comprising DC tones of the second 80 MHz channel BW, the third null portion comprising DC tones of the third 80 MHz channel BW, and the fourth null portion comprising DC tones of the fourth 80 MHz channel BW.

Example 115 includes the subject matter of Example 114, and optionally, wherein each of the first, second, third and fourth null portions comprises 5 null tones.

Example 116 includes the subject matter of any one of Examples 113-115, and optionally, wherein the tone plan comprises a first non-data portion and a second non-data portion, the first non-data portion is between the third and first portions of the wide RU, the second non-data portion is between the second and fourth portions of the wide RU, the first non-data portion comprising a first plurality of guard tones between the third and first 80 MHz channel BWs, and the second non-data portion comprising a second plurality of guard tones between the second and fourth 80 MHz channel BWs.

Example 117 includes the subject matter of Example 116, and optionally, wherein each of the first and second non-data portions of the wide RU comprises 23 null tones.

Example 118 includes the subject matter of any one of Examples 113-117, and optionally, wherein the DC portion comprises 5 DC tones, 9 null tones on a first side of the 5 DC tones, and 9 null tones on a second side of the 5 DC tones.

Example 119 includes the subject matter of Example 112, and optionally, wherein the wide RU comprises 4068 tones.

Example 120 includes the subject matter of Example 119, and optionally, wherein each of the first and second portions of the wide RU comprises 2034 tones, and the DC portion comprises 5 DC tones.

Example 121 includes the subject matter of Example 112, and optionally, wherein the wide RU comprises 4066 tones.

Example 122 includes the subject matter of Example 121, and optionally, wherein each of the first and second portions comprises 2033 tones, and the DC portion comprises 7 DC tones.

Example 123 includes the subject matter of any one of Examples 103-122, and optionally, wherein the tone plan comprises only RUs having a size greater than 26 tones.

Example 124 includes the subject matter of any one of Examples 103-123, and optionally, wherein the tone plan comprises only RUs having a size greater than 52 tones.

Example 125 includes the subject matter of any one of Examples 103-124, and optionally, wherein the tone plan comprises an aggregated RU comprising two or more non-consecutive 26-tone RUs.

Example 126 includes the subject matter of any one of Examples 103-125, and optionally, wherein the apparatus is configured to allow the STA to communicate PPDUs using only an RU size, which is greater than 26 tones.

Example 127 includes a system of wireless communication comprising a wireless communication station (STA), the STA comprising one or more antennas; a radio; a memory; a processor; and a controller configured to cause the STA to generate a Physical layer (PHY) Protocol Data Unit (PPDU) for transmission over a wide channel bandwidth (BW) of at least 160 Megahertz (MHz), the wide channel BW covering at least first and second consecutive 80 MHz channel BWs; and communicate the PPDU over the wide channel BW according to a tone plan comprising a wide resource unit (RU) comprising at least 1992 tones, the tone plan comprising 996 tones of the first 80 MHz channel BW assigned to a first portion of the wide RU, 996 tones of the second 80 MHz channel BW assigned to a second portion of the wide RU, and a Direct Current (DC) portion between the first and second portions of the wide RU comprising a plurality of guard tones that separate between the first and second 80 MHz channel BWs.

Example 128 includes the subject matter of Example 127, and optionally, wherein the wide RU comprises 1992 tones.

Example 129 includes the subject matter of Example 128, and optionally, wherein the tone plan comprises a first null portion and a second null portion, the first null portion between a first sub-portion and a second sub-portion of the first portion of the wide RU, the second null portion between a first sub-portion and a second sub-portion of the second portion of the wide RU, the first null portion comprising a plurality of DC tones of the first 80 MHz channel BW, the second null portion comprising a plurality of DC tones of the second 80 MHz channel BW.

Example 130 includes the subject matter of Example 129, and optionally, wherein each of the first and second null portions comprises 5 null tones.

Example 131 includes the subject matter of any one of Examples 128-130, and optionally, wherein the DC portion comprises 5 DC tones, 9 null tones on a first side of the 5 DC tones, and 9 null tones on a second side of the 5 DC tones.

Example 132 includes the subject matter of any one of Examples 128-130, and optionally, wherein the DC portion comprises 7 DC tones, 8 null tones on a first side of the 7 DC tones, and 8 null tones on a second side of the 7 DC tones.

Example 133 includes the subject matter of any one of Examples 128-130, and optionally, wherein the controller is configured to cause the STA to communicate the PPDU as a Multi-User (MU) PPDU in a MU transmission to a plurality of users over the wide channel BW.

Example 134 includes the subject matter of Example 127, and optionally, wherein the wide RU comprises 2018 tones, each of the first and second portions of the wide RU comprising 1009 tones, and the DC portion comprising 7 DC tones.

Example 135 includes the subject matter of Example 127, and optionally, wherein the wide RU comprises 2020 tones, each of the first and second portions of the wide RU comprising 1010 tones, and the DC portion comprising 7 DC tones.

Example 136 includes the subject matter of Example 127, and optionally, wherein the wide channel BW comprises a channel BW of 320 MHz, the wide channel BW covering the first 80 MHz channel BW, the second 80 MHz channel BW, a third 80 MHz channel BW, and a fourth 80 MHz channel BW, the wide RU comprising at least 3984 tones, the tone plan comprising 996 tones of the third 80 MHz channel BW assigned to a third portion the wide RU, and 996 tones of the fourth 80 MHz channel BW assigned to a fourth portion of the wide RU, the third portion of the wide RU before the first portion of the wide RU and the fourth portion of the wide RU after the second portion of the wide RU.

Example 137 includes the subject matter of Example 136, and optionally, wherein the wide RU comprises 3984 tones.

Example 138 includes the subject matter of Example 137, and optionally, wherein the tone plan comprises a first null portion, a second null portion, a third null portion, and a fourth null portion, the first null portion is between a first sub-portion and a second sub-portion of the first portion of the wide RU, the second null portion is between a first sub-portion and a second sub-portion of the second portion of the wide RU, the third null portion is between a first sub-portion and a second sub-portion of the third portion of the wide RU, the fourth null portion is between a first sub-portion and a second sub-portion of the fourth portion of the wide RU, the first null portion comprising DC tones of the first 80 MHz channel BW, the second null portion comprising DC tones of the second 80 MHz channel BW, the third null portion comprising DC tones of the third 80 MHz channel BW, and the fourth null portion comprising DC tones of the fourth 80 MHz channel BW.

Example 139 includes the subject matter of Example 138, and optionally, wherein each of the first, second, third and fourth null portions comprises 5 null tones.

Example 140 includes the subject matter of any one of Examples 137-139, and optionally, wherein the tone plan comprises a first non-data portion and a second non-data portion, the first non-data portion is between the third and first portions of the wide RU, the second non-data portion is between the second and fourth portions of the wide RU, the first non-data portion comprising a first plurality of guard tones between the third and first 80 MHz channel BWs, and the second non-data portion comprising a second plurality of guard tones between the second and fourth 80 MHz channel BWs.

Example 141 includes the subject matter of Example 140, and optionally, wherein each of the first and second non-data portions of the wide RU comprises 23 null tones.

Example 142 includes the subject matter of any one of Examples 137-141, and optionally, wherein the DC portion comprises 5 DC tones, 9 null tones on a first side of the 5 DC tones, and 9 null tones on a second side of the 5 DC tones.

Example 143 includes the subject matter of Example 136, and optionally, wherein the wide RU comprises 4068 tones.

Example 144 includes the subject matter of Example 143, and optionally, wherein each of the first and second portions of the wide RU comprises 2034 tones, and the DC portion comprises 5 DC tones.

Example 145 includes the subject matter of Example 136, and optionally, wherein the wide RU comprises 4066 tones.

Example 146 includes the subject matter of Example 145, and optionally, wherein each of the first and second portions comprises 2033 tones, and the DC portion comprises 7 DC tones.

Example 147 includes the subject matter of any one of Examples 127-146, and optionally, wherein the tone plan comprises only RUs having a size greater than 26 tones.

Example 148 includes the subject matter of any one of Examples 127-147, and optionally, wherein the tone plan comprises only RUs having a size greater than 52 tones.

Example 149 includes the subject matter of any one of Examples 127-148, and optionally, wherein the tone plan comprises an aggregated RU comprising two or more non-consecutive 26-tone RUs.

Example 150 includes the subject matter of any one of Examples 127-149, and optionally, wherein the controller is configured to allow the STA to communicate PPDUs using only an RU size, which is greater than 26 tones.

Example 151 includes a method to be performed at a wireless communication station (STA), the method comprising generating a Physical layer (PHY) Protocol Data Unit (PPDU) for transmission over a wide channel bandwidth (BW) of at least 160 Megahertz (MHz), the wide channel BW covering at least first and second consecutive 80 MHz channel BWs; and communicating the PPDU over the wide channel BW according to a tone plan comprising a wide resource unit (RU) comprising at least 1992 tones, the tone plan comprising 996 tones of the first 80 MHz channel BW assigned to a first portion of the wide RU, 996 tones of the second 80 MHz channel BW assigned to a second portion of the wide RU, and a Direct Current (DC) portion between the first and second portions of the wide RU comprising a plurality of guard tones that separate between the first and second 80 MHz channel BWs.

Example 152 includes the subject matter of Example 151, and optionally, wherein the wide RU comprises 1992 tones.

Example 153 includes the subject matter of Example 152, and optionally, wherein the tone plan comprises a first null portion and a second null portion, the first null portion between a first sub-portion and a second sub-portion of the first portion of the wide RU, the second null portion between a first sub-portion and a second sub-portion of the second portion of the wide RU, the first null portion comprising a plurality of DC tones of the first 80 MHz channel BW, the second null portion comprising a plurality of DC tones of the second 80 MHz channel BW.

Example 154 includes the subject matter of Example 153, and optionally, wherein each of the first and second null portions comprises 5 null tones.

Example 155 includes the subject matter of any one of Examples 152-154, and optionally, wherein the DC portion comprises 5 DC tones, 9 null tones on a first side of the 5 DC tones, and 9 null tones on a second side of the 5 DC tones.

Example 156 includes the subject matter of any one of Examples 152-154, and optionally, wherein the DC portion comprises 7 DC tones, 8 null tones on a first side of the 7 DC tones, and 8 null tones on a second side of the 7 DC tones.

Example 157 includes the subject matter of any one of Examples 152-154, and optionally, comprising communicating the PPDU as a Multi-User (MU) PPDU in a MU transmission to a plurality of users over the wide channel BW.

Example 158 includes the subject matter of Example 151, and optionally, wherein the wide RU comprises 2018 tones, each of the first and second portions of the wide RU comprising 1009 tones, and the DC portion comprising 7 DC tones.

Example 159 includes the subject matter of Example 151, and optionally, wherein the wide RU comprises 2020 tones, each of the first and second portions of the wide RU comprising 1010 tones, and the DC portion comprising 7 DC tones.

Example 160 includes the subject matter of Example 151, and optionally, wherein the wide channel BW comprises a channel BW of 320 MHz, the wide channel BW covering the first 80 MHz channel BW, the second 80 MHz channel BW, a third 80 MHz channel BW, and a fourth 80 MHz channel BW, the wide RU comprising at least 3984 tones, the tone plan comprising 996 tones of the third 80 MHz channel BW assigned to a third portion the wide RU, and 996 tones of the fourth 80 MHz channel BW assigned to a fourth portion of the wide RU, the third portion of the wide RU before the first portion of the wide RU and the fourth portion of the wide RU after the second portion of the wide RU.

Example 161 includes the subject matter of Example 160, and optionally, wherein the wide RU comprises 3984 tones.

Example 162 includes the subject matter of Example 161, and optionally, wherein the tone plan comprises a first null portion, a second null portion, a third null portion, and a fourth null portion, the first null portion is between a first sub-portion and a second sub-portion of the first portion of the wide RU, the second null portion is between a first sub-portion and a second sub-portion of the second portion of the wide RU, the third null portion is between a first sub-portion and a second sub-portion of the third portion of the wide RU, the fourth null portion is between a first sub-portion and a second sub-portion of the fourth portion of the wide RU, the first null portion comprising DC tones of the first 80 MHz channel BW, the second null portion comprising DC tones of the second 80 MHz channel BW, the third null portion comprising DC tones of the third 80 MHz channel BW, and the fourth null portion comprising DC tones of the fourth 80 MHz channel BW.

Example 163 includes the subject matter of Example 162, and optionally, wherein each of the first, second, third and fourth null portions comprises 5 null tones.

Example 164 includes the subject matter of any one of Examples 161-163, and optionally, wherein the tone plan comprises a first non-data portion and a second non-data portion, the first non-data portion is between the third and first portions of the wide RU, the second non-data portion is between the second and fourth portions of the wide RU, the first non-data portion comprising a first plurality of guard tones between the third and first 80 MHz channel BWs, and the second non-data portion comprising a second plurality of guard tones between the second and fourth 80 MHz channel BWs.

Example 165 includes the subject matter of Example 164, and optionally, wherein each of the first and second non-data portions of the wide RU comprises 23 null tones.

Example 166 includes the subject matter of any one of Examples 161-165, and optionally, wherein the DC portion comprises 5 DC tones, 9 null tones on a first side of the 5 DC tones, and 9 null tones on a second side of the 5 DC tones.

Example 167 includes the subject matter of Example 160, and optionally, wherein the wide RU comprises 4068 tones.

Example 168 includes the subject matter of Example 167, and optionally, wherein each of the first and second portions of the wide RU comprises 2034 tones, and the DC portion comprises 5 DC tones.

Example 169 includes the subject matter of Example 160, and optionally, wherein the wide RU comprises 4066 tones.

Example 170 includes the subject matter of Example 169, and optionally, wherein each of the first and second portions comprises 2033 tones, and the DC portion comprises 7 DC tones.

Example 171 includes the subject matter of any one of Examples 151-170, and optionally, wherein the tone plan comprises only RUs having a size greater than 26 tones.

Example 172 includes the subject matter of any one of Examples 151-171, and optionally, wherein the tone plan comprises only RUs having a size greater than 52 tones.

Example 173 includes the subject matter of any one of Examples 151-172, and optionally, wherein the tone plan comprises an aggregated RU comprising two or more non-consecutive 26-tone RUs.

Example 174 includes the subject matter of any one of Examples 151-173, and optionally, comprising allowing the STA to communicate PPDUs using only an RU size, which is greater than 26 tones.

Example 175 includes a product comprising one or more tangible computer-readable non-transitory storage media comprising computer-executable instructions operable to, when executed by at least one processor, enable the at least one processor to cause a wireless communication station (STA) to generate a Physical layer (PHY) Protocol Data Unit (PPDU) for transmission over a wide channel bandwidth (BW) of at least 160 Megahertz (MHz), the wide channel BW covering at least first and second consecutive 80 MHz channel BWs; and communicate the PPDU over the wide channel BW according to a tone plan comprising a wide resource unit (RU) comprising at least 1992 tones, the tone plan comprising 996 tones of the first 80 MHz channel BW assigned to a first portion of the wide RU, 996 tones of the second 80 MHz channel BW assigned to a second portion of the wide RU, and a Direct Current (DC) portion between the first and second portions of the wide RU comprising a plurality of guard tones that separate between the first and second 80 MHz channel BWs.

Example 176 includes the subject matter of Example 175, and optionally, wherein the wide RU comprises 1992 tones.

Example 177 includes the subject matter of Example 176, and optionally, wherein the tone plan comprises a first null portion and a second null portion, the first null portion between a first sub-portion and a second sub-portion of the first portion of the wide RU, the second null portion between a first sub-portion and a second sub-portion of the second portion of the wide RU, the first null portion comprising a plurality of DC tones of the first 80 MHz channel BW, the second null portion comprising a plurality of DC tones of the second 80 MHz channel BW.

Example 178 includes the subject matter of Example 177, and optionally, wherein each of the first and second null portions comprises 5 null tones.

Example 179 includes the subject matter of any one of Examples 176-178, and optionally, wherein the DC portion comprises 5 DC tones, 9 null tones on a first side of the 5 DC tones, and 9 null tones on a second side of the 5 DC tones.

Example 180 includes the subject matter of any one of Examples 176-178, and optionally, wherein the DC portion comprises 7 DC tones, 8 null tones on a first side of the 7 DC tones, and 8 null tones on a second side of the 7 DC tones.

Example 181 includes the subject matter of any one of Examples 176-178, and optionally, wherein the instructions, when executed, cause the STA to communicate the PPDU as a Multi-User (MU) PPDU in a MU transmission to a plurality of users over the wide channel BW.

Example 182 includes the subject matter of Example 175, and optionally, wherein the wide RU comprises 2018 tones, each of the first and second portions of the wide RU comprising 1009 tones, and the DC portion comprising 7 DC tones.

Example 183 includes the subject matter of Example 175, and optionally, wherein the wide RU comprises 2020 tones, each of the first and second portions of the wide RU comprising 1010 tones, and the DC portion comprising 7 DC tones.

Example 184 includes the subject matter of Example 175, and optionally, wherein the wide channel BW comprises a channel BW of 320 MHz, the wide channel BW covering the first 80 MHz channel BW, the second 80 MHz channel BW, a third 80 MHz channel BW, and a fourth 80 MHz channel BW, the wide RU comprising at least 3984 tones, the tone plan comprising 996 tones of the third 80 MHz channel BW assigned to a third portion the wide RU, and 996 tones of the fourth 80 MHz channel BW assigned to a fourth portion of the wide RU, the third portion of the wide RU before the first portion of the wide RU and the fourth portion of the wide RU after the second portion of the wide RU.

Example 185 includes the subject matter of Example 184, and optionally, wherein the wide RU comprises 3984 tones.

Example 186 includes the subject matter of Example 185, and optionally, wherein the tone plan comprises a first null portion, a second null portion, a third null portion, and a fourth null portion, the first null portion is between a first sub-portion and a second sub-portion of the first portion of the wide RU, the second null portion is between a first sub-portion and a second sub-portion of the second portion of the wide RU, the third null portion is between a first sub-portion and a second sub-portion of the third portion of the wide RU, the fourth null portion is between a first sub-portion and a second sub-portion of the fourth portion of the wide RU, the first null portion comprising DC tones of the first 80 MHz channel BW, the second null portion comprising DC tones of the second 80 MHz channel BW, the third null portion comprising DC tones of the third 80 MHz channel BW, and the fourth null portion comprising DC tones of the fourth 80 MHz channel BW.

Example 187 includes the subject matter of Example 186, and optionally, wherein each of the first, second, third and fourth null portions comprises 5 null tones.

Example 188 includes the subject matter of any one of Examples 185-187, and optionally, wherein the tone plan comprises a first non-data portion and a second non-data portion, the first non-data portion is between the third and first portions of the wide RU, the second non-data portion is between the second and fourth portions of the wide RU, the first non-data portion comprising a first plurality of guard tones between the third and first 80 MHz channel BWs, and the second non-data portion comprising a second plurality of guard tones between the second and fourth 80 MHz channel BWs.

Example 189 includes the subject matter of Example 188, and optionally, wherein each of the first and second non-data portions of the wide RU comprises 23 null tones.

Example 190 includes the subject matter of any one of Examples 185-189, and optionally, wherein the DC portion comprises 5 DC tones, 9 null tones on a first side of the 5 DC tones, and 9 null tones on a second side of the 5 DC tones.

Example 191 includes the subject matter of Example 184, and optionally, wherein the wide RU comprises 4068 tones.

Example 192 includes the subject matter of Example 191, and optionally, wherein each of the first and second portions of the wide RU comprises 2034 tones, and the DC portion comprises 5 DC tones.

Example 193 includes the subject matter of Example 184, and optionally, wherein the wide RU comprises 4066 tones.

Example 194 includes the subject matter of Example 193, and optionally, wherein each of the first and second portions comprises 2033 tones, and the DC portion comprises 7 DC tones.

Example 195 includes the subject matter of any one of Examples 175-194, and optionally, wherein the tone plan comprises only RUs having a size greater than 26 tones.

Example 196 includes the subject matter of any one of Examples 175-195, and optionally, wherein the tone plan comprises only RUs having a size greater than 52 tones.

Example 197 includes the subject matter of any one of Examples 175-196, and optionally, wherein the tone plan comprises an aggregated RU comprising two or more non-consecutive 26-tone RUs.

Example 198 includes the subject matter of any one of Examples 175-197, and optionally, wherein the instructions, when executed, allow the STA to communicate PPDUs using only an RU size, which is greater than 26 tones.

Example 199 includes an apparatus of wireless communication by a wireless communication station (STA), the apparatus comprising means for generating a Physical layer (PHY) Protocol Data Unit (PPDU) for transmission over a wide channel bandwidth (BW) of at least 160 Megahertz (MHz), the wide channel BW covering at least first and second consecutive 80 MHz channel BWs; and means for communicating the PPDU over the wide channel BW according to a tone plan comprising a wide resource unit (RU) comprising at least 1992 tones, the tone plan comprising 996 tones of the first 80 MHz channel BW assigned to a first portion of the wide RU, 996 tones of the second 80 MHz channel BW assigned to a second portion of the wide RU, and a Direct Current (DC) portion between the first and second portions of the wide RU comprising a plurality of guard tones that separate between the first and second 80 MHz channel BWs.

Example 200 includes the subject matter of Example 199, and optionally, wherein the wide RU comprises 1992 tones.

Example 201 includes the subject matter of Example 200, and optionally, wherein the tone plan comprises a first null portion and a second null portion, the first null portion between a first sub-portion and a second sub-portion of the first portion of the wide RU, the second null portion between a first sub-portion and a second sub-portion of the second portion of the wide RU, the first null portion comprising a plurality of DC tones of the first 80 MHz channel BW, the second null portion comprising a plurality of DC tones of the second 80 MHz channel BW.

Example 202 includes the subject matter of Example 201, and optionally, wherein each of the first and second null portions comprises 5 null tones.

Example 203 includes the subject matter of any one of Examples 200-202, and optionally, wherein the DC portion comprises 5 DC tones, 9 null tones on a first side of the 5 DC tones, and 9 null tones on a second side of the 5 DC tones.

Example 204 includes the subject matter of any one of Examples 200-202, and optionally, wherein the DC portion comprises 7 DC tones, 8 null tones on a first side of the 7 DC tones, and 8 null tones on a second side of the 7 DC tones.

Example 205 includes the subject matter of any one of Examples 200-202, and optionally, comprising means for communicating the PPDU as a Multi-User (MU) PPDU in a MU transmission to a plurality of users over the wide channel BW.

Example 206 includes the subject matter of Example 199, and optionally, wherein the wide RU comprises 2018 tones, each of the first and second portions of the wide RU comprising 1009 tones, and the DC portion comprising 7 DC tones.

Example 207 includes the subject matter of Example 199, and optionally, wherein the wide RU comprises 2020 tones, each of the first and second portions of the wide RU comprising 1010 tones, and the DC portion comprising 7 DC tones.

Example 208 includes the subject matter of Example 199, and optionally, wherein the wide channel BW comprises a channel BW of 320 MHz, the wide channel BW covering the first 80 MHz channel BW, the second 80 MHz channel BW, a third 80 MHz channel BW, and a fourth 80 MHz channel BW, the wide RU comprising at least 3984 tones, the tone plan comprising 996 tones of the third 80 MHz channel BW assigned to a third portion the wide RU, and 996 tones of the fourth 80 MHz channel BW assigned to a fourth portion of the wide RU, the third portion of the wide RU before the first portion of the wide RU and the fourth portion of the wide RU after the second portion of the wide RU.

Example 209 includes the subject matter of Example 208, and optionally, wherein the wide RU comprises 3984 tones.

Example 210 includes the subject matter of Example 209, and optionally, wherein the tone plan comprises a first null portion, a second null portion, a third null portion, and a fourth null portion, the first null portion is between a first sub-portion and a second sub-portion of the first portion of the wide RU, the second null portion is between a first sub-portion and a second sub-portion of the second portion of the wide RU, the third null portion is between a first sub-portion and a second sub-portion of the third portion of the wide RU, the fourth null portion is between a first sub-portion and a second sub-portion of the fourth portion of the wide RU, the first null portion comprising DC tones of the first 80 MHz channel BW, the second null portion comprising DC tones of the second 80 MHz channel BW, the third null portion comprising DC tones of the third 80 MHz channel BW, and the fourth null portion comprising DC tones of the fourth 80 MHz channel BW.

Example 211 includes the subject matter of Example 210, and optionally, wherein each of the first, second, third and fourth null portions comprises 5 null tones.

Example 212 includes the subject matter of any one of Examples 209-211, and optionally, wherein the tone plan comprises a first non-data portion and a second non-data portion, the first non-data portion is between the third and first portions of the wide RU, the second non-data portion is between the second and fourth portions of the wide RU, the first non-data portion comprising a first plurality of guard tones between the third and first 80 MHz channel BWs, and the second non-data portion comprising a second plurality of guard tones between the second and fourth 80 MHz channel BWs.

Example 213 includes the subject matter of Example 212, and optionally, wherein each of the first and second non-data portions of the wide RU comprises 23 null tones.

Example 214 includes the subject matter of any one of Examples 209-213, and optionally, wherein the DC portion comprises 5 DC tones, 9 null tones on a first side of the 5 DC tones, and 9 null tones on a second side of the 5 DC tones.

Example 215 includes the subject matter of Example 208, and optionally, wherein the wide RU comprises 4068 tones.

Example 216 includes the subject matter of Example 215, and optionally, wherein each of the first and second portions of the wide RU comprises 2034 tones, and the DC portion comprises 5 DC tones.

Example 217 includes the subject matter of Example 208, and optionally, wherein the wide RU comprises 4066 tones.

Example 218 includes the subject matter of Example 217, and optionally, wherein each of the first and second portions comprises 2033 tones, and the DC portion comprises 7 DC tones.

Example 219 includes the subject matter of any one of Examples 199-218, and optionally, wherein the tone plan comprises only RUs having a size greater than 26 tones.

Example 220 includes the subject matter of any one of Examples 199-219, and optionally, wherein the tone plan comprises only RUs having a size greater than 52 tones.

Example 221 includes the subject matter of any one of Examples 199-220, and optionally, wherein the tone plan comprises an aggregated RU comprising two or more non-consecutive 26-tone RUs.

Example 222 includes the subject matter of any one of Examples 199-221, and optionally, comprising means for allowing the STA to communicate PPDUs using only an RU size, which is greater than 26 tones.

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus of Orthogonal Frequency-Division Multiplexing (OFDM) transmission, the apparatus comprising:
   a segment parser to parse scrambled data bits of a Physical layer (PHY) Protocol Data Unit (PPDU) into a first plurality of data bits based on a first number of data bits per OFDM symbol for a first channel, and into a second plurality of data bits based on a second number of data bits per OFDM symbol for a second channel, the PPDU to be transmitted in an OFDM transmission over an aggregated bandwidth comprising the first channel in a first frequency band and the second channel in a second frequency band, the first plurality of data bits to be transmitted over the first channel in the first frequency band, the second plurality of data bits to be transmitted over the second channel in the second frequency band, wherein the segment parser is configured to determine the first number of data bits per OFDM symbol based on at least one of a number of coded bits per subcarrier for the first channel in the first frequency band, a number of OFDM subcarriers for the first channel in the first frequency band, or a coding rate for the first channel in the first frequency band, and wherein the segment parser is configured to determine the second number of data bits per OFDM symbol based on at least one of a number of coded bits per subcarrier for the second channel in the second frequency band, a number of OFDM subcarriers for the second channel in the second frequency band, or a coding rate for the second channel in the second frequency band;

a first baseband processor to encode and modulate the first plurality of data bits according to a first OFDM Modulation and Coding Scheme (MCS) for transmission over the first channel in the first frequency band; and a second baseband processor to encode and modulate the second plurality of data bits according to a second OFDM MCS for transmission over the second channel in the second frequency band.

2. The apparatus of claim 1, wherein the segment parser is configured to determine a total number of scrambled data bits per OFDM symbol to be transmitted over the aggregated bandwidth based on the first number of data bits per OFDM symbol and the second number of data bits per OFDM symbol, to group the scrambled data bits of the PPDU into a plurality of data bit groups, a group of the plurality of data bit groups comprising the total number of scrambled data bits per OFDM symbol, and to parse the group into the first plurality of data bits and the second plurality of data bits.

3. The apparatus of claim 1, wherein the first channel comprises a first aggregated channel comprising an aggregation of a first channel bandwidth in the first frequency band and a second channel bandwidth in the first frequency band, and wherein the second channel comprises a second aggregated channel comprising an aggregation of a first channel bandwidth in the second frequency band and a second channel bandwidth in the second frequency band.

4. The apparatus of claim 3, wherein the first baseband processor comprises a first encoder to encode the first plurality of data bits into a first plurality of encoded data bits, and a first stream parser to parse the first plurality of encoded data bits into a first plurality of spatial streams, and wherein the second baseband processor comprises a second encoder to encode the second plurality of data bits into a second plurality of encoded data bits, and a second stream parser to parse the second plurality of encoded data bits into a second plurality of spatial streams.

5. The apparatus of claim 3, wherein the first aggregated channel comprises a 160 Megahertz (MHz) channel, the first channel bandwidth in the first frequency band comprises a first 80 MHz channel bandwidth, the second channel bandwidth in the first frequency band comprises a second 80 MHz channel bandwidth, the first channel bandwidth in the second frequency band comprises a third 80 MHz channel bandwidth, and the second channel bandwidth in the second frequency band comprises a fourth 80 MHz channel bandwidth.

6. The apparatus of claim 3, wherein the first channel bandwidth in the first frequency band is contiguous to the second channel bandwidth in the first frequency band, and wherein the first channel bandwidth in the second frequency band is contiguous to the second channel bandwidth in the second frequency band.

7. The apparatus of claim 3, wherein the first channel bandwidth in the first frequency band is non-contiguous to the second channel bandwidth in the first frequency band, and wherein the first channel bandwidth in the second frequency band is non-contiguous to the second channel bandwidth in the second frequency band.

8. The apparatus of claim 1, wherein the aggregated bandwidth comprises a 320 Megahertz (MHz) channel, the first channel comprising a first 160 MHz channel, and the second channel comprising a second 160 MHz channel.

9. The apparatus of claim 1, wherein the first channel comprises a first 160 MHz channel, 80 MHz channel or 40 MHz channel, and the second channel comprises a second 160 MHz channel, 80 MHz channel or 40 MHz channel.

10. The apparatus of claim 1, wherein the aggregated bandwidth comprises a wide channel bandwidth (BW) of at least 160 Megahertz (MHz), the wide channel BW covering at least first and second consecutive 80 MHz channel BWs, the apparatus configured to transmit the PPDU over the wide channel BW according to a tone plan comprising a wide resource unit (RU) comprising at least 1992 tones, the tone plan comprising 996 tones of the first 80 MHz channel BW assigned to a first portion of the wide RU, 996 tones of the second 80 MHz channel BW assigned to a second portion of the wide RU, and a Direct Current (DC) portion between the first and second portions of the wide RU comprising a plurality of guard tones that separate between the first and second 80 MHz channel BWs.

11. The apparatus of claim 1, wherein the first frequency band comprises a 6 Gigahertz (GHz) wireless frequency band, and the second frequency band comprises a 5 GHz wireless frequency band or a 2.4 GHz wireless frequency band.

12. The apparatus of claim 1, wherein the first channel in the first frequency band comprises a first channel in a 6 Gigahertz (GHz) wireless frequency band, and the second channel in the second frequency band comprises a second channel in the 6 GHz wireless frequency band.

13. The apparatus of claim 1 comprising one or more antennas, a memory and a processor.

* * * * *

UNITED STATES PATENT AND TRADEMARK OFFICE
CERTIFICATE OF CORRECTION

PATENT NO. : 11,509,413 B2  
APPLICATION NO. : 16/021484  
DATED : November 22, 2022  
INVENTOR(S) : Alexander W. Min et al.

Page 1 of 1

It is certified that error appears in the above-identified patent and that said Letters Patent is hereby corrected as shown below:

On the Title Page

Item (71), delete "INTEL IP CORPORATION, Santa Clara, CA (US)" and insert -- INTEL CORPORATION, Santa Clara, CA (US) --, therefor Signed and Sealed this  
Twenty-fourth Day of January, 2023

Katherine Kelly Vidal  
*Director of the United States Patent and Trademark Office*